(12) United States Patent
Chiang et al.

(10) Patent No.: US 8,999,571 B2
(45) Date of Patent: Apr. 7, 2015

(54) BATTERIES AND ELECTRODES FOR USE THEREOF

(75) Inventors: Yet-Ming Chiang, Framingham, MA (US); Ryan C. Wartena, Los Angeles, CA (US); Timothy E. Chin, San Jose, CA (US); Can K. Erdonmez, Miller Place, NY (US); Wei Lai, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 13/408,143

(22) Filed: Feb. 29, 2012

(65) Prior Publication Data

US 2012/0244444 A1    Sep. 27, 2012

Related U.S. Application Data

(63) Continuation of application No. 12/323,983, filed on Nov. 26, 2008, now abandoned, which is a continuation-in-part of application No. 12/126,841, filed on May 23, 2008, now abandoned.

(60) Provisional application No. 60/931,819, filed on May 25, 2007.

(51) Int. Cl.
   *H01M 4/02*      (2006.01)
   *H01M 10/052*    (2010.01)
   (Continued)

(52) U.S. Cl.
   CPC .......... *H01M 10/052* (2013.01); *H01M 4/0426* (2013.01); *H01M 4/0471* (2013.01);
   (Continued)

(58) Field of Classification Search
   USPC ................... 429/212, 213, 224, 231.1, 231.5, 429/231.95
   See application file for complete search history.

(56) References Cited

U.S. PATENT DOCUMENTS 3,765,943 A   10/1973   Biagetti
3,864,167 A    2/1975   Broadhead et al.
(Continued)

FOREIGN PATENT DOCUMENTS

CA   2270771 A1   10/2000
CN   1893167 A    1/2007
(Continued)

OTHER PUBLICATIONS

Canadian Office Action for Application No. 2426156 mailed Mar. 31, 2009.
(Continued)

*Primary Examiner* — Maria J Laios
(74) *Attorney, Agent, or Firm* — Wolf, Greenfield & Sacks, P.C.

(57) ABSTRACT

The present invention generally relates to batteries or other electrochemical devices, and systems and materials for use in these, including novel electrode materials and designs. In some embodiments, the present invention relates to small-scale batteries or microbatteries. For example, in one aspect of the invention, a battery may have a volume of no more than about 5 mm$^3$, while having an energy density of at least about 400 W h/l. In some cases, the battery may include an electrode comprising a porous electroactive compound. In some embodiments, the pores of the porous electrode may be at least partially filled with a liquid such as a liquid electrolyte. The electrode may be formed from a unitary material. Other aspects of the invention are directed to techniques of making such electrodes or batteries, techniques of forming electrical connections to and packaging such batteries, techniques of using such electrodes or batteries, or the like.

35 Claims, 36 Drawing Sheets

(51) Int. Cl.
*H01M 4/04* (2006.01)
*H01M 4/131* (2010.01)
*H01M 4/1391* (2010.01)
*H01M 4/1393* (2010.01)
*H01M 4/1397* (2010.01)
*H01M 4/485* (2010.01)
*H01M 4/505* (2010.01)
*H01M 4/525* (2010.01)
*H01M 4/66* (2006.01)
*H01M 10/04* (2006.01)
*H01M 10/0525* (2010.01)
*H01M 10/0562* (2010.01)
*H01M 10/0565* (2010.01)

(52) U.S. Cl.
CPC ............ *H01M4/131* (2013.01); *H01M 4/1391* (2013.01); *H01M 4/1393* (2013.01); *H01M 4/1397* (2013.01); *H01M 4/485* (2013.01); *H01M 4/505* (2013.01); *H01M 4/525* (2013.01); *H01M 4/667* (2013.01); *H01M 10/0436* (2013.01); *H01M 10/0525* (2013.01); *H01M 10/0562* (2013.01); *H01M 10/0565* (2013.01); *H01M 4/661* (2013.01); *H01M 4/664* (2013.01); *H01M 10/0472* (2013.01); *H01M 2004/021* (2013.01); *Y02E 60/122* (2013.01)

(56) References Cited

U.S. PATENT DOCUMENTS

| | | | |
|---|---|---|---|
| 4,245,016 A | 1/1981 | Rampel | |
| 4,555,454 A | 11/1985 | Shuster | |
| 4,579,637 A | 4/1986 | Jaisinghani et al. | |
| 4,599,114 A | 7/1986 | Atkinson | |
| 4,615,784 A | 10/1986 | Stewart et al. | |
| 4,668,596 A | 5/1987 | Shacklette et al. | |
| 4,758,483 A | 7/1988 | Armand et al. | |
| 4,804,592 A | 2/1989 | Vanderborgh et al. | |
| 4,889,777 A | 12/1989 | Akuto | |
| 5,100,747 A | 3/1992 | Hayashida et al. | |
| 5,187,209 A | 2/1993 | Hirai et al. | |
| 5,213,895 A | 5/1993 | Hirai et al. | |
| 5,227,267 A | 7/1993 | Goebel et al. | |
| 5,238,760 A | 8/1993 | Takahashi et al. | |
| 5,294,504 A | 3/1994 | Otagawa et al. | |
| 5,338,625 A | 8/1994 | Bates et al. | |
| 5,358,802 A | 10/1994 | Mayer et al. | |
| 5,387,478 A | 2/1995 | Muta et al. | |
| 5,399,447 A | 3/1995 | Chaloner-Gill et al. | |
| 5,405,937 A | 4/1995 | Lemaire et al. | |
| 5,436,093 A | 7/1995 | Huang et al. | |
| 5,441,830 A | 8/1995 | Moulton et al. | |
| 5,464,707 A | 11/1995 | Moulton et al. | |
| 5,478,676 A | 12/1995 | Turi et al. | |
| 5,518,833 A | 5/1996 | Repplinger et al. | |
| 5,520,850 A | 5/1996 | Chaloner-Gill et al. | |
| 5,527,641 A | 6/1996 | Koshiishi et al. | |
| 5,554,459 A | 9/1996 | Gozdz et al. | |
| 5,567,754 A | 10/1996 | Stramel | |
| 5,578,396 A | 11/1996 | Fauteux et al. | |
| 5,587,253 A | 12/1996 | Gozdz et al. | |
| 5,588,971 A | 12/1996 | Fauteux et al. | |
| 5,589,297 A | 12/1996 | Koga et al. | |
| 5,591,544 A | 1/1997 | Fauteux et al. | |
| 5,620,811 A * | 4/1997 | Zhang et al. | 429/212 |
| 5,624,605 A | 4/1997 | Cao et al. | |
| 5,635,138 A | 6/1997 | Amatucci et al. | |
| 5,654,115 A | 8/1997 | Hasebe et al. | |
| 5,677,080 A | 10/1997 | Chen | |
| 5,698,342 A | 12/1997 | Klein | |
| 5,705,291 A | 1/1998 | Amatucci et al. | |
| 5,714,053 A | 2/1998 | Howard | |
| 5,733,683 A | 3/1998 | Searson et al. | |
| 5,759,714 A | 6/1998 | Matsufuji et al. | |
| 5,789,100 A | 8/1998 | Burroughs et al. | |
| 5,821,033 A | 10/1998 | Cromack et al. | |
| 5,827,615 A | 10/1998 | Touhsaent et al. | |
| 5,834,136 A | 11/1998 | Gao et al. | |
| 5,840,087 A | 11/1998 | Gozdz et al. | |
| 5,843,292 A | 12/1998 | Spiros | |
| 5,846,675 A | 12/1998 | Sazhin et al. | |
| 5,888,670 A | 3/1999 | Kawakami | |
| 5,897,522 A | 4/1999 | Nitzan | |
| 5,902,689 A | 5/1999 | Vleggaar et al. | |
| 5,910,382 A | 6/1999 | Goodenough et al. | |
| 5,925,283 A | 7/1999 | Taniuchi et al. | |
| 5,949,213 A | 9/1999 | Lanni | |
| 6,051,340 A * | 4/2000 | Kawakami et al. | 429/231.95 |
| 6,063,519 A | 5/2000 | Barker et al. | |
| 6,063,525 A | 5/2000 | LaFollette | |
| 6,069,221 A | 5/2000 | Chasser et al. | |
| RE36,843 E | 8/2000 | Lake et al. | |
| 6,096,453 A | 8/2000 | Grunwald | |
| 6,096,454 A | 8/2000 | Tran et al. | |
| 6,096,494 A | 8/2000 | Tang et al. | |
| 6,117,593 A | 9/2000 | Stachoviak et al. | |
| 6,120,940 A | 9/2000 | Poehler et al. | |
| 6,136,476 A | 10/2000 | Schutts et al. | |
| 6,156,453 A | 12/2000 | Shimizu et al. | |
| 6,159,389 A | 12/2000 | Miura et al. | |
| 6,174,623 B1 | 1/2001 | Shackle | |
| 6,190,798 B1 | 2/2001 | Okada et al. | |
| 6,231,779 B1 | 5/2001 | Chiang et al. | |
| 6,242,124 B1 | 6/2001 | Saito et al. | |
| 6,280,875 B1 | 8/2001 | Kwak et al. | |
| 6,280,879 B1 | 8/2001 | Andersen et al. | |
| 6,287,720 B1 | 9/2001 | Yamashita et al. | |
| 6,291,097 B1 | 9/2001 | Barker et al. | |
| 6,300,016 B1 | 10/2001 | Jan et al. | |
| 6,306,540 B1 | 10/2001 | Hiroi et al. | |
| 6,322,924 B1 | 11/2001 | Hirahara et al. | |
| 6,337,156 B1 | 1/2002 | Narang et al. | |
| 6,342,317 B1 | 1/2002 | Patel et al. | |
| 6,358,645 B1 | 3/2002 | Furukawa et al. | |
| 6,395,429 B1 | 5/2002 | Kang et al. | |
| 6,403,263 B1 | 6/2002 | Roach | |
| 6,410,189 B1 | 6/2002 | Yamada et al. | |
| 6,413,284 B1 | 7/2002 | Chu et al. | |
| 6,413,285 B1 | 7/2002 | Chu et al. | |
| 6,423,447 B1 | 7/2002 | Ohsaki et al. | |
| 6,432,585 B1 | 8/2002 | Kawakami et al. | |
| 6,451,487 B1 | 9/2002 | Besner et al. | |
| 6,454,977 B1 | 9/2002 | Kwok et al. | |
| 6,495,283 B1 | 12/2002 | Yoon et al. | |
| 6,511,780 B1 | 1/2003 | Veregin et al. | |
| 6,528,033 B1 | 3/2003 | Barker et al. | |
| 6,541,157 B1 | 4/2003 | Inagaki et al. | |
| 6,555,268 B1 | 4/2003 | Inoue et al. | |
| 6,599,662 B1 | 7/2003 | Chiang et al. | |
| 6,623,888 B1 | 9/2003 | Omaru et al. | |
| 6,645,675 B1 | 11/2003 | Munshi | |
| 6,664,006 B1 | 12/2003 | Munshi | |
| 6,679,926 B1 * | 1/2004 | Kajiura et al. | 29/623.1 |
| 6,699,297 B1 * | 3/2004 | Yamawaki et al. | 29/623.1 |
| 6,730,438 B2 | 5/2004 | Nakanishi et al. | |
| 6,753,111 B2 | 6/2004 | Kweon et al. | |
| 6,764,525 B1 | 7/2004 | Whitacre et al. | |
| 6,783,894 B2 | 8/2004 | Kajiura et al. | |
| 6,787,232 B1 | 9/2004 | Chiang et al. | |
| 6,797,435 B2 | 9/2004 | Kweon et al. | |
| 6,800,399 B2 | 10/2004 | Matsumoto | |
| 6,818,356 B1 | 11/2004 | Bates | |
| 6,844,105 B1 | 1/2005 | Hanafusa et al. | |
| 6,855,273 B2 | 2/2005 | Ravet et al. | |
| 6,878,487 B2 | 4/2005 | Cho et al. | |
| 6,982,132 B1 | 1/2006 | Goldner et al. | |
| 7,026,071 B2 | 4/2006 | Mayes et al. | |
| 7,033,702 B2 | 4/2006 | Dasgupta et al. | |
| 7,087,348 B2 | 8/2006 | Holman et al. | |
| 7,090,785 B2 | 8/2006 | Chiang et al. | |
| 7,182,848 B2 | 2/2007 | Sarkar | |
| 7,318,982 B2 | 1/2008 | Gozdz et al. | |

(56) References Cited

U.S. PATENT DOCUMENTS

| | | |
|---|---|---|
| 7,338,734 B2 | 3/2008 | Chiang et al. |
| 7,387,851 B2 | 6/2008 | Gozdz et al. |
| 7,396,614 B2 * | 7/2008 | Jouanneau et al. ........ 429/231.2 |
| 7,553,584 B2 | 6/2009 | Chiang et al. |
| 7,579,112 B2 | 8/2009 | Chiang et al. |
| 7,662,265 B2 | 2/2010 | Chiang et al. |
| 7,763,382 B2 | 7/2010 | Riley, Jr. et al. |
| 7,781,098 B2 | 8/2010 | Chiang et al. |
| 7,988,746 B2 | 8/2011 | Chiang et al. |
| 8,148,009 B2 | 4/2012 | Chiang et al. |
| 8,168,326 B2 | 5/2012 | Chiang et al. |
| 8,206,468 B2 | 6/2012 | Chiang et al. |
| 8,206,469 B2 | 6/2012 | Chiang et al. |
| 8,241,789 B2 | 8/2012 | Chiang et al. |
| 8,277,975 B2 | 10/2012 | Chiang et al. |
| 2001/0005558 A1 | 6/2001 | Yoshioka et al. |
| 2001/0005562 A1 | 6/2001 | Yoshioka et al. |
| 2001/0007726 A1 | 7/2001 | Yoshioka et al. |
| 2001/0043709 A1 | 11/2001 | Panitzsch |
| 2002/0000034 A1 | 1/2002 | Jenson |
| 2002/0015278 A1 | 2/2002 | Fukuyama et al. |
| 2002/0028380 A1 | 3/2002 | Tanjo et al. |
| 2002/0036282 A1 | 3/2002 | Chiang et al. |
| 2002/0048706 A1 | 4/2002 | Mayes et al. |
| 2002/0071990 A1 | 6/2002 | Kweon et al. |
| 2002/0071991 A1 | 6/2002 | Kweon et al. |
| 2002/0074972 A1 | 6/2002 | Narang et al. |
| 2002/0192137 A1 | 12/2002 | Chaloner-Gill et al. |
| 2002/0195591 A1 | 12/2002 | Ravet et al. |
| 2003/0003352 A1 | 1/2003 | Kweon et al. |
| 2003/0008212 A1 | 1/2003 | Akashi et al. |
| 2003/0049529 A1 | 3/2003 | Cho et al. |
| 2003/0054250 A1 | 3/2003 | Kweon et al. |
| 2003/0082446 A1 * | 5/2003 | Chiang et al. ................ 429/209 |
| 2003/0099884 A1 | 5/2003 | Chiang et al. |
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |
| 2004/0185343 A1 | 9/2004 | Wang et al. |
| 2004/0265692 A1 | 12/2004 | Long et al. |
| 2005/0026037 A1 | 2/2005 | Riley et al. |
| 2005/0034993 A1 | 2/2005 | Gozdz et al. |
| 2005/0048374 A1 | 3/2005 | Yonezawa |
| 2005/0109263 A9 | 5/2005 | Chiang et al. |
| 2005/0170253 A1 * | 8/2005 | Yoon et al. .................... 429/307 |
| 2005/0175529 A1 | 8/2005 | Ceder et al. |
| 2005/0181280 A1 | 8/2005 | Ceder et al. |
| 2005/0272214 A1 | 12/2005 | Chiang et al. |
| 2006/0035143 A1 | 2/2006 | Kida et al. |
| 2006/0046143 A1 * | 3/2006 | Nakai et al. ................ 429/231.1 |
| 2006/0102455 A1 | 5/2006 | Chiang et al. |
| 2006/0234131 A1 | 10/2006 | Takami et al. |
| 2007/0009801 A1 | 1/2007 | Inagaki et al. |
| 2007/0275300 A1 | 11/2007 | Salot et al. |
| 2008/0099734 A1 | 5/2008 | Chiang et al. |
| 2008/0213662 A1 | 9/2008 | Chiang et al. |
| 2008/0254368 A1 | 10/2008 | Ooyama et al. |
| 2008/0311470 A1 | 12/2008 | Gozdz et al. |
| 2009/0035664 A1 | 2/2009 | Chiang et al. |
| 2009/0202903 A1 | 8/2009 | Chiang et al. |
| 2009/0235520 A1 | 9/2009 | Atsumi et al. |
| 2010/0003603 A1 | 1/2010 | Chiang et al. |
| 2010/0248028 A1 | 9/2010 | Riley, Jr. et al. |
| 2011/0027656 A1 | 2/2011 | Chiang et al. |
| 2011/0045346 A1 | 2/2011 | Chiang et al. |
| 2011/0064999 A1 | 3/2011 | Chiang et al. |
| 2011/0070489 A1 | 3/2011 | Chiang et al. |
| 2011/0097623 A1 | 4/2011 | Chiang et al. |
| 2011/0151324 A1 | 6/2011 | Chiang et al. |
| 2011/0278170 A1 | 11/2011 | Chiang et al. |
| 2012/0251896 A1 | 10/2012 | Chiang et al. |
| 2012/0282530 A1 | 11/2012 | Chiang et al. |
| 2013/0202959 A1 | 8/2013 | Chiang et al. |

FOREIGN PATENT DOCUMENTS

| | | |
|---|---|---|
| CN | 1945881 A | 4/2007 |
| CN | 101030655 A | 9/2007 |
| EP | 0 071 119 A2 | 2/1983 |
| EP | 1 113 511 A1 | 7/2001 |
| EP | 1 184 918 A2 | 3/2002 |
| EP | 1 231 651 A1 | 8/2002 |
| EP | 1 231 653 A1 | 8/2002 |
| EP | 1 860 722 A2 | 11/2007 |
| GB | 976971 A | 12/1964 |
| JP | 5398038 A | 8/1978 |
| JP | 55010738 A | 1/1980 |
| JP | 59-94379 A | 5/1984 |
| JP | 59094379 A | 5/1984 |
| JP | 59152565 A | 8/1984 |
| JP | 60183365 A | 9/1985 |
| JP | 61-4167 A | 1/1986 |
| JP | 63121272 A | 5/1988 |
| JP | 63289768 A | 11/1988 |
| JP | 1-187778 A | 7/1989 |
| JP | 0458455 A | 2/1992 |
| JP | 04144073 A | 5/1992 |
| JP | 0529006 A | 2/1993 |
| JP | 05041211 A | 2/1993 |
| JP | 05109429 A | 4/1993 |
| JP | 06236768 A | 8/1994 |
| JP | 07101728 A | 4/1995 |
| JP | 07153492 A | 6/1995 |
| JP | 07262986 A | 10/1995 |
| JP | 08138650 A | 5/1996 |
| JP | 08321306 A | 12/1996 |
| JP | 09022693 A | 1/1997 |
| JP | 09147862 A | 6/1997 |
| JP | 09298057 A | 11/1997 |
| JP | 09320569 A | 12/1997 |
| JP | 11-031534 A | 2/1999 |
| JP | 11121006 A | 4/1999 |
| JP | 11121025 A | 4/1999 |
| JP | 11121061 A | 4/1999 |
| JP | 11-154508 | 6/1999 |
| JP | 11162519 | 6/1999 |
| JP | 2000021415 A | 1/2000 |
| JP | 2000048639 A | 2/2000 |
| JP | 2000080406 A | 3/2000 |
| JP | 2000-106213 | 4/2000 |
| JP | 2000173645 A | 6/2000 |
| JP | 2000-195526 A | 7/2000 |
| JP | 2000195525 A | 7/2000 |
| JP | 2000228213 A | 8/2000 |
| JP | 2000248095 A | 9/2000 |
| JP | 2001-151834 | 6/2001 |
| JP | 2002151055 A | 5/2002 |
| KR | 101991000746 | 9/1991 |
| KR | 1998-071228 | 10/1998 |
| WO | WO 97/05666 A2 | 2/1997 |
| WO | WO 97/27635 A1 | 7/1997 |
| WO | WO 97/44843 A1 | 11/1997 |
| WO | WO 98/12761 A1 | 3/1998 |
| WO | WO 98/16960 A2 | 4/1998 |
| WO | WO 98/48466 A1 | 10/1998 |
| WO | WO 99/33129 A1 | 7/1999 |
| WO | WO 99/56331 A1 | 11/1999 |
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |
| WO | WO 2007/028972 A1 | 3/2007 |
| WO | WO 2008/011061 A1 | 1/2008 |
| WO | WO 2008/153749 A1 | 12/2008 |

(56) References Cited

OTHER PUBLICATIONS

Canadian Office Action for Application No. 2426156 mailed Nov. 19, 2009.
Chinese Office Action for Application No. 01817679.8 mailed Apr. 29, 2005.
Chinese Office Action for Application No. 01817679.8 mailed Dec. 25, 2005.
Chinese Office Action for Application No. 200610115050.X mailed Mar. 14, 2008
Chinese Office Action for Application No. 200610115050.X mailed Oct. 17, 2008.
Chinese Office Action for Application No. 200610115050.X mailed Jun. 26, 2009.
Chinese Office Action for Application No. 200610115050.X mailed Jul. 14, 2010.
European Office Action for Application No. 01988312.3 mailed Nov. 27, 2003.
European Office Action for Application No. 01988312.3 mailed Mar. 9, 2005.
European Office Action for Application No. 01988312.3 mailed Jun. 27, 2007.
European Office Action for Application No. 01988312.3 mailed Oct. 5, 2007.
Japanese Office Action for Application No. 2002-544796 mailed Apr. 20, 2005.
Japanese Office Action for Application No. 2002-544796 mailed Jun. 6, 2006
Japanese Office Action for Application No. 2005-308683 mailed Jun. 12, 2009.
Japanese Office Action for Application No. 2005-308683 mailed Oct. 12, 2010.
Japanese Office Action for Application No. 2006-274391 dated Feb. 3, 2010.
Japanese Office Action for Application No. 2006-274391 dated Mar. 14, 2011.
Japanese Office Action for Application No. 2006-274391 dated Jan. 10, 2012.
Korean Notice of Preliminary Rejection for Application No. 10-2003-7005495 mailed Sep. 27, 2007.
Korean Notice of Preliminary Rejection for Application No. 10-2003-7005495 mailed Mar. 28, 2008.
Korean Notice of Final Rejection for Application No. 10-2003-7005495 mailed Jan. 2009.
Korean Notice of Preliminary Rejection for Application No. 10-2008-7021160 mailed Dec. 24, 2008.
Korean Notice of Preliminary Rejection for Application No. 10-2009-7008494 mailed Jul. 24, 2009.
Korean Notice of Final Rejection for Application No. 10-2009-7008494 mailed Apr. 2010.
Korean Notice of Preliminary Rejection for Application No. 10-2009-7008494 mailed Sep. 3, 2010.
Korean Notice of Preliminary Rejection for Application No. 10-2010-7024736 mailed Mar. 2, 2011.
Notice of Preliminary Rejection from corresponding Korean Patent Application No. 10-2011-7018116 issued Nov. 21, 2011.
Non-Final Office Action from USPTO for U.S. Appl. No. 10/021,740 mailed Sep. 2, 2003.
Non-Final Office Action from USPTO for U.S. Appl. No. 10/021,740 mailed Jul. 1, 2004.
Non-Final Office Action from USPTO for U.S. Appl. No. 10/021,740, mailed Dec. 29, 2004.
Non-Final Office Action from USPTO for U.S. Appl. No. 10/021,740 mailed Sep. 8, 2005.
Non-Final Office Action from USPTO for U.S. Appl. No. 10/021,740, mailed Jan. 4, 2006.
Final Office Action from USPTO for U.S. Appl. No. 10/021,740 mailed Jul. 12, 2006.
Notice of Allowance for U.S. Appl. No. 10/021,740 mailed Mar. 8, 2007.
Notice of Allowance for U.S. Appl. No. 10/021,740 mailed Jul. 10, 2007.
Notice of Allowance for U.S. Appl. No. 10/021,740 mailed Dec. 5, 2007.
Notice of Allowance for U.S. Appl. No. 10/021,740 mailed Aug. 27, 2008.
Notice of Allowance for U.S. Appl. No. 10/021,740 mailed Feb. 24, 2009.
Non Final Office Action for U.S. Appl. No. 12/041,619 mailed Dec. 28, 2009.
Notice of Allowance for U.S. Appl. No. 12/041,619 mailed May 18, 2010.
Non Final Office Action for U.S. Appl. No. 12/839,155 mailed Mar. 1, 2011.
Final Office Action for U.S. Appl. No. 12/839,155 mailed Nov. 16, 2011.
Non Final Office Action for U.S. Appl. No. 12/957,000 mailed Feb. 18, 2011.
Notice of Allowance for U.S. Appl. No. 12/957,000 mailed Nov. 23, 2011.
Invitation to Pay Additional Fees for International Patent Application Serial No. PCT/US01/48345 mailed Nov. 28, 2002.
International Search Report for International Application No. PCT/US 01/48345 mailed Feb. 20, 2003.
Written Opinion for corresponding International Application No. PCT/US 01/48345 mailed Aug. 22, 2003.
International Preliminary Examination Report for International Application No. PCT/US 01/48345 mailed Feb. 25, 2004.
Chinese Office Action for Application No. 02818181.6 mailed Mar. 7, 2008.
Korean Office Action for Application No. 10-2009-7016254 mailed Feb. 28, 2011.
Non Office Action from USPTO for U.S. Appl. No. 10/206,662 mailed on May 19, 2005.
Final Office Action for U.S. Appl. No. 10/206,662 mailed Aug. 7, 2006.
Non Final Office Action for U.S. Appl. No. 10/206,662 mailed May 8, 2007.
Notice of Allowance for U.S. Appl. No. 10/206,662 mailed Apr. 1, 2009.
Non Final Office Action for U.S. Appl. No. 12/512,421 mailed May 17, 2010.
Final Office Action for U.S. Appl. No. 12/512,421 mailed Oct. 22, 2010.
Non Final Office Action for U.S. Appl. No. 12/512,421 mailed Feb. 2, 2011.
Non Final Office Action for U.S. Appl. No. 12/512,421 mailed Aug. 18, 2011.
Notice of Allowance for U.S. Appl. No. 12/512,421 mailed Dec. 27, 2011.
Non Final Office Action for U.S. Appl. No. 12/891,637 mailed Aug. 25, 2011.
Notice of Allowance for U.S. Appl. No. 12/886,035 mailed Dec. 20, 2010.
Notice of Allowance for U.S. Appl. No. 12/886,035 mailed Mar. 30, 2011.
Non Final Office Action for U.S. Appl. No. 12/886,006 mailed Sep. 1, 2011.
Non Final Office Action for U.S. Appl. No. 13/169,423 mailed Oct. 13, 2011.
Notice of Allowance for U.S. Appl. No. 13/169,423 mailed Feb. 23, 2012.
International Search Report for PCT/US02/23880 mailed Dec. 29, 2003.
International Preliminary Examination Report for PCT/US02/23880 issued Mar. 14, 2007.
Invitation to Pay Additional Fees for PCT/US2008/006604 mailed Aug. 20, 2008.
International Search Report and Written Opinion for PCT/US2008/006604 mailed Nov. 3, 2008.
International Preliminary Report on Patentability for PCT/US2008/006604 mailed Dec. 10, 2009.

(56) References Cited

OTHER PUBLICATIONS

European Examination Report for EP 09788703.8 mailed Sep. 20, 2011.
International Search Report and Written Opinion for PCT/US2009/000901 mailed Sep. 11, 2009.
International Preliminary Report on Patentability for PCT/US2009/000901 mailed Aug. 26, 2010.
Non Final Office Action for U.S. Appl. No. 12/323,983 mailed Aug. 30, 2011.
Invitation to Pay Additional Fees for International Patent Application Serial No. PCT/US2009/006284 mailed Feb. 23, 2010.
International Search Report and Written Opinion for International Patent Application Serial No. PCT/US2009/006284 mailed Jun. 7, 2010.
International Preliminary Report on Patentability for International Patent Application Serial No. PCT/US2009/006284 mailed Mar. 11, 2011.
Non Final Office Action for U.S. Appl. No. 10/354,673 mailed Dec. 15, 2004.
Final Office Action for U.S. Appl. No. 10/354,673 mailed Jul. 26, 2005.
Non Final Office Action for U.S. Appl. No. 10/354,673 mailed Aug. 30, 2006.
Non Final Office Action for U.S. Appl. No. 10/354,673 mailed Oct. 26, 2006.
Final Office Action for U.S. Appl. No. 10/354,673 mailed Aug. 13, 2007.
Requirement for Restriction/Election for U.S. Appl. No. 10/628,681 mailed May 11, 2006.
Non Final Office Action for U.S. Appl. No. 10/628,681 mailed Jan. 25, 2007.
Final Office Action for U.S. Appl. No. 10/628,681 mailed Oct. 4, 2007.
Non Final Office Action for U.S. Appl. No. 10/628,681 mailed Apr. 4, 2008.
Final Office Action for U.S. Appl. No. 10/628,681 mailed Dec. 4, 2008.
Non Final Office Action for U.S. Appl. No. 10/628,681 mailed May 12, 2009.
Final Office Action for U.S. Appl. No. 10/628,681 mailed Dec. 3, 2009.
Notice of Allowance for U.S. Appl. No. 10/628,681 mailed Apr. 5, 2010.
[No Author Listed] "Atomized." Merriam-Webster Online Dictionary. 2010. Available at http://www.merriam-webster.com/dictionary/atomized. Last accessed Jul. 26, 2010. 2 pages.
[No Author Listed] "Cantilever." Merriam-Webster Online Dictionary. 2010. Available at http://www.merriam-webster.com/dictionary/cantilever. Last accessed Jul. 19, 2010. 2 pages.
[No Author Listed] "Chapter 6. Defects," Unknown book, p. 339-424.
[No Author Listed] "Compliant." Merriam-Webster Online Dictionary. 2010. Available at http://www.merriam-webster.com/dictionary/compliant. Last accessed Jul. 16, 2010. 2 pages.
[No Author Listed] "Dimension." Merriam-Webster Online Dictionary. 2010. Available at http://www.merriam-webster.com/dictionary/dimension. Last accessed Jul. 14, 2010. 2 pages.
[No Author Listed] "Displacement." Merriam-Webster Online Dictionary. 2010. Available at http://www.merriam-webster.com/dictionary/discplacement. Last accessed Jul. 16, 2010. 2 pages.
[No Author Listed] "Hermetic." Merriam-Webster Online Dictionary. 2010. Available at http://www.merriam-webster.com/dictionary/hermetic. Last accessed Jul. 19, 2010. 2 pages.
[No Author Listed] "Infuse." Merriam-Webster Online Dictionary. 2010. Available at http://www.merriam-webster.com/dictionary/atomized. Last accessed Jul. 19, 2010. 2 pages.
[No Author Listed] "Interface." Merriam-Webster Online Dictionary. 2010. Available at http://www.merriam-webster.com/dictionary/interface. Last accessed Jul. 15, 2010. 2 pages.
[No. Author Listed] "Intervening." Merriam-Webster Online Dictionary. 2010. Available at http://www.merriam-webster.com/dictionary/intervening. Last accessed Jul. 19, 2010. 2 pages.
[No Author Listed] "Open-cell foam." McGraw-Hill Dictionary of Scientific and Technical Terms. 1974:1040.
[No Author Listed] "Percolating." Merriam-Webster Online Dictionary. 2010. Available at http://www.merriam-webster.com/dictionary/percolating. Last accessed Jul. 16, 2010. 2 pages.
[No Author Listed] "Polymerization." Merriam-Webster Online Dictionary. 2010. Available at http://www.merriam-webster.com/dictionary/polymerization. Last accessed Jul. 16, 2010. 2 pages.
[No Author Listed] "Rheological." Merriam-Webster Online Dictionary. 2010. Available at http://www.merriam-webster.com/dictionary/rheological. Last accessed Jul. 26, 2010. 2 pages.
[No Author Listed] "Settle." Merriam-Webster Online Dictionary. 2010. Available at http://www.merriam-webster.com/dictionary/settle. Last accessed Jul. 19, 2010. 2 pages.
[No Author Listed] "Thermoplastic." Merriam-Webster Online Dictionary. 2010. Available at http://www.merriam-webster.com/dictionary/thermoplastic. Last accessed Jul. 26, 2010. 2 pages.
[No Author Listed] "Viscosity." Merriam-Webster Online Dictionary. 2010. Available at http://www.merriam-webster.com/dictionary/viscosity. Last accessed Jul. 15, 2010. 2 pages.
Aleshin et al., Transport Properties of Poly (3,4-Ethylenedioxythiophene)/Poly (Styrenesulfonate). Synthetic Metals. 1998;94:173-77.
Allen et al., LI1+xFE1-xPO4: Electronically conductive Lithium Iron Phospho-olivines with Improved Electrochemical Performance. The Proceedings of The Electrochemical Society. 2003:197-205.
Arbizzani et al., Li1.01Mn1.97O4 surface modification by pol(3,4-ethylenedioxythiophene). J Power Sources. 119-121:695-700.
Arbizzani et al., Li1.03Mn1.97O4 Surface Modification by Poly (3,4-Ethylenedioxithiophene). Poster presented at 11th Intl. Meeting on Lithium Batteries. Monterey, CA. Jun. 23-28, 2002.
Armand et al., Poly-Ethers as Solid Electrolytes. Proceedings of the Intl. Conference on Fast Ion Transport in Solids, Electrodes and Electrolytes. Vashishta et al., eds. Lake Geneva, WI. 1979:131-36.
Bouridah et al., Poly(Dimethylsiloxane)-Poly(Ethylene Oxide) Based Polyurethane Networks Used as Electrolytes in Lithium Electrochemical Solid State Batteries. Solid State Ionics. 1985;15:233-40.
Broadhead et al., Chapter 2. Electrochemical Principles and Reactions. Handbook of Batteries. 1995:2.1-2.35.
Chen et al., Reducing Carbon in LiFePO4/C Composite Electrodes to Maximize Specific Energy, Volumetric Energy, and Tap Density. J Electrochem Soc. 2002;148(9):A1184-89.
Chiang et al., High Capacity, Temperature-Stable Lithium Aluminum Manganese Oxide Cathodes for Rechargeable Batteries. Electrochem and Solid-State Lett. 1999;2(3):107-10.
Cho et al., Self-Assembling Colloidal-Scale Devices: Selecting and Using Short-Range Surface Forces Between Conductive Solids. Adv Funct Matter. 2007;17:379-89.
Choi et al., Determination of electrochemical active area of porous $Li_{1-\delta}CoO_2$ electrode using the GITT technique. Solid State Ionics. 1998;109:159-63.
Darling et al., Modeling a Porous Intercalation Electrode with Two Characteristic Particle Sized. J Electrochem Soc. 1997;144:4201-08.
Darling et al., Modeling Side Reactions in Composite $Li_yMn_2O_4$ Electrodes. J Electrochem Soc. 1998;145:990-98.
Doyle et al., Analysis of capacity-rate data for lithium batteries using simplified models of the discharge process. J Appl Electrochem. 1997;27:846-56.
Doyle, Design and Simulation of Lithium Recharageable Batteris. Ph.D. Thesis. Unversity of California, Berkeley. 1995. 370 pages.
Doyle et al., Modeling of Galvanostatic Charge and Discharge of the Lithium/Polymer/Insertion Cell. J Electrochem Soc. 1993;140:1526-33.
Ehrlich, Chapter 35. Lithium-Ion Batteries. Handbook of Batteries. $3^{rd}$ ed. 2002:35.1.
Elliott, Physics of Amorphous Materials. Longman Group Limited. 1993. 200 pages.

(56) References Cited

OTHER PUBLICATIONS

French et al., Full Spectral Calculation of Non-Retarded Hamaker Constants for Ceramic Systems from Interband Transition Strengths. Solid State Ionics. 1995;75:13-33.

French, Origins and Applications of London Dispersion Forces and Hamaker Constants in Ceramics. J Am Ceram Soc. 2000;83(9):2117-46.

Fuller et al., Simulation and Optimization of the Dual Lithium Ion Insertion Cell. J Electrochem Soc. 1994;141:1-10.

Gaubicher et al., Li/β-VOPO4: A New 4 V System for Lithium Batteries. J Electrochem Soc. 1999;146(12):4375-79.

Ghosh et al., Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone). Adv Mater. 1998;10(14):1097-99.

Gray, Solid Polymer Electrolytes. VCH Publishers Inc. 1991: v-245.

Guyomard et al., Li Metal-Free Rechargeable LiMn$_2$O$_4$/Carbon Cells: Their Understanding and Optimization. J Electrochem Soc. 1992;139:937-48.

Hadziioannou et al., Monocristaus de 15opolymers trisequences styrene/isoprene/styrene presentant la structure cylindrique. Colloid Poly Sci. 257;4:413-419.

Hart et al., 3-D Microbatteries. Electrochemistry Communications. 2003 5:120.

Huang et al., Approaching Theoretical Capacity of LiFePO4 at Room Temperature at High Rates. Electrochem Solid-State Letts. 2001;4(10):A170-72.

Idota et al., Tin-Based Amorphous Oxide: A High-Capacity Lithium-Ion-Storage Material. Science. 1997;276:1395-97.

Kuwabata et al., Charge-Discharge Properties of Composites of LiMn2O4 and Polypyrole as Positive Electrode Materials for 4 V Class of Rechargeable Li Batteries. Electrochimica Acta. 1999;44:4593.

Le Cras Et al., Lithium intercalation in Li-Mg-Mn-O and Li-Al-Mn-O spinels. Solid State Ionics. 1996;89;203-13.

Li et al., Synthesis and properties of poly(2,5,8,11,14,17,20,23-octaoxapentacosyl methacrylate)-block-poly(4-vinylpyridine). Makromol Chem. 1991;192:3043-50.

Limthongkul et al., Nanocomposite Li-Ion Battery Anodes Produced by the Partial Reduction of Mixed Oxides. Chem Mat. 2001;13:2397-402.

Linden ed., Handbook of Batteries. Second Edition. McGraw-Hill, Inc. USA. 1995:2.19.

Long et al., Three-Dimensional Battery Architectures. Chem Rev. 2004;104:4463-92.

Matsumoto et al., Ionic Conductivity of Dual-Phase Polymer Electrolytes Comprise of MBR-SBR Latex Films Swollen with Lithium Slat Solutions. J Electrochem Soc. 1994;141(8):1989-93.

Matsumoto et al., Vaporization of Graphite in Plasma Arc and Identification of C60 in the Deposit. J Electrochem Soc. 1992;139(1):L8-L9.

Mazouzi et al., High capacity and excellent cyclability of Nano-Silicon/CB/CMC composite anode from tailored electrode preparation. 216$^{th}$ Electrochemical Society Meeting. 2009: Abstract #417.

Meredith et al., II. Conduction in Heterogeneous Systems. In: Advances in Electrochemistry and Electrochemical Engineering. Delahey et al., eds. John Wiley& Sons. New York. 1962;2:15-47.

Milling et al., Direct Measurement of Repulsive Van Der Waals Interactions Using an Atomic Force Microscope. J Colloid & Interface Science. 1996;180:460-65.

Minett et al, Polymeric Insertion Electrodes. Solid State Ionics. 1988;28-30:1192-96.

Nagaoka et al, High Ionic Conductivity in Poly(dimethyl Siloxane-co-Ethylene Oxide) Dissolving Lithium Perchlorate. J Polymer Sci. 1984;22:659-63.

Nagarajan et al., A Mathematical Model for Intercalation Electrode Behavior. I. Effect of Particle-Size Distribution on Discharge Capacity. J Electrochem Soc. 1998;145:771-79.

Neumann et al., Negative Hamaker Coefficients. Colloid & Polymer Science. 1979;257(4):414-19.

Newman, Chapter 22. Porous Electrodes. In: Electrochemical Systems. 2$^{nd}$ Edition. Prentice Hall. Englewood Cliffs, New Jersey. 1991:450-95.

Newman et al., Theoretical Analysis of Current Distribution in Porous Electrodes. J Electrochem Soc. 1962;109:1183-91.

Ohzuku et al., Synthesis and Characterization of LiAl1/4Ni3/4O2 (R3m) for Lithium-Ion (Shuttlecock) Batteries. J Electrochem Soc. 1995;142(12):4033.

Ong et al., Double-Layer Capapcitance in Dual Lithium Ion Insertion Cell. J Electrochem Soc. 1999;146:4360-65.

Padhi et al., Phospho-olivines as Positive-Electrod Materials for Rechargeable Lithium Batteries. J Electrochem Soc. 1997;144(4):1188-94.

Pals et al., Thermal Modeling of the Lithium/Polymer Battery. I. Discharge Behavior of a Single Cell. J Electrochem Soc. 1995;142:3274-81.

Pals et al., Thermal Modeling of the Lithium Polymer Battery. II. Temperature Profiles in a Cell Stack. J Electrochem Soc. 1995;142:3282-88.

Pierson, Chapter 6. Virteous Carbon. Handbook of Carbon, Graphite, Diamond and Fullerenes-Properties, Processing and Applications. 1993;122-40.

Ravet et al., Electroactivity of natural and synthetic triphylite. J Power Sci. 2001;97-98:503-07.

Ravet et al., Improved Iron Based Cathode Material. Abstract No. 127.

Reed et al., Introduction to the Principles of Ceramic Processing. 1988:86-89.

Tarascon et al., Issues and challenges facing rechargeable lithium batteries. Nature. Nov. 15, 2001;414(6861):359-67.

Tukamoto et al., Electronic Conductivity of LiCoO2 and its Enhancement by Magnesium Doping. J Electrochem Soc. 1997;144(9):3164-68.

Vaccaro et al., Electrochemical Investigations of Alkai-Metal Intercalation Reactions in TiS$_2$: Chronoamperometric Determination of Mass and Charge Transport Properties of Liquid Electrolyte Systems. J Electrochem Soc. 1982;129:682-88.

Van Oss et al., Applications of Net Repulsive Van Der Waals Forces Between Different Particles, Macromolecules or Biological Cells in Liquids. Colloids and Surfaces. 1980;1:45-56.

Van Oss et al., Comparison Between Antigen-Antibody Binding Energies and Interfacial Free Energies. Immunological Communications. 1977;6(4):341-54.

Van Oss et al., Repulsive Van Der Waals Forces. I. Complete Dissociation of Antigen-Antibody Complexes by Means of Negative Van Der Waals Forces. Immunological Communications. 1979;8(1):11-29.

Van Oss et al., Repulsive Van Der Waals Forces. II Mechanism of Hydrophobic Chromatography. Separation Science and Technology. 1979;14(4):305-17.

Wang et al., All Solid-State Li/LixMnO2 Polymer Battery Using Ceramic Modified Polymer Electrolytes. J Electrochemical Soc. 2002;149(8):A967-72.

Yamada et al., Crystal Chemistry of the Olivine-Type Li(MnyFe1-y)PO4 and (MNyFe1-y)PO4 as Possible 4 V Cathode Materials for Lithium Batteries. J Electrochem Soc. 2001;148(8):A960-67.

Yamada et al., Optimized LiFePO4 for Lithium Battery Cathodes. J Electrochem Soc. 2001;148(3):A224-29.

Zallen et al., 4.7. Continuum Percolation and the Critical Volume Fraction. The Physics of Amorphous Materials. J Wiley & Sons, NY. 1983:183-91.

Canadian Office Action for Application No. 2729504 mailed Mar. 27, 2012.

Notice of Last Preliminary Rejection for Application No. 10-2010-7024736 issued Apr. 20, 2012.

Notice of Final Rejection from Korean Patent Application No. 10-2011-7018116 issued Jul. 29, 2012.

Notice of Preliminary Rejection for Korean Patent Application No. 10-2011-7020519 issued Oct. 10, 2012.

Chinese Office Action for Application No. 200880100459.1 mailed Apr. 1, 2012.

Advisory Action for U.S. Appl. No. 12/839,155 mailed Apr. 4, 2012.

(56) References Cited

OTHER PUBLICATIONS

Non Final Office Action for U.S. Appl. No. 11/108,602 mailed Jan. 15, 2009.
Non Final Office Action for U.S. Appl. No. 12/692,460 mailed Jan. 31, 2012.
Final Office Action for U.S. Appl. No. 12/692,460 mailed Jul. 25, 2012.
Kamat et al., Self-assembled linear bundles of single wall carbon nanotubes and their alignment and deposition as a film in a dc field. J Am Chem Soc. Sep. 1, 2004;126(34):10757-62.
Kanamura et al., Electrophoretic Fabrication of Positive Electrodes for Rechargeable Lithium Batteries. Electrochem Solid-State Lett. Jun. 2000;3(6):259-262.
Canadian Office Action for Application No. 2729504 mailed Dec. 4, 2012.
Japanese Office Action for Application No. 2010-173173 mailed Jan. 4, 2013.
Chinese Office Action for Application No. CN 200880100459.1 mailed Mar. 5, 2013.
Chinese Office Action for CN 200980109947.3 mailed Jan. 28, 2013.
European Office Action for Application No. 09788703.8 mailed Feb. 14, 2013.
Non Final Office Action for U.S. Appl. No. 13/472,351 mailed Jan. 4, 2013.
Non-Final Office Action for U.S. Appl. No. 13/549,064 mailed Mar. 13, 2013.
Yan et al., Study progress in crystal structure and energy of LiCoO2. Chinese Journal of Power Sources. Mar. 2005; 29(3):187-92. Chinese.
Canadian Office Action for Application No. 2729504 mailed Sep. 12, 2013.
Japanese Office Action for Application No. JP 2011-156139 mailed Jun. 24, 2013.
Korean Notice of Last Preliminary Rejection for Application No. KR 10-2011-7020519 mailed Aug. 19, 2013.
Non-Final Office Action for U.S. Appl. No. 12/866,966 mailed Aug. 9, 2013.

\* cited by examiner 2.91mm³

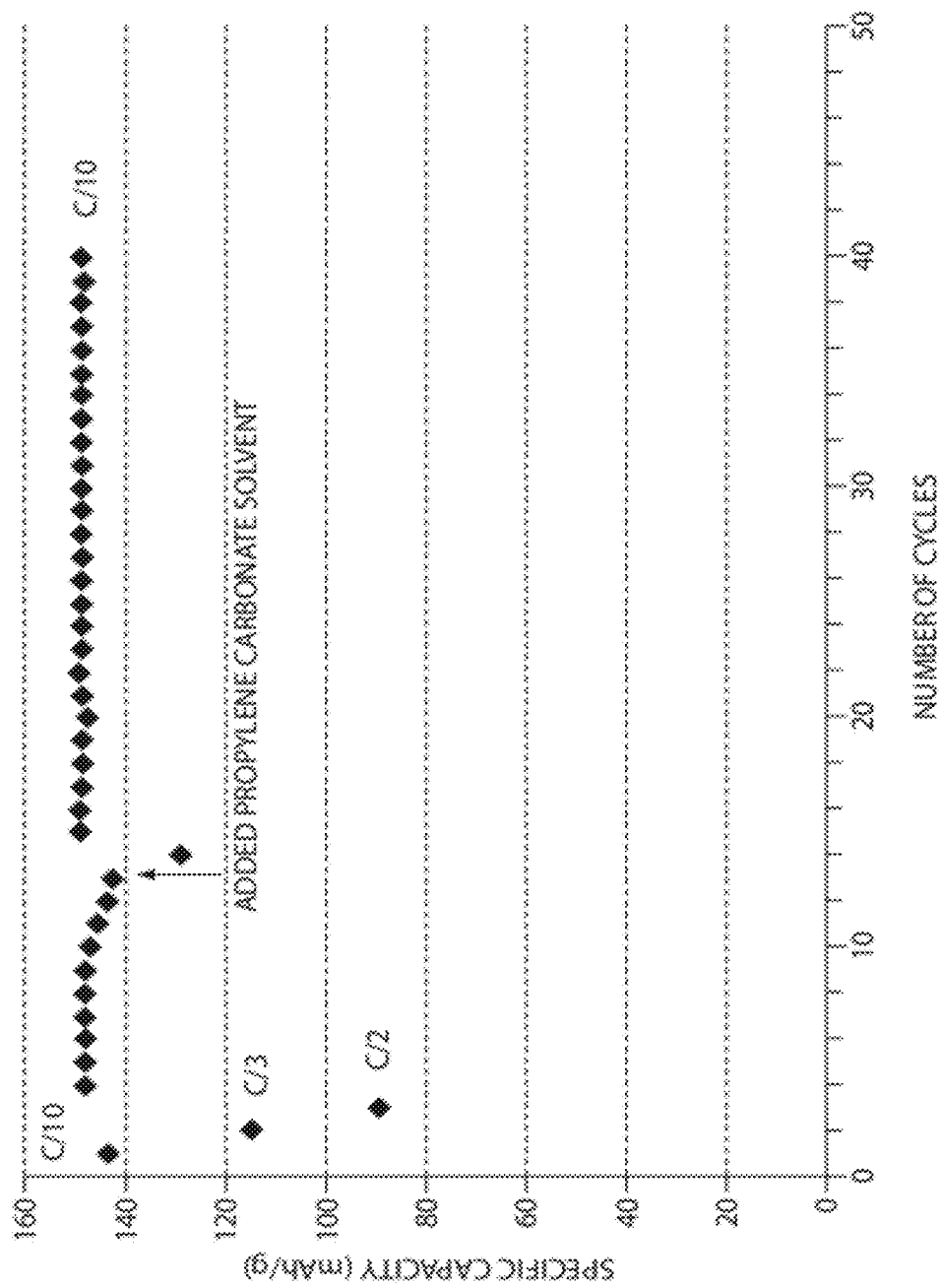

BATTERIES AND ELECTRODES FOR USE THEREOF

RELATED APPLICATIONS

This application is a continuation of U.S. patent application Ser. No. 12/323,983, filed Nov. 26, 2008, entitled "Batteries and Electrodes For Use Thereof," by Chiang, et al., which application is a continuation-in-part of U.S. patent application Ser. No. 12/126,841, filed May 23, 2008, entitled "Batteries and Electrodes For Use Thereof," by Chiang, et al., which application claims the benefit of U.S. Provisional Patent Application Ser. No. 60/931,819, filed May 25, 2007, by Chiang, et al., each incorporated herein by reference.

GOVERNMENT FUNDING

This invention was made with government support under Grant No. NMA501-03-1-2004, awarded by the U.S. Department of Defense. The government has certain rights in this invention.

FIELD OF INVENTION

The present invention generally relates to batteries or other electrochemical devices, and systems and materials for use in these, including novel electrode materials and designs. In some embodiments, the present invention relates to small-scale batteries or microbatteries.

BACKGROUND

Since the time of Volta, batteries and other electrochemical devices have been fabricated by the manual assembly of critical components. The advent of distributed and autonomous electronics requiring very small and high energy density power sources, as well as continuing demand in larger batteries for low cost energy and power, has created a need for entirely new designs and fabrication approaches for batteries and the like. Current devices range in length from micrometer-thick thin film batteries, to lithium rechargeable batteries based on wound laminate films, to the macroassemblies used in common alkaline and lead-acid batteries. However, the laminated construction techniques of current high energy density batteries (e.g., lithium ion batteries), now approaching their engineering limits, have inefficient mass and volume utilization, with only 30% to 40% of the available device volume being used for ion storage. Attempts to increase power density, for instance by using thinner electrodes, typically has come at the expense of energy density. Furthermore, as the size scale of powered devices continues to shrink, there is a growing need for distributed high energy density power sources of comparable size scale.

SUMMARY OF THE INVENTION

The present invention generally relates to batteries or other electrochemical devices, and systems and materials for use in these, including novel electrode materials and designs. In some embodiments, the present invention relates to small-scale batteries or microbatteries. The subject matter of the present invention involves, in some cases, interrelated products, alternative solutions to a particular problem, and/or a plurality of different uses of one or more systems and/or articles.

In one aspect, the invention is directed to an article. In one set of embodiments, the article includes a battery comprising an entire anode, an electrolyte, and an entire cathode, where the battery has a volume of no more than about 5 mm$^3$ or about 10 mm$^3$ and an energy density of at least about 200 W h/l or at least about 400 W h/l. In another set of embodiments, the article includes a rechargeable battery having an energy density of at least about 1000 W h/l.

The article, in yet another set of embodiments, includes an electrode formed from a sintered ceramic and/or a ceramic composite, where the electrode has a porosity of no more than about 50%. In some cases, at least some of the pores of the electrode are filled with an electrolyte that is a liquid, a gel, a solid polymer, and/or a solid inorganic compound. In still another set of embodiments, the article includes an electrode formed from a sintered ceramic and/or a ceramic composite that is able to retain at least about 50% of its initial storage capacity after at least 6 charge-discharge cycles at a C/20 rate.

In one set of embodiments, the sintered electrode has a thickness of between 100 microns and 2000 microns and a porosity between 10% and 70% by volume, and more preferably a thickness between 300 microns and 1000 microns and porosity between 15% and 50% by volume.

In yet another set of embodiments, the article includes a electrode formed from a sintered ceramic or ceramic composite. The compound or compounds of the electrode may have, in some cases, a molar volume difference between the charged and discharged state of the cell of less than about 30%, less than about 15%, less than about 10%, or less than about 5%. In some embodiments the compound or compounds of the electrode has a linear or a volumetric strain between the charged and discharged state of the cell of less than about 20%, less than about 15%, less than about 10%, less than about 5%, less than about 3%, less than about 2%, or less than about 1%. In some embodiments, the compounds of the electrode include at least one compound that increases in molar volume at least some compositions during use and at least one compound that decreases in molar volume at at least some compositions during use. In some embodiments, the net volume change of the electrode between the charged and discharged state of the battery is decreased by combining at least one compound that has a net positive volume change between the charged and discharged state, with at least one compound that has a net negative volume change between the charged and discharged state of the battery.

In one set of embodiments, the article includes an electrode formed from a sintered ceramic and/or a ceramic composite. The electrode may be micromachined in some cases. In some embodiments, the ceramic comprises a lithium metal oxide $LiMO_2$ where M is at least one transition metal, or a lithium transition metal phosphate olivine. In some embodiments, the sintered ceramic is $LiCoO_2$ and/or $LiFePO_4$. In certain instances, the ceramic comprises $Li_x(Ni_a, Co_b, Al_c)O_2$, wherein x is between about 0 and about 1.5, and the sum of a, b, and c is about 1. In another set of embodiments, the article includes a micromachined electrode formed from a porous sintered ceramic and/or a ceramic composite. In yet another set of embodiments, the article includes a micromachined electrode formed from a sintered ceramic and/or a ceramic composite, where the ceramic has a linear or a volumetric strain differential of less than about 20%, less than about 10%, less than about 3%, or less than about 2%.

The article, according to another set of embodiments, includes an electrode having a base and a plurality of protrusions extending at least about 50 micrometers away from the base of the electrode, where at least some of the protrusions comprises $LiCoO_2$, and where substantially all of the protrusions have a surface and a bulk and being sized such that substantially all of the bulk is no more than about 25 micrometers away from the surface. The electrode may be nonporous (dense) or porous. In some cases, the article may also include a nonporous electrolyte disposed on the surfaces of the protrusions. In another embodiment, at least some of the protrusions comprises $Li_x(Ni_a, Co_b, Al_c)O_2$ or $Li_x(Mn_a, Ni_b, Co_c)O_2$, wherein x is between about 0 and about 1.5, and the sum of a, b, and c is about 1.

According to yet another set of embodiments, the article includes an electrode comprising a base and a plurality of protrusions extending from the base, and a wall extending from the base and surrounding the plurality of protrusions. In some cases, the protrusions and the wall are formed from a unitary material. In another set of embodiments, the article includes an electrode comprising, on one surface, a plurality of protrusions and a wall surrounding the plurality of protrusions. In some cases, the electrode can be formed using laser micromachining.

According to yet another set of embodiments, the article includes a battery that comprises only solid phases. In another set of embodiments, the article includes a battery that comprises a liquid electrolyte. In another set of embodiments, the article includes a battery that comprises both a solid electrolyte and a liquid electrolyte.

In one set of embodiments, the article includes an electrode having a plurality of protrusions. In some cases, the protrusions have an aspect ratio of at least about 3:1 and a pitch of at least about 2:1. In one embodiment, the electrode is formed using laser micromachining. In another embodiment, the electrode is formed from a unitary material.

According to another set of embodiments, the article includes a lithium metal electrode, a nonporous electrolyte contacting the lithium metal electrode, and a porous sintered electrode contacting the lithium metal electrode.

In one set of embodiments, the article includes an electrode formed from a sintered ceramic or a ceramic composite. In certain cases, the electrode has a density of at least about 50%, a thickness of at least about 0.25 mm. In another set of embodiments, the electrode has a density that is at least about 50% of the theoretical density of the ceramic, and a thickness of at least about 0.25 mm. In yet another set of embodiments, the electrode has an open porosity of no more than about 50%, and a thickness of at least about 0.25 mm.

In one embodiment, the invention is directed to an electrode formed from a sintered ceramic and/or a ceramic composite. The electrode can have a product of density, where density is measured in percent of the theoretical density of the ceramic, and thickness, where thickness is measured in millimeters, of between about 10%-mm and about 150%-mm. In another embodiment, the electrode can have a product of porosity and thickness, e.g., having a product that is between 150%-mm and 2.5%-mm.

The article, in another set of embodiments, is directed to an electrode formed from a sintered ceramic and/or a ceramic composite. The article may have, in one embodiment, an electrode having a charge capacity per unit area of electrode of between about 10 mAh/cm² and about 100 mAh/cm².

Another aspect of the invention is drawn to a method. In one set of embodiments, the method includes an act of fabricating an electrode from a unitary material. In some cases, the electrode comprises, on one surface, a plurality of protrusions and a wall surrounding the plurality of protrusions.

In another set of embodiments, the method includes acts of providing a Li-containing substrate that Li metal will not wet, depositing a metal layer on the substrate, and adding Li metal to the metal layer. In some cases, the Li reacts with the metal layer to wet the surface.

In another aspect, the present invention is directed to a method of making one or more of the embodiments described herein, for example, a small-scale battery or a or microbattery. In another aspect, the present invention is directed to a method of using one or more of the embodiments described herein, for example, a small-scale battery or a microbattery.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 17A-17B show the specific capacity measured by galvanostatic cycling over 40 cycles of a sintered doped olivine phosphate cathode produced in accordance with one embodiment of the invention;

DETAILED DESCRIPTION

Figure 1A:
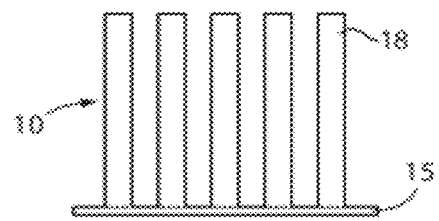
FIGS. 1A-1D illustrate electrodes having protrusions, according to one embodiment of the invention.

The present invention generally relates to batteries or other electrochemical devices, and systems and materials for use in these, including novel electrode materials and designs. In some embodiments, the present invention relates to small-scale batteries or microbatteries. For example, in one aspect of the invention, a battery may have a volume of no more than about 5 mm$^3$ or about 10 mm$^3$, while having an energy density of at least about 200 W h/l or at least about 400 W h/l. In some cases, the battery may include a electrode comprising a porous electroactive compound, for example, LiCoO$_2$, which may be formed, in some cases, by a process including but not limited to sintering of a particle compact. In some embodiments, the pores of the porous electrode may be at least partially filled with a liquid such as a liquid electrolyte comprising alkyl carbonates and/or a lithium salt such as LiPF$_6$, a polymer such as a polymer electrolyte comprising polyethylene oxide and/or a lithium salt, a block copolymer lithium-conducting electrolyte, and/or an inorganic electrolyte such as a lithium phosphorus oxynitride compound, lithium iodide, and the like. The electrode may be able to withstand repeated charging and discharging. In some cases, the electrode may have a plurality of protrusions and/or a wall (which may surround the protrusions, if present); however, in other cases, there may be no protrusions or walls present. The electrode may be formed from a unitary material, e.g., formed using laser micromachining, dry etching processes such as plasma or reactive ion etching, wet chemical etching, or similar techniques. In some instances, the electrode may be formed in a desired shape from a powder or powder suspension using methods such as tape-casting, interrupted tape-casting, slip-casting, pressing, and embossing, and may be fired to obtain a sintered material after forming. In certain embodiments, a nonporous electrolyte, such as lithium phosphorus oxynitride, a polymer electrolyte such as one based on polyethylene oxide and/or a lithium salt, a block-copolymer lithium conducting electrolyte, and/or a polyelectrolyte multilayer film (which may be formed by a layer-by-layer deposition process) may be disposed onto the electrode. Such an electrolyte may allow ionic transport (e.g., of lithium ions) while preventing dendritic formation due to the lack of pores. In certain embodiments the porous electrode has a surface that is denser than its interior. The denser surface may be formed by laser processing, rapid thermal annealing, formation of a surface layer with a higher powder particle packing density prior to sintering, filling of the surface with finer particles, application of a surface coating by a vapor phase deposition or a sol-gel coating process, or other such methods. Other aspects of the invention are directed to techniques of making such electrodes or batteries, techniques of forming electrical connections to and packaging such batteries, techniques of using such electrodes or batteries, or the like.

Various aspects of the invention are directed to batteries or other electrochemical devices. Generally, a battery includes an anode, a cathode, and an electrolyte separating the anode and the cathode. Current collectors may be electrically connected to the anode and the cathode, and current drawn from the battery using the current collectors. Typically, current is produced by the battery when the current collectors are put into electrical communication with each other, e.g., through a load, such as a light, a motor, an electrical circuit, a sensor, a transmitter, an electrical device, etc. Within the battery, ions flow through the electrolyte between the anode and the cathode during discharge. The electrolyte may be a solid, a liquid, a gel, or the like, and the electrolyte may be organic, inorganic, or a combination. In one aspect of the invention, the battery is a Li ion (Li$^+$) battery, i.e., the battery uses Li$^+$ as a charge carrier (alone, or in conjunction with other charge carriers) within the electrolyte.

In some embodiments, the battery is "dry," meaning that it is substantially free of liquid or gel components. In other embodiments, however, the battery includes one or more liquid or gel electrolytes, which may fill or partially fill the interior of the battery cell. In some embodiments, the battery includes both solid and liquid electrolytes. For instance, in some cases, the solid electrolyte can be used as a conformal film coating the surface of an electrode, and/or as a separator between the electrodes.

In some cases, the battery is disposable after being discharged once. In other cases, however, the battery is rechargeable, i.e., the battery can be charged and discharged more than once. For example, the battery may be able to withstand at least 3 cycles, at least 6 cycles, or at least 10 cycles of charging and discharging (for example at a C/20 rate, where 1 C=280 mA/g) with a retention of its initial storage capacity (e.g., as measured in W h) of at least about 50%, at least about 60%, at least about 70%, at least about 75%, at least about 80%, at least about 85%, at least about 90%, or at least about 95% relative to the initial charge of the battery after its first full charging. In some cases, the battery can withstand even greater numbers of cycles, e.g., at least 20 cycles, at least 30 cycles, at least 40 cycles, at least 50 cycles, at least 60 cycles, etc. Examples of batteries exhibiting such cycles are discussed in the examples, below. In addition, in some cases, the battery may exhibit such charging cycles, even under more rapid charging or discharging conditions. For instance, the battery may be charged or discharged at C/50, C/25, C/15, C/10, C/5, C/3, C/2, C, 2C, or 3C rates for at least the numbers of cycles discussed above ("C-rates" of charging or discharging). A rechargeable lithium battery typically has electrodes that exchange lithium during charge and discharge. For a cathode or positive electrode material, $Li^+$ and electrons are adsorbed during the discharge of the battery, and this process is reversed during the charge. Though the present invention is not limited to cathodes, as used herein, "charging" indicates lithium removal from the positive electrode and "discharging" refers to lithium insertion into the positive electrode.

In some embodiments of the present invention, the battery is a "microbattery," i.e., a battery having a volume of less than about 10 $mm^3$, including the entire anode, cathode, electrolyte, current collectors, and exterior packaging that form the battery. In some cases, the volume of the battery may be less than about 5 $mm^3$, less than about 3 $mm^3$, or less than about 1 $mm^3$. For example, the battery may be generally cube-shaped, having dimensions of less than about 3 mm, less than about 2.5 mm, less than about 2 mm, less than about 1.5 mm, or less than about 1 mm on each side. Of course, other shapes are also possible, for example, rectangular parallelepiped, disc, rod, plate, or spherical shapes, in other embodiments of the invention. In some embodiments of the invention, the battery may contain an electrode having a smallest dimension of at least about 0.2 mm, and in some cases, at least about 0.4 mm, at least about 0.6 mm, at least about 0.8 mm, at least about 1.0 mm, at least about 1.5 mm, or at least about 2.0 mm.

In some embodiments, the battery may have a volume, mass, energy, and/or power suitable for use in portable electronic devices such as wireless headsets (e.g., Bluetooth), cellular telephones, laptop computers, cordless power tools or other appliances, vehicles, backup power systems, or in large scale energy storage systems.

In one set of embodiments, the battery has an energy density of at least about 200 W h/l, i.e., the battery is able to produce 200 W h of energy for each liter of volume of the battery (including the entire anode, cathode, and electrolyte forming the battery). In some embodiments, even higher energy densities can be obtained, for instance, at least about 300 W h/l, at least about 400 W h/l, at least about 800 W h/l, at least about 1000 W h/l, at least about 1200 W h/l, at least about 1400 W h/l, or at least about 1600 W h/l. In other such embodiments, such energy densities can be obtained even when the current collector and packaging of the cell are included in the battery volume.

In one aspect of the present invention, such energy densities may be achieved by using a cathode having a shape such that substantially all of the cathode may be able to participate in lithium ion exchange, e.g., with the electrolyte during charge or discharge. For instance, in some embodiments, the electrode has a shape that allows a relatively high degree of exposure between the electrode and the electrolyte contacting the electrode, and/or a relatively thin cross-sectional dimension, which may facilitate transport of ions into and out of the electrode. In one set of embodiments, the electrode may have the form of a base and a plurality of protrusions, for instance, as is shown in FIG. 1A in side view. In this figure, an electrode 10 includes a base 15, and a plurality of protrusions 18 that extend away from the surface of the base. As used herein, the base of the electrode is defined as a generally flat, contiguous, featureless surface, and the protrusions are defined a series of extensions that each extend away from the base, although the base and the protrusions; in some embodiments are made from a unitary material, as discussed below.

As shown in FIG. 1, the protrusions are each shown as being generally rectangular; however, in other embodiments, the protrusions may be cylindrical, cone shaped, irregular, rectangular, pyramidal, etc., and may be distributed on the surface of the base in any manner, e.g., regularly or randomly arranged, etc. The protrusions on the base may each be substantially the same shape and/or size, as is shown in FIG. 1A, or the protrusions may have different sizes.

Figure 1B:
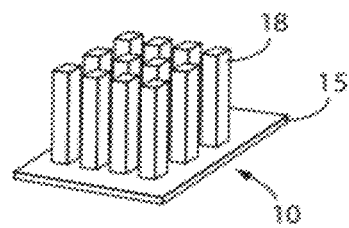
Figure 1C:
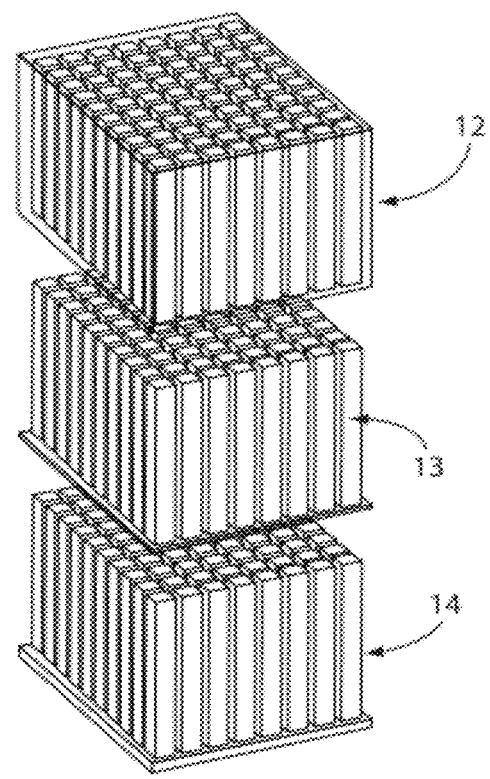
Figure 1D:
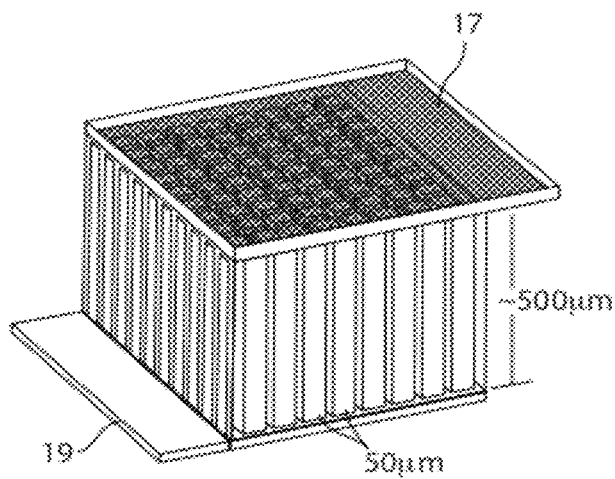

FIG. 1B shows an example of one electrode having a two-dimensional array of protrusions. In this figure, the cross-sections of the protrusions are generally square, although in other embodiments, other shapes are possible, e.g., rectangles or circles. FIGS. 1C and 1D shows a battery that includes such two-dimensional arrays of protrusions, used as a cathode and an anode, in exploded view (FIG. 1C), and when assembled (FIG. 1D), including top and bottom current collectors, in electrical communication with the anode and cathode, respectively. In FIG. 1C, battery 20 includes an anode 12, a cathode 14, and an electrolyte 13. In FIG. 1D, the battery is shown assembled, with a top current collector 17 in electrical communication with anode 12, and a bottom current collector 19 in electrical communication with cathode 14. Additionally, in FIG. 1D, as a non-limiting example, dimensions of a microbattery that could be formed using such electrodes are illustrated.

Figure 2A:
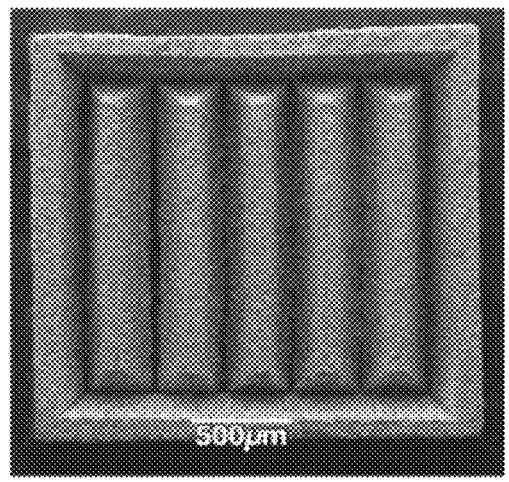
FIGS. 2A-2C are photomicrographs of an embodiment of the invention, illustrating an electrode having ribs.
Figure 2B:
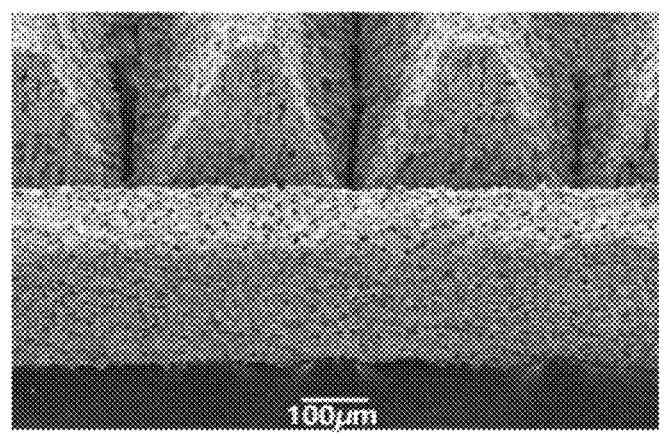
Figure 2C:
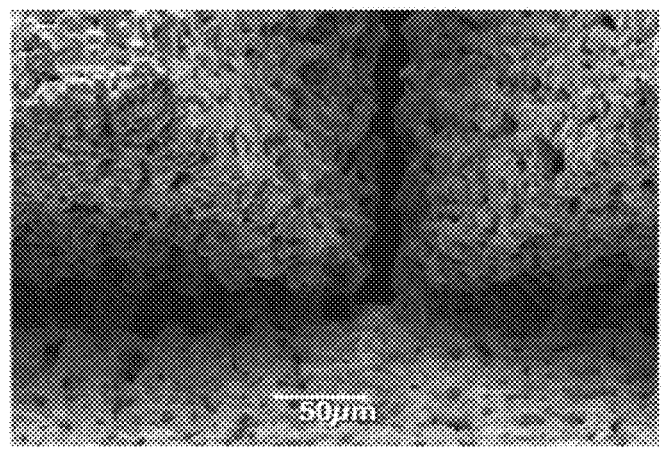

However, in some cases, the protrusions extend along one dimension of the electrode, thereby giving the appearance of "ribs," that, when viewed in cross-section, has an appearance similar to that shown in FIG. 1A. An example of an electrode having such a series of extended protrusions is shown in FIG. 2A-2C at different magnifications. The electrode in this example was laser-machined from a porous sintered $LiCoO_2$ material, although other materials and other forming processes can also be used.

In some embodiments, the protrusions may extend a distance of at least about 25 micrometers away from the base of the electrode, i.e., the maximum separation of the end of the protrusion away from the surface of the base of the electrode is about 25 micrometers. In other cases, the protrusions may extend a distance of at least about 50 micrometers, at least about 75 micrometers, at least about 100 micrometers, etc., away from the base of the electrode. As mentioned above, not all of the protrusions may extend the same difference away from the surface of the base. In some cases, the protrusion may have an aspect ratio (i.e., the ratio of the distance the protrusion extends away from the base to the maximum thickness of the protrusion) of at least about 3:1, and in some cases, at least about 5:1, at least about 10:1, at least about 15:1, at least about 20:1, etc.

Figure 3:
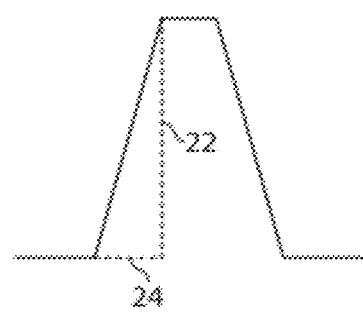
FIG. 3 illustrates a sloped protrusion, in accordance with one embodiment of the invention.
Figure 4A:
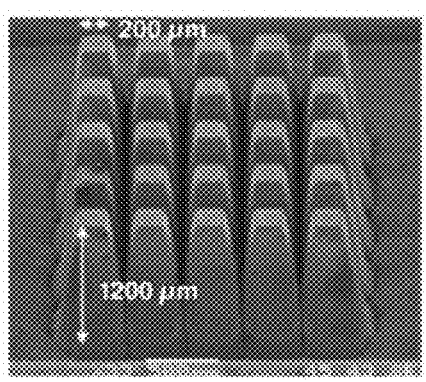
FIGS. 4A-4C are photomicrographs of various embodiments of the invention having sloped protrusions.
Figure 4B:
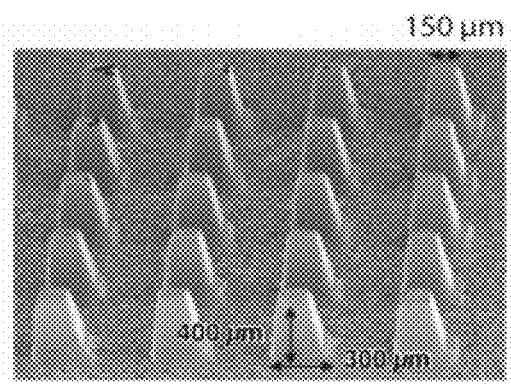
Figure 4C:
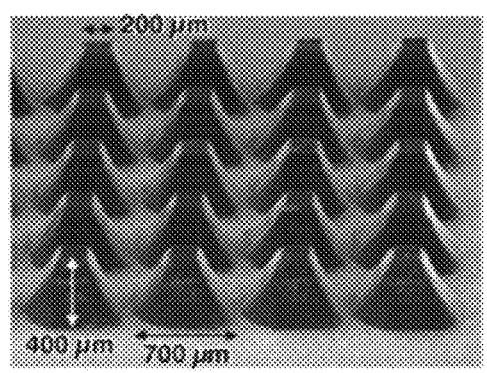

In some cases, the protrusions have sloped sides, i.e., sides that are not orthogonal to the surface of the base. For example, a protrusion may have a pitch of at least about 2:1, and in some embodiments, the pitch may be at least about 3:1, at least about 5:1, or at least about 10:1. The "pitch" of a protrusion, as used herein, is the slope of the protrusion, or the ratio of its "rise" to "run." The sides of the protrusion need not all have the same pitch. As shown in FIG. 3, a protrusion may have sloped sides, and the pitch is the ratio of the rise of the slope 22 of the protrusion to its run 24. Photomicrographs of such sloped protrusions are shown in FIGS. 4A-4C. FIG. 4A shows sloped protrusions formed from polycrystalline graphite; FIG. 4B shows sloped protrusions formed from polygraphite on alumina, and FIG. 4C shows sloped protrusions formed from HOPG (highly ordered pyrolytic graphite) on alumina.

Materials that can be used to form the electrode and/or the protrusions are discussed in detail below.

In some cases, the protrusions may have a shape and/or size such that the protrusion, or at least a substantial fraction of the protrusion, is not more than a certain distance away from the surface of the protrusion. Such a protrusion, for example, may offer a limited distance for Li ions to be transported within the electrode before reaching the surface or the electrolyte, and thus, in some cases, substantially all of the protrusion may participate in Li ion exchange during charging or discharging of the electrode, thereby increasing the efficiency and/or the power density of the electrode. For instance, a protrusion may have a surface and a bulk, where the protrusion has a shape and/or size such that substantially all of the bulk is no more than about 5 micrometers, about 10 micrometers, about 15 micrometers, about 20 micrometers, about 25 micrometers, about 50 micrometers, about 75 micrometers, or about 100 micrometers away from the surface of the protrusion.

Figure 5A:
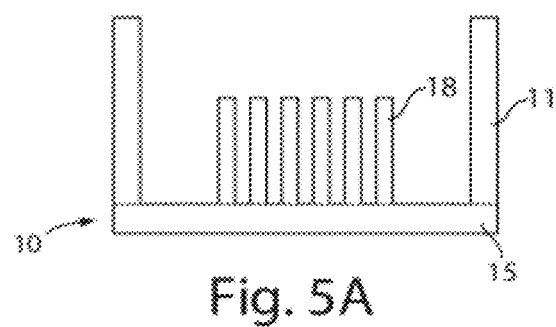
FIGS. 5A-5B illustrate electrodes having walls, according to another embodiment of the invention.
Figure 5B:
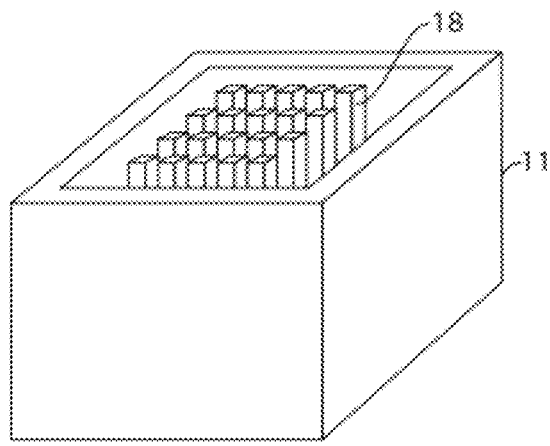
Figure 6A:
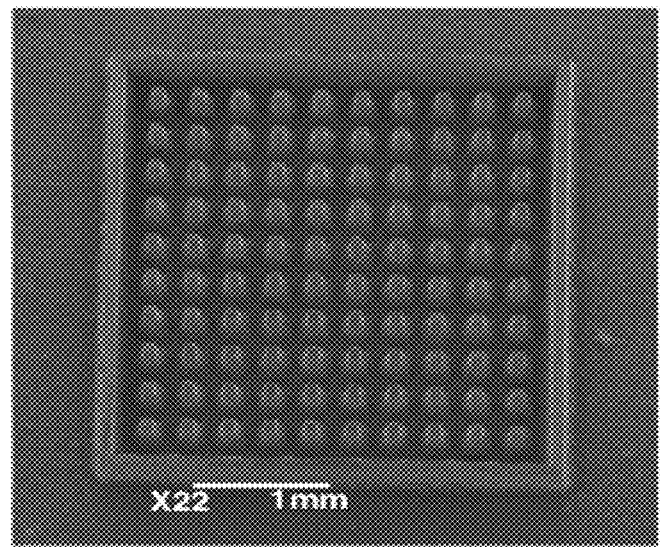
FIGS. 6A-6E are photomicrographs of various embodiments of the invention, illustrating electrodes having walls.
Figure 6B:
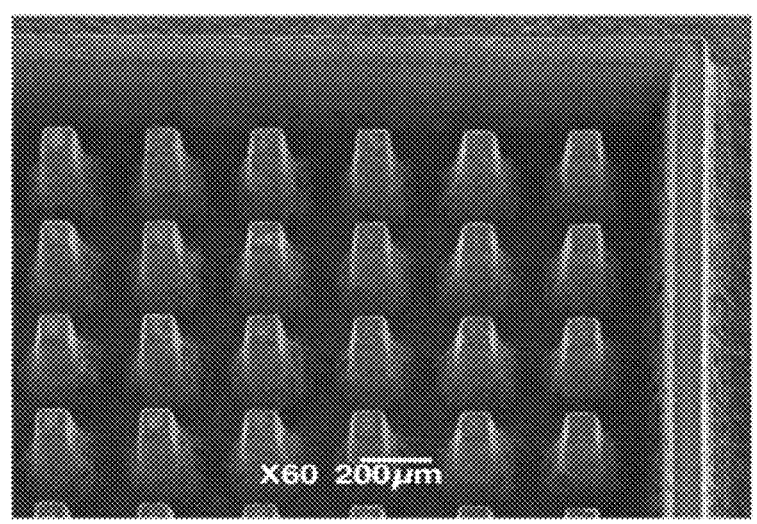
Figure 6C:
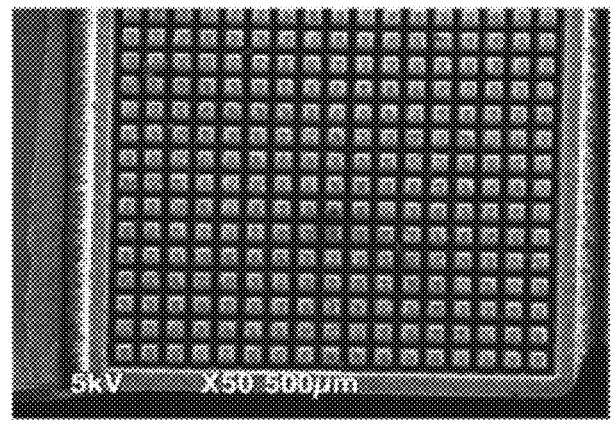
Figure 6D:
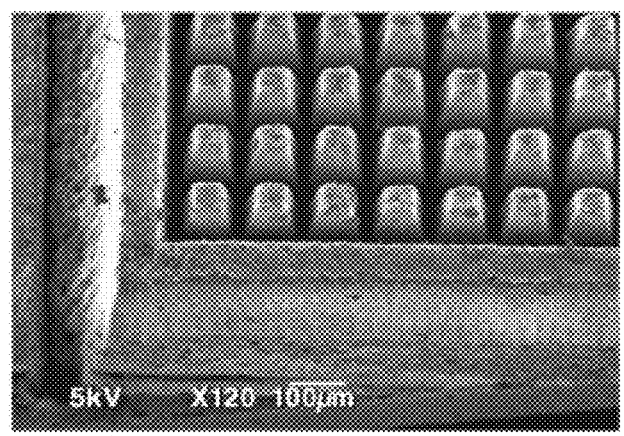
Figure 6E:
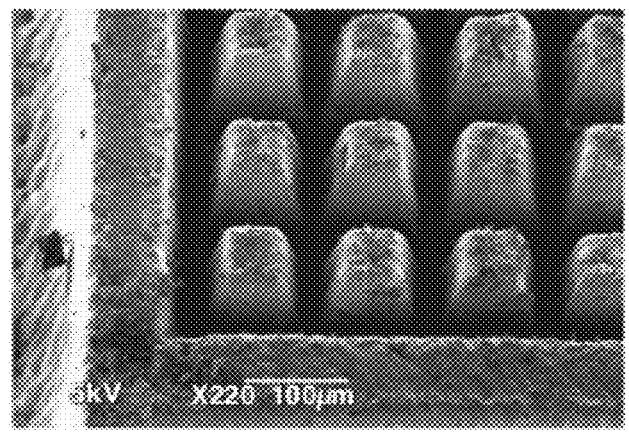
Figure 7A:
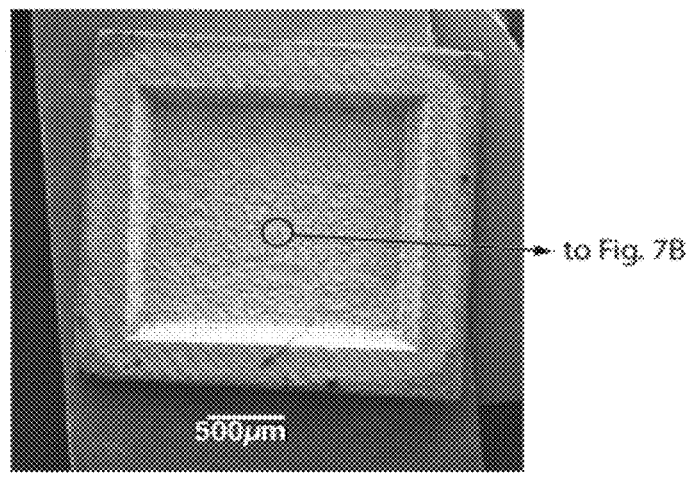
FIGS. 7A-7D are photomicrographs of another embodiment of the invention, illustrating an electrode having walls.
Figure 7B:
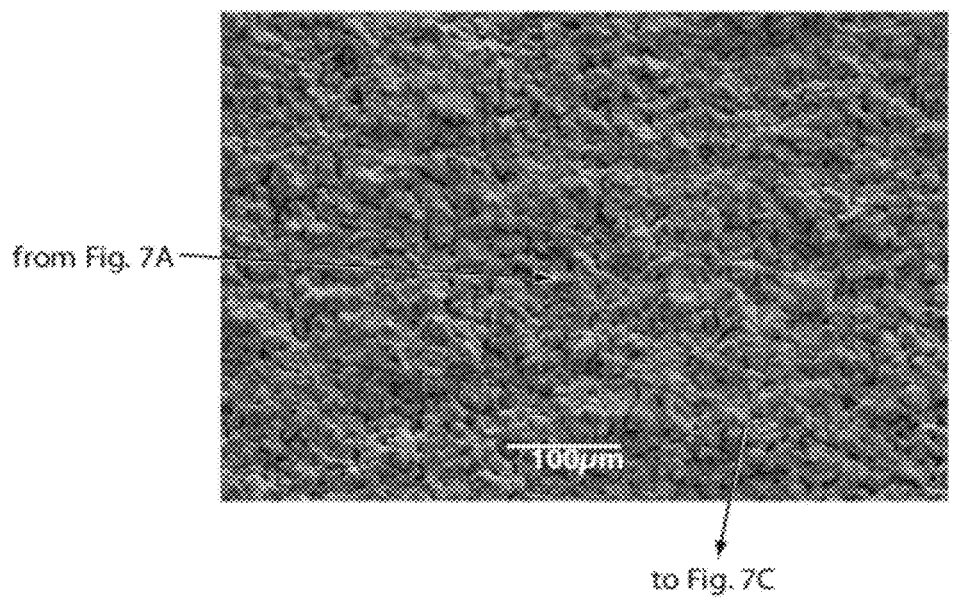
Figure 7C:
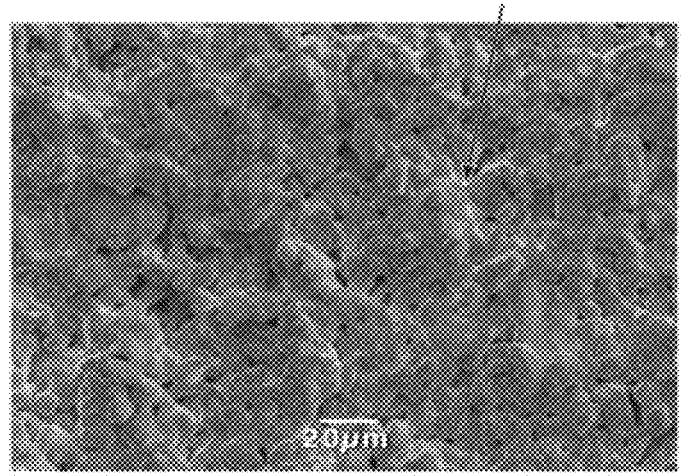
Figure 7D:
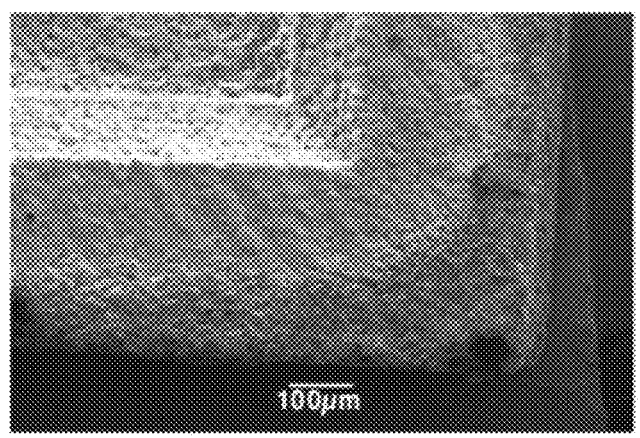

In certain embodiments, the protrusions on the base of the electrode may be at least partially surrounded by a wall or a "can." For example, as is shown in FIG. 5A in cross section, electrode 10 includes a base 15, a plurality of protrusions 18 that extend away from the surface of the base, and a wall 11 surrounding the protrusions. A three-dimensional view can be seen in FIG. 5B, and photomicrographs of such electrodes are shown in FIGS. 6A-6E. In FIGS. 6A and 6B, the height of the walls and the protrusion is about 0.5 mm, and the width of the protrusions is about 100 micrometers. In FIGS. 6C-6E, the protrusions have a 100 micrometer pitch, and a feature width of 80 micrometers. The walls, as shown in this example, have a square or rectangular arrangement, but in other embodiments, other shapes are possible, for example, circular, hexagonal, triangular, etc.

The wall may be same thickness as the protrusions, or of a different thickness. For instance, the wall may have a thickness of less than about 200 micrometers, less than about 175 micrometers, less than about 150 micrometers, less than about 125 micrometers, less than about 100 micrometers, less than about 75 micrometers, less than about 50 micrometers, or less than about 25 micrometers, and the wall thickness may be uniform or non-uniform. The wall may also be orthogonal to the base, or in some cases, the wall may have sloped or tapered sides. A non-limiting example of an electrode having a tapered wall is shown in FIGS. 7A-7D. In addition, as can be seen in FIGS. 7A-7D, an electrode may have a wall on the base without necessarily having any protrusions, in certain embodiments of the invention.

The wall may, in certain embodiments of the invention, be useful to contain an electrolyte and/or other materials within the electrode, i.e., such that it remains in contact with the protrusions of the electrode. The wall may also protect the protrusion from external factors, for example, from forces that might cause the protrusions to deform or break. In some cases, the wall may facilitate the construction of integrated electrode arrays, for example, for microbattery applications. In some cases, as discussed below, the wall is formed, along with the base and optionally the protrusions, from a unitary material. By forming the wall and the base from a unitary material, an airtight or hermetic seal between the wall and the base is naturally formed, which prevents leakage to or from the battery, e.g., leaking of the electrolyte contained within the electrode. In one set of embodiments, the walls and the protrusions are micromachined from a unitary ceramic material, as is discussed in detail below.

Figure 8A:
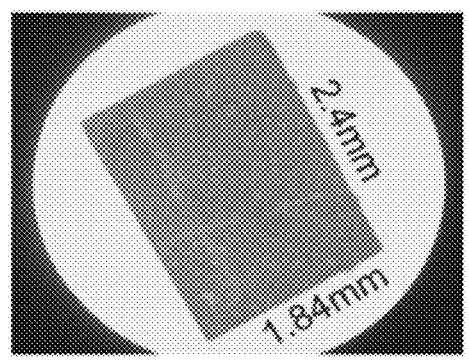
FIGS. 8A-8B are photomicrographs of yet another embodiment of the invention, illustrating electrodes having substantially planar surfaces.
Figure 8B:
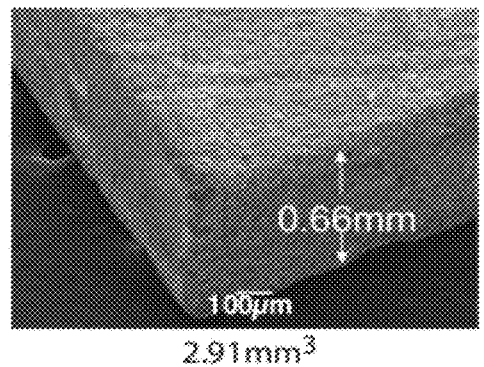

It should be noted here that not all embodiments of the present invention necessarily must include protrusions and/or walls. For example, in some embodiments, the electrode has a substantially planar surface, e.g., as is shown in FIGS. 8A and 8B for an example of an electrode formed in a monolithic shape from sintered $LiCoO_2$, and having a density of about 85%. Thus, according to another aspect of the invention, relatively high energy densities may be achieved, regardless of the shape of the electrode (i.e., whether or not the electrode is planar or has protrusions, walls, or the like), due to the porosity of the electrode. In some cases, as discussed below, due to the electrolyte-filled porosity of the electrode, substantially all of the electrode may be able to participate in Li ion exchange, e.g., with the electrolyte during charge or discharge.

In some cases, the electrode may have a smallest dimension (which may be the base or a protrusion) that is at least about 0.2 mm, and in some cases, at least about 0.25 mm, at least about 0.3 mm, at least about 0.4 mm, at least about 0.6 mm, at least about 0.8 mm, at least about 1.0 mm, at least about 1.5 mm, or at least about 2.0 mm.

As used herein, "porous" means containing a plurality of openings; this definition includes both regular and irregular openings, as well as openings that generally extend all the way through a structure as well as those that do not (e.g., interconnected, or "open" pores, as opposed to at least partially non-connected, or "closed" pores). The porous electrode may have any suitable porosity. For example, the porous electrode may have a porosity of up to about 15%, up to about 20%, up to about 25%, up to about 30%, up to about 40%, or up to about 50% (where the percentages indicate void volume within the electrode). Equivalently, the porous electrode may have a density of at least about 50%, and up to about 70%, up to about 75%, up to about 80%, up to about 85%, up to about 90%, or up to about 95%, where the density is the amount of non-void volume present within the electrode material. In some cases, the porous electrode may have an average pore size of less than about 300 micrometers, for example, less than about 100 micrometers, between about 1 micrometer and about 300 micrometers, between about 50 micrometers and about 200 micrometers, or between about 100 micrometers and about 200 micrometers. The average pore size may be determined, for example, from density measurements, from optical and/or electron microscopy images, or from porosimetry, e.g., by the intrusion of a non-wetting liquid (such as mercury) at high pressure into the material, and is usually taken as the number average size of the pores present in the material. Such techniques for determining porosity of a sample are known to those of ordinary skill in the art. For example, porosimetry measurements can be used to determine the average pore size of the porosity that is open to the exterior of the material based on the pressure needed to force a liquid, such as mercury, into the pores of the sample. In some embodiments, some or all of the porosity is open porosity, for example to facilitate filling of the pores by electrolyte. Techniques for forming a porous electrode are discussed in detail below.

Without wishing to be bound by any theory, it is believed that the pores facilitate transport of $Li^+$ or other ions from the electrode to the electrolyte. In a material having a porous structure, some of which pores may be filled with an electrolyte (such as described below), $Li^+$ or other ions have a shorter distance to travel from the electrode to the electrolyte and vice versa, thereby increasing the ability of the electrode to participate in energy storage, and/or increasing the energy density of the electrode. In addition, as discussed below, in some embodiments, porous electrodes may be fabricated that have a relatively low dimensional strain upon charge and discharge, and such materials can withstand a surprising number of charging or discharging cycles.

In some cases, the volume fraction porosity of the electrode is not constant throughout the electrode, but can vary. For example, the porosity of the surface of the electrode may be lower than the bulk of the electrode, one end of the electrode may have a higher or lower porosity than another end of the electrode, etc. In one embodiment, the surface is nonporous, although the bulk of the electrode is porous. In some cases, porosity differences in an electrode may be created during the process of creating the porous electrode, e.g., during the firing of a powder compact to form a ceramic. However, in other cases, the porosity differences may be intentionally controlled or altered, for example, by laser treatment of the surface, rapid thermal annealing of the ceramic, physical vapor or chemical vapor deposition, by adding particles or other materials to the electrode surface, by coating the electrode with a material, such as a sol-gel material, or the like. The porosity at the surface and variation in porosity with distance from the surface are readily observed and quantified using techniques such as electron microscopy and image analysis of the plan and cross-sectional views of the sample.

Electrodes such as those described above (e.g., porous, having protrusions and/or walls, etc.) may be formed, according to another aspect of the present invention, from a ceramic or ceramic composite. A ceramic is typically an inorganic non-metal material, although the ceramic can include metal ions within its structure, e.g., transition metals or alkali ions such as $Li^+$ or $Na^+$ or $K^+$, as discussed below. A ceramic composite is typically a mixture including one or more ceramic materials, e.g. a mixture of different ceramic phases, or a mixture of a ceramic and a metal or a ceramic and a polymer, and may have improved properties compared to the ceramic alone. For example, a ceramic-ceramic composite may have an ion storage ceramic combined with a fast-ion conducting ceramic to impart higher ionic conductivity to the composite while still retaining ion storage functions. A ceramic-metal composite may have improved electronic conductivity and improved mechanical strength or fracture toughness compare to a pure ceramic. A ceramic-polymer composite may have improved ionic conductivity if the polymer is an electrolyte having higher ionic conductivity than the ceramic, as well as having improved fracture toughness or strength. Combinations of these and/or other composites are also contemplated. In some embodiments, the electrode consists essentially of a ceramic, and in some cases, the electrode is formed from a unitary ceramic material. In some embodiments, the electrode material having the lower electronic conductivity is formed from a unitary ceramic or ceramic composite, which may improve electron transport to and from the electrode during use of the battery. Non-limiting examples of suitable ceramic materials include those which are able to transport Li ions during charging/discharging. The ceramic may be one in which Li ions can be removed during charging (a "Li-extraction" ceramic), i.e., the ceramic is one that contains Li ions that can be removed to form a limiting composition material (e.g., Li ions can be extracted from $LiCoO_2$ to produce $Li_{0.5}CoO_2$, from $LiNiO_2$ to produce $Li_{0.3}NiO_2$, etc.). Examples of potentially suitable ceramic materials comprising Li include, but are not limited to, $LiCoO_2$, $LiNiO_2$, $LiMn_2O_4$, or $Li_2Mn_2O_4$ spinel, $LiMnO_2$ of the orthorhombic or monoclinic polymorphs, $LiMPO_4$, olivines where M may be one or more of Ni, Co, Mn, and Fe, $Li_4Ti_5O_{12}$, derivatives or modified compositions of these compounds, and/or physical mixtures of one or more of these compounds, or the like. In some cases, as discussed below, the ceramic has a relatively small volumetric or linear strain differential during the insertion and removal of an ion. Examples of such ceramics include $LiCoO_2$, $LiNiO_2$, $LiFePO_4$, and $Li_4Ti_5O_{12}$, and their derivative compositions and structures as well as mixtures of such oxides. Still other examples include compounds such as $Li_x(Ni, Co, Al)O_2$ (often referred to as "NCA"), $Li_x(Mn, Ni, Co)O_2$, ("MNC" or "⅓ ⅓ ⅓"), and compounds that are intergrowths or nanoscale mixtures between any of the structures of "layered" ordered rock salt type or spinel type, including those in the Li—Mn—Ni—O family. In these formulae, x may by any number between 0 and 1.5, depending on the Li content of the synthesized material and the charge/discharge excursions during use, e.g., between about 0.80 and about 1, between about 0.90 and about 1, between about 0.95 and about 1, etc., in the lithiated (i.e., charged) state, and the elements within the parenthesis may be present in any amount or any relative amount as long as standard chemical rules of charge balance are obeyed. Typically, the sum of the elements within the parenthesis is about 1, i.e., for $Li_x(Ni_a, Co_b, Al_a)O_2$ and $Li_x(Mn_a, Ni_b, Co_c)O_2$, the sum of a, b, and c is about 1, although each of a, b, and c may be any number between 0 (including 0) and about 1.

Generally, the electrode may be formed out of a single, unitary "block" of ceramic, e.g., by "carving" the ceramic in some fashion, for instance, through micromachining or etching techniques or the like, to produce the final shape of the electrode. The electrode may also be formed in a desired shape from a powder or powder suspension, in some embodiments, using any suitable technique, for instance, techniques such as tape-casting, interrupted tape-casting, slip-casting, pressing, and embossing, and the powder or powder suspension may be fired to obtain a sintered material after its formation.

During processes such as those described above, portions of the unitary starting to material are removed in some fashion, to produce the final shape of the electrode. Thus, the unitary starting material is of a size larger than the final electrode that is "carved" from the starting material. As discussed below, such unitary ceramic materials may have several advantages, including smaller strain differentials, lack of stress-concentrating features, or the lack of joints or seams by which ions, fluids, or gases could pass through. As used herein, the term "unitary" is not meant to include structures, such as conjoined individual particles, that are formed as separate, individual units which are then agglomerated together in some fashion to form the final structure; instead, a unitary material is one that is processed (e.g., by sintering) such that any individual particles used to form the material cease to be readily separable as individual particles.

For example, a unitary material may be formed from a ceramic precursor, e.g., a powder, through a sintering process. For example, the ceramic precursor may be pressed and/or heated such that the powder particles are bonded together, forming a unitary whole. Porosity may be created within the sintered ceramic material, for example, by controlling the initial powder particle size distribution, powder packing density, the firing temperature and time, rate of heating during various stages of the firing process, and/or the firing atmosphere. Methods to control the shrinkage (densification) and evolution of porosity in powder-based materials to create a desired density or porosity are known to those of ordinary skill in the art.

In some instances the electrode comprising a unitary material may be formed in its desired shape from a powder mixture or powder suspension using such processes as tape casting, interrupted tape casting, slip casting, pressing, rolling, extruding, embossing, or other such processes.

The compound or compounds of the electrode may have, in some cases, a molar volume difference between the charged and discharged state of the cell of less than about 30%, less than about 15%, less than about 10%, or less than about 5%. In some embodiments the compound or compounds of the electrode has a linear or a volumetric strain between the charged and discharged state of the cell of less than about 20%, less than about 15%, less than about 10%, less than about 5%, less than about 3%, less than about 2%, or less than about 1%. In some embodiments, the compounds of the electrode include at least one compound that increases in molar volume at at least some compositions during use and at least one compound that decreases in molar volume at at least some compositions during use. In some embodiments, the net volume change of the electrode between the charged and discharged state of the battery is decreased by combining at least one compound that has a net positive volume change between the charged and discharged state, with at least one compound that has a net negative volume change between the charged and discharged state of the battery. In one set of embodiments, the electrode is fabricated from a ceramic material having a relatively small linear or a volumetric strain differential when the electrode is infiltrated with Li ions.

Figure 9A:
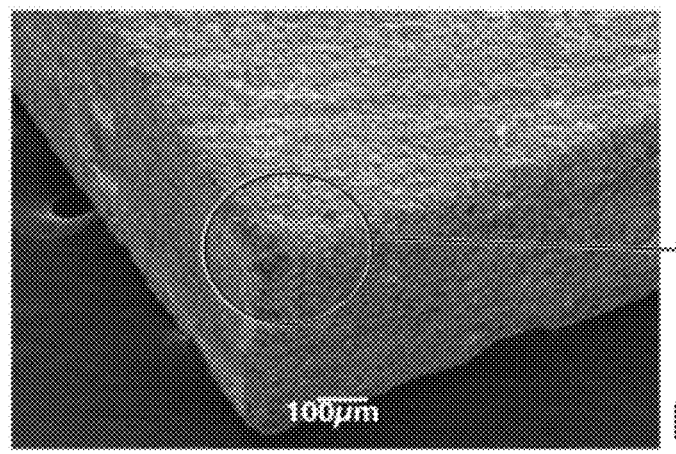
FIGS. 9A-9C are photomicrographs of still another embodiment of the invention, illustrating an electrode that does not show any obvious degradation or cracking.
Figure 9B:
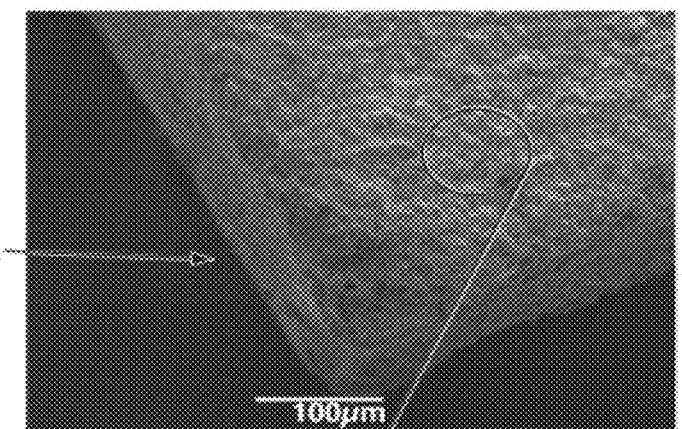
Figure 9C:
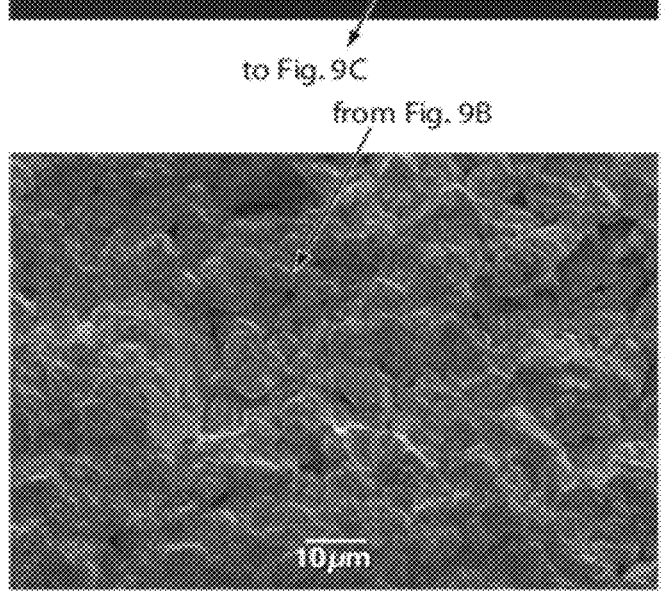

Non-limiting examples of such materials include $LiCoO_2$ (having a linear strain differential averaged along all crystallographic orientations of about +0.6% upon delithiating to a composition of about $Li_{0.5}CoO_2$) and $LiNiO_2$ (having a linear strain differential of about −0.9% upon delithiating to a composition of about $Li_{0.3}NiO_2$). Such a material may be able to withstand a relatively large number of charging or discharging cycles while remaining free of cracks or otherwise degrading, as the material does not expand or contract significantly during charging or discharging. Linear strain is generally defined as the change in length of a material with respect to the initial length ($\Delta L/L_0$), and volumetric strain is similarly defined, but with respect to the initial volume. For example, a material of the instant invention may be able to withstand at least 6 cycles, at least 10 cycles, at least 15 cycles, or at least 20 cycles of complete charging and discharging (e.g., at a C/20 rate), while remaining free of identifiable cracks or other degradations (e.g., chips, peeling, etc.) that can be observed under scanning electron microscopy. As an example, in FIGS. 9A-9C, a ceramic material used as an electrode was fully charged and discharged (i.e., "cycled") at a C/20 rate 6 times, and then studied using scanning electron microscopy (SEM). Thus, in another set of embodiments, the electrode is able to retain at least 50% of its initial storage capacity after at least 6 charge-discharge cycles at a C/20 rate. As can be seen in these figures (at different magnifications, as shown by the scale bars), no obvious degradation or cracking of the ceramic material was observed. In contrast, many prior art materials are unable to withstand such conditions.

It is unexpected that a sintered ceramic electrode as described herein could be electrochemically cycled repeatedly without substantial evidence of mechanical failure. Firstly, intercalation compounds such as the lithium transition metal oxides typically have a rock salt or ordered rock salt structure, spinel structure, olivine structure, or rutile structure, amongst others. These typically have high elastic moduli and low fracture toughness and are brittle. For such compounds, the linear strain to failure is typically less than about 1%, an amount that is exceeded by the typical linear strain induced upon charging and discharging. Also, several studies have shown that particles of intercalation compounds used in rechargeable lithium batteries sustain fracture and disorder and defect formation in their crystalline structure upon being charged and discharged. In addition, the strains induced upon charging and discharging may, in some cases, be larger than the thermal strains typically induced in ceramic parts during thermal shock that leads to fracture, such as the thermal shock of a glass body. Thus, it is unexpected that the electrodes could sustain the differential strains during charging and discharging, which necessarily induce strain and stress gradients since different portions of an electrode undergo different degrees of expansion or contraction as ions are added from the opposing electrode. As an example, Table 1 shows the linear strain to failure of several example compounds induced upon charging and discharging. Table 1 also shows a listing of several well-known lithium storage compounds and their volumetric and average linear strains during charging and discharging.

TABLE 1

| Lithium Storage Compound | Limiting Composition | Volume Strain $\Delta V/V_0$ | Linear Strain* $\Delta L/L_0$ | Potential vs. $Li/Li^+$ |
|---|---|---|---|---|
| Li-extraction | | | | |
| $LiCoO_2$ | $Li_{0.5}CoO_2$ | +1.9% | +0.6% | 4.0 V |
| $LiFePO_4$ | $FePO_4$ | −6.5% | −2.2% | 3.4 V |
| $LiMn_2O_4$ | $Mn_2O_4$ | −7.3% | −2.5% | 4.0 V |
| $LiNiO_2$ | $Li_{0.3}NiO_2$ | −2.8% | −0.9% | 3.8 V |
| Li-insertion | | | | |
| C (graphite) | $1/6\ LiC_6$ | +13.1% | +4.2% | 0.1 V |
| $Li_4Ti_5O_{12}$ | $Li_7Ti_5O_{12}$ | 0.0% | 0.0% | 1.5 V |
| Si | $Li_{4.4}Si$ | +311% | +60% | 0.3 V |
| β-Sn | $Li_{4.4}Sn$ | +260% | +53% | 0.4 V |

*for a randomly oriented polycrystal

As shown in the examples below, dense sintered electrodes of intercalation oxides with substantial strain during charge and discharge can be electrochemically cycled without experiencing detrimental mechanical failure, in contrast to the prior art. Detrimental mechanical failure would include fracture or multiple fractures that propagate across the electrode, crumbling or comminuting of the sintered particles causing a loss of connectivity between the particles, or a significant loss of electrochemical storage capability due to such events. This is observed in compounds such as $LiCoO_2$, in which the differential strain during charge and discharge is near the strain to failure of a brittle ceramic, as well as in compounds such as nanoscale doped olivines in which the differential strain is above that which would be expected to cause failure.

Without being bound by any particular scientific interpretation, it is believed that during electrochemical cycling of various electrodes of the invention, microcracking of particles and at grain boundaries between particles may occur, but that such damage remains localized and does not propagate across the electrode causing failure as it would in a typical sintered ceramic of similar physical properties and sintered density subjected to the same strain. Instead, the strains induced during electrochemical cycling may be anisotropic at the crystal level, and/or may be able to accommodate microcracks distributed widely throughout the material, which may dissipate stored elastic energy without causing failure on a length scale much larger than the particle size. Such ceramics do not exhibit high strength in comparison to other ceramics of comparable density and particle and pore size, but can be damage tolerant in some cases. Considered in such manner, various electrodes of the invention can be made damage-tolerant by taking into account the differential strain during charging and discharging, the crystalline anisotropy in strain, the crystallite size, agglomerate size, sintered density, and other microstructural and processing considerations well-known to those skilled in the art of ceramic materials processing. For example, the larger crystalline strain of LiFePO$_4$ compared, to LiCoO$_2$ necessitates a smaller particle size to avoid damaging fracture events, all other factors such as density, particle size distribution and pore size distribution being constant.

Thus in some embodiments, a porous electrode of the present invention that does not comprise additional ductile phases providing mechanical toughness may have a differential volume change of less than about 20%, less than about 15%, or less than about 10% between the charged and discharged state. In some embodiments, the microstructure of the sintered electrode, as characterized by well-known measures such as grain size, grain shape, grain size distribution, pore volume, the relative fractions of open and closed porosity, pore size distribution, or pore topology, is adjusted to permit reversible cycling with relatively low capacity loss. In some embodiments, the particle size may be reduced to improve damage tolerance, for example using particles having a primary (single crystallite) size of less than about 500 nm, less than 200 nm, or less than about 100 nm. In some embodiments the particles have an anisometric shape, including being in the shape of a rod or plate in which the aspect ratio (ratio of the longest dimension to the shortest) is at least a factor of 2, at least a factor of 5, or at least a factor of 10, which may improve damage tolerance in some cases.

In yet another set of embodiments, the electrodes may comprise a mixture of compounds, such compounds being selected to achieve a desired volumetric or linear differential strain upon charging and discharging the battery. By selecting compounds in this manner, the electrode may attain improved tolerance to electrochemical cycling induced mechanical damage, and/or the total volume change of the cell constituents, including both anode and cathode, during cycling may be reduced. As a non-limiting example, referring to Table 1, LiCoO$_2$ can be seen to experience a net volume contraction of about 1.9% upon being charged to the composition Li$_{0.5}$CoO$_2$, whereas LiFePO$_4$, LiMn$_2$O$_4$, and LiNiO$_2$ all exhibit volumetric expansion upon being charged. For a mixture of LiCoO$_2$ with one or more of the latter three compounds, under particular charging conditions such as voltage and current rate and time, each of the constituent materials reaches a particular lithium concentration, and therefore a particular change in volume compared to the starting discharged state. Accordingly, in one embodiment, the electrode is selected to comprise a mixture of compounds, such compounds being selected to achieve a volumetric or linear differential strain of less than about 20%, less than about 15%, less than about 10%, less than about 5%, less than about 3%, less than about 2%, or less than about 1%, upon charging and discharging the battery These volumetric changes are readily determined by methods, such as X-ray diffraction of the charged electrode, that are well-known to those of ordinary skill in the art. For instance, the net volume change of the electrode at any particular state-of-charge may be selected by mixing the constituents in certain ratios easily determined by calculation or experimentation. As an example, a mixture of LiCoO$_2$ and LiNiO$_2$ may be selected to provide net zero expansion between the charged and discharged states.

In some embodiments, the porous sintered electrode is selected to comprise the less electronically conductive of the cathode and anode materials. The porous sintered electrode construction may provide a continuous interconnected material and/or improve the electronic conductivity of the ion storage material network compared to, for example, a compacted powder that has not been sintered. Thus the electronic conductivity of the sintered porous electrode can be as good as, or better than, that of a conventional lithium ion battery electrode that typically comprises an active material powder, conductive additive such as carbon black, and polymer binder, while having lesser or no additive phases, and having a higher volume fraction of additive material. As shown in the examples, a sintered LiCoO$_2$ or sintered lithium metal phosphate olivine cathode can have much higher volume packing density, e.g., as high as 70-85% density, and can be electrochemically cycled without incorporating any conductive additive or binder in the electrode.

In some embodiments, the sintered electrode comprises a lithium storage compound that increases in electronic or ionic conductivity when alkali ions are removed or inserted into said compound. As a non-limiting example, Li$_{1-x}$CoO$_2$ may exhibit increased electronic conductivity with increasing x, and may undergo a semiconductor to metal transition at x~0.03. Thus, a benefit may be provided under certain conditions by utilizing LiCoO$_2$ or other compounds exhibiting such behavior in a battery, in one embodiment of the invention. As the battery is charged and lithium is extracted from the LiCoO$_2$, the impedance of the electrode decreases, which may facilite electrochemical use of the electrode. A further benefit may be realized in some cases based on the typical behavior of lithium rechargeable cells where there is a first cycle irreversible loss of lithium due to the formation of side-reaction products. The irreversible consumption of lithium may cause the LiCoO$_2$ to remain lithium-deficient thereafter, in certain cases, even in the discharged state of the cell, and thereby may cause the sintered cathode to retain a high electronic conductivity in some embodiments of the invention.

In some embodiments, a porous electrode of the present invention may contain an electrolyte within the pores of the porous electrode. The electrolyte, in some cases, may be a liquid electrolyte, such as a mixture of alkyl carbonates and a lithium salt such as LiPF$_6$, or a polymer electrolyte, such as polyethylene oxide or a block copolymer. The electrolyte may also be, for instance, a gel or an inorganic compound. Non-limiting examples of inorganic electrolytes include a lithium phosphorus oxynitride compound, lithium iodide, or the like. In some cases, the electrolyte can comprises any combination of these and/or other materials.

In some cases, the electrolyte and/or the electrode may contain a lithium salt to impart lithium ion conductivity. Formulations for such electrolytes, including additives to improve safety, cycle life, and/or calendar life amongst other attributes, are known to those skilled in the art, and it should be understood that any such formulation may be used, based on the desired attributes of the battery for a particular application. The electrolyte contained within the electrode may or may not have the same concentration or composition as the electrolyte that separates the electrode from an opposite electrode (i.e., separating the cathode and the anode within a battery). A liquid electrolyte may be useful, for example, to facilitate flow of Li ions into and out of the porous electrode. In some cases, the liquid electrolyte may comprise Li ions. An example of such an electrolyte is one using LiPF$_6$ as the lithium salt. Depending on the porosity of the electrode, the liquid electrolyte may be introduced into the pores of the electrode by exposing the pores to the liquid electrolyte, for instance, as discussed below. The electrolyte, in some cases, may also surround the protrusions of the electrode (if protrusions are present). For example, the electrolyte may be contained within the electrode (e.g., within walls of an electrode, if a wall is present), bathing the protrusions in electrolyte.

In some aspects of the invention, various combinations of density, porosity, thickness, and C-rates of operation may impart novel, unexpected performance characteristics on the electrodes described herein. Examples of densities, porosities, thicknesses, C-rates (i.e., charging or discharging rates) have been discussed above, and these parameters may be combined in any suitable combination. In one set of embodiments, the product of the density (expressed in %, relative to the theoretical density of the ceramic, i.e., a 100% dense ceramic) and the thickness (or minimum dimension, expressed in mm) of the electrode can be used to define a novel combination of density or porosity and thickness (expressed in %-mm) that produces such unexpected performance characteristics. A non-limiting example of such materials is discussed below with reference to Example 8.

In one set of embodiments, the product of density and thickness may be between about 10%-mm and about 150%-mm, between about 20%-mm and about 150%-mm, between about 30%-mm and about 150%-mm, between about 40%-mm and about 150%-mm, between about 50%-mm and about 150%-mm, between about 60%-mm and about 150%-mm, between about 75%-mm and about 150%-mm, or between about 100%-mm and about 150%-mm, etc, In another set of embodiments, the product of porosity and thickness may be between about 150%-mm and about 2.5%-mm, between about 150%-mm and about 5%-mm, between about 150%-mm and about 10%-mm, between about 150%-mm and about 20%-mm, between about 150%-mm and about 30%-mm, between about 150%-mm and about 40%-mm, between about 150%-mm and about 50%-mm, between about 150%-mm and about 75%-mm, or between about 150%-mm and about 100%-mm, etc.

Another aspect of the present invention is directed to a separator. The anode and the cathode in a battery or other electrochemical device are generally electronically insulated from each other while having an electrolyte to permit ion exchange. A porous "separator" material that is infused with an ion-conducting electrolyte can serve this function. According to one set of embodiments, a separator is used in a battery that comprises a porous polymer film, and/or a porous ceramic layer. In some cases, the film or layer may have a pore fraction of between 10% and 70% by volume, or between 25% and 75% by volume, and a thickness between about 5 micrometers and about 500 micrometers, between about 100 micrometers and about 2000 micrometers, between about 300 micrometers and about 1000 micrometers, etc. The film or layer may also have a porosity of at least about 30%, at least about 40%, or at least about 50%, and/or the porosity may be no more than to about 60%, about 65%, about 70%, or about 75%. The thickness may also be less than about 300 micrometers, or less than about 100 micrometers, and/or greater than 10 micrometers, greater than 30 micrometers, or greater than about 50 micrometers. In some embodiments, a relatively thick porous ceramic separator may be useful in decreasing the frequency of occurrence of internal short circuits due to lithium dendrite formation.

According to another set of embodiments, the electrolyte is nonporous (i.e., solid), i.e., the electrolyte does not contain "pinholes" or defects (such as pores or cracks) through which Li dendrite formation leading to short circuits can occur, even after tens, hundreds, or thousands of cycles of charging or discharging. In some cases, the electrolyte comprises Li ions, which may be useful, to facilitate flow of Li ions into and out of the adjacent electrodes. Amongst numerous possible choices, one example of such an electrolyte is LiPON (lithium phosphorus oxynitride), an inorganic material typically made in thin-film form by sputtering. Another example of an electrolyte is lithium iodide (LiI). In one set of embodiments, the electrolyte is present as a film, which can be deposited by sputtering or other physical vapor or chemical vapor methods. In some cases, the electrolyte is a conformal film formed upon the electrode surface using layer-by-layer deposition, i.e., where discrete molecular layers of electrolyte material are added to the electrode until a suitably thick layer of electrolyte has been built up. Those of ordinary skill in the art will be aware of suitable layer-by-layer deposition techniques, which typically involve the application of molecular layers of alternating positive and negative charge from wet chemical solution.

Figure 10:
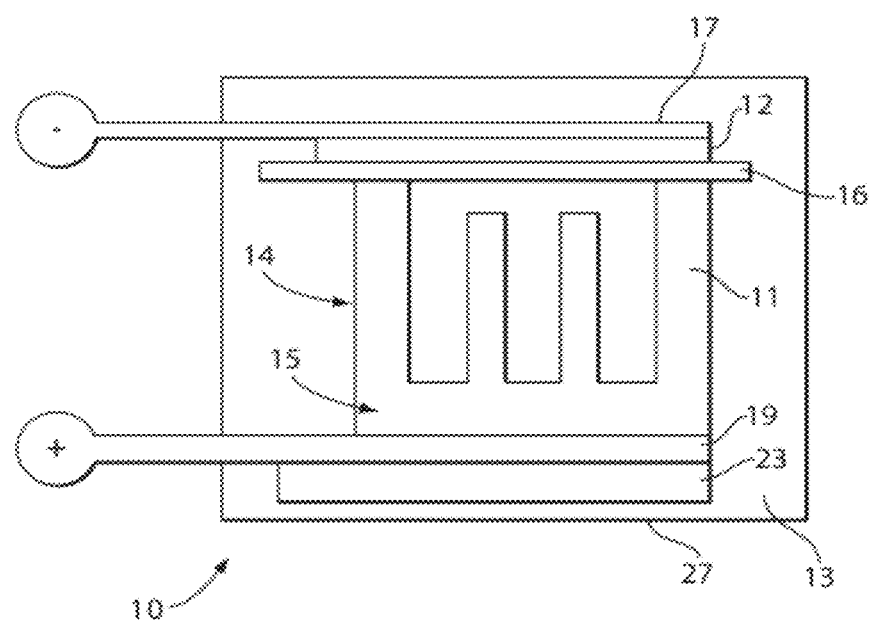
FIG. 10 is a schematic diagram of one embodiment of the invention.

The nonporous electrolyte may be used, in some embodiments, to seal the electrode surface, and in some cases, to create a hermetically sealed compartment containing the electrode and an electrolyte, such as a liquid or a polymer electrolyte, within the sealed compartment. Thus, the hermetically sealed compartment may be defined by the walls of the cell, the base of the electrode, and the lid formed by the nonporous electrode. A non-limiting example of a battery having such a nonporous electrolyte is shown in FIG. 10, in which the nonporous electrolyte layer 16 seals the compartment beneath it formed by the walls of the electrode 15, within which an electrolyte resides. The volume of the cell outside of this compartment may or may not be also filled with electrolyte. The nonporous electrolyte may have any suitable size and/or shape. For example, portions of the electrolyte may extend into the interior space of the electrode, or the electrolyte may essentially define a substantially planar layer or "lid" above the walls of the electrode, e.g., as in FIG. 10. For instance, the nonporous electrolyte may have a thickness of at least about 1 micrometer, at least about 3 micrometers, at least about 5 micrometers, at least about 10 micrometers, at least about 20 micrometers, at least about 30 micrometers, at least about 50 micrometers, etc.

Yet another aspect of the invention is directed to techniques for making such electrodes and batteries or microbatteries. In one set of embodiments, a unitary ceramic material is used, and in some, but not all embodiments, the material may be etched in some fashion, for example, using micromachining techniques such as laser micromachining, or dry etching or wet chemical etching methods well known to those skilled in the art of fabricating microelectromechanical systems (MEMS). Such machining processes may be used to form the walls and/or protrusions on the surface of the base of the electrode. In another set of embodiments, the protrusions or walls of the electrode are produced directly by forming a starting powder or composite mixture under pressure using a die having the inverse of the desired final geometry. The electrode thus formed may be used directly or may be sintered after forming.

In the non-limiting example of a completed battery shown in FIG. 10, the cathode 14 has a plurality of protrusions 18 that extend away from the surface of a base 15 of the cathode, surrounded by a wall 11. In addition, the battery may be contained within a packaging material 27, as is shown in FIG. 10. Packaging materials for batteries are known to those skilled in the art. For lithium batteries, non-limiting examples include polymers, polymer-metal laminates, thin-walled metal containers, metal containers sealed with polymers, and laser-welded metal containers. For the batteries of the invention, one embodiment uses inorganic compounds such as insulating oxides as the packaging material. Such compounds may be applied to the exterior of the battery by physical vapor deposition or coating from wet chemical solutions or particle suspensions, or the package may be pre-formed and the battery inserted within.

The cathode may be laser-micromachined, and has a height of about 500 micrometers in the particular example in FIG. 10. The cathode is in electrical communication with a current collector 19, such as a gold current collector, which in turn is positioned on a substrate 23, for instance, an alumina substrate. The collector may have any suitable thickness, for example, about 25 micrometers, about 50 micrometers, about 75 micrometers, about 100 micrometers, etc. In some cases, the electrode may have a thickness of between about 100 micrometers and about 2000 micrometers, or between about between 300 micrometers and about 1000 micrometers. Similarly, the substrate may have any suitable shape and/or dimensions, depending on the cathode. For instance, the base may have a thickness of at least about 0.25 mm, at least about 0.3 mm, at least about 0.4 mm, at least about 0.5 mm, at least about 0.75 mm, at least about 0.8 mm, at least about 1 mm, at least about 2 mm, etc.

In some embodiments, within the walls of cathode 15, which may be porous, is a liquid electrolyte 13, for example about 1.0 M to about 1.5 M, e.g., about 1.33 M, of $LiPF_6$ dissolved in a mixture of organic and/or alkyl carbonates. Such liquid electrolytes are well-known to those skilled in the art of nonaqueous batteries, and may, in some cases, contain additive compounds that stabilize the solid-electrolyte interface (SEI) between the electrode and the electrolyte, improve the temperature range over which the battery may be used, provide flame retardance, suppress gas formation, and/or retard the growth of lithium dendrites. The liquid electrolyte is contained within the electrode via a nonporous electrolyte 16, for example, a solid inorganic or a polymeric electrolyte. The nonporous electrolyte may also conformally cover the surfaces of cathode 15. The nonporous electrolyte may be able to conduct electrons and/or ions back and forth between the cathode and the anode, and may have any suitable thickness or shape, for example, a thickness of at least about 1 micrometer, at least about 3 micrometers, at least about 5 micrometers, at least about 10 micrometers, at least about 20 micrometers, at least about 30 micrometers, at least about 50 micrometers, etc.

In the example of FIG. 10, the anode 12, positioned adjacent to the nonporous electrode, is in electrical communication with an anode current collector 17, such as a metal current collector (e.g., Cu). The anode current collector may have any suitable thickness, for example, at least about 1 micrometer, at least about 3 micrometers, at least about 5 micrometers, at least about 10 micrometers, at least about 25 micrometers, at least about 50 micrometers, at least about 75 micrometers, at least about 100 micrometers, etc., and may or may not be the same thickness and/or comprise the same materials as the cathode current collector, depending on the embodiment and the application. In instances where nonporous electrolyte 16 conformally coats the surface of electrode 15, anode 12 may also conformally coat the film of electrolyte 16 in some cases, or may fill the space between the protrusions of electrode 15 while remaining everywhere separated from the electrode 15 by the conformal electrolyte film in certain embodiments. In some embodiments the electrode 15 is the initial source of the alkali ions that are stored in the electrodes during charge and discharge, and no anode is used, but simply a negative current collector.

In some cases, alkali ions, such as lithium, are deposited at the negative current collector as alkali metal upon charging of the battery, and/or are removed and deposited in the positive electrode upon discharge. In some embodiments, disposed on the negative current collector is a material to facilitate the further deposition of alkali metal during charging of the battery. This material may be an alkali metal, such as lithium metal, or may be an anode-active compound for lithium ion batteries that intercalates or alloys with lithium metal without enabling the precipitation of metallic lithium. Such compounds include carbon materials such as graphite or hard carbons, intercalation oxides such as $Li_4Ti_5O_{12}$, metals and metalloids such as B, Al, Ag, Au, Bi, Ge, Sn, Si, Zn, alloys comprising one or more of such metals and metalloids, and mixtures of such metals or metalloids or their alloys. In some embodiments, the amount of such anode-active material is at least sufficient to completely absorb the lithium supplied by the cathode-active material during charge, as is the case in conventional lithium-ion batteries. In other embodiments, however, the amount of such material is lower, and the material may both saturate with the alkaline metal and provide a location for the further deposition of the alkali metal as the battery is charged.

As mentioned above, the ceramic electrode may be formed, for example, by sintering particles together, e.g., forming a unitary material. However, the invention is not limited to sintered ceramics; for instance, other ceramic materials or composites may be used. Techniques for sintering particles to form a ceramic are known to those of ordinary skill in the art, e.g., forming a sintered ceramic by pressing and/or heating a precursor to form the ceramic. In one set of embodiments, such sintering may be used to form a porous unitary structure. As discussed, porosity may be created within the sintered ceramic material, for example, by controlling the sintering temperature and pressure, and such process conditions can be optimized to create a desired density or porosity using routine optimization techniques known to those of ordinary skill in the art. In some embodiments, porosity is introduced into the sintered electrode by incorporating with the starting powder a constituent that can be later removed, which may thus leave behind pores under some conditions. Such constituent may be referred to as "fugitive material." For example, a fugitive material that is incorporated into the compacted powder that becomes the sintered electrode may be removed by any suitable technique, for example, chemical dissolution, melting and draining of the melted liquid, sublimation, oxidation, and/or pyrolysis, while leaving the material of the sintered electrode behind. Examples of such fugitive materials include, but are not limited to, ice, which may be moved by melting or sublimation, naphthalene, which may be sublimed, polymer constituents such as latex spheres or polymer fibers, which may be chemically dissolved, melted, and/or pyrolysed, and carbonaceous particles or platelets or fibers, which may be removed by oxidation at elevated temperatures. Such carbonaceous particles may be, for instance, carbon or graphitic spherical particles, graphite platelets, graphite or carbon fibers, vapor-grown carbon fibers (VGCF), and carbon nanofibers or carbon nanotubes. As a specific example, $LiCoO_2$ is typically fired in oxidizing gaseous atmosphere such as air or oxygen. By including carbon fibers in a compact made from $LiCoO_2$ powder, and pyrolyzing the carbon fibers upon firing in oxidizing atmosphere, elongated pore channels may be left behind in the sintered $LiCoO_2$ compact which, when filled with electrolyte, may be useful for ion transport and thus to the battery's power and energy utilization.

The desired shape of the electrode may be fashioned using micromachining techniques such as laser micromachining, deep reactive-ion etching, ion-milling, or the like. Those of ordinary skill in the art will be familiar with such techniques. For instance, in laser micromachining, a laser is directed at the unitary ceramic material. The laser light, when interacting with the ceramic material, may melt, ablate, or vaporize the material, which may be used to control the shape of the final electrode. Thus, laser micromachining can produce an object having a desired shape by removing, in some fashion using a laser, everything that does not belong to the final shape. The laser may have any suitable frequency (wavelength) and/or power able to destroy or otherwise remove such ceramic materials in order to produce the final structure for use in a battery or other electrochemical device.

Figure 11:
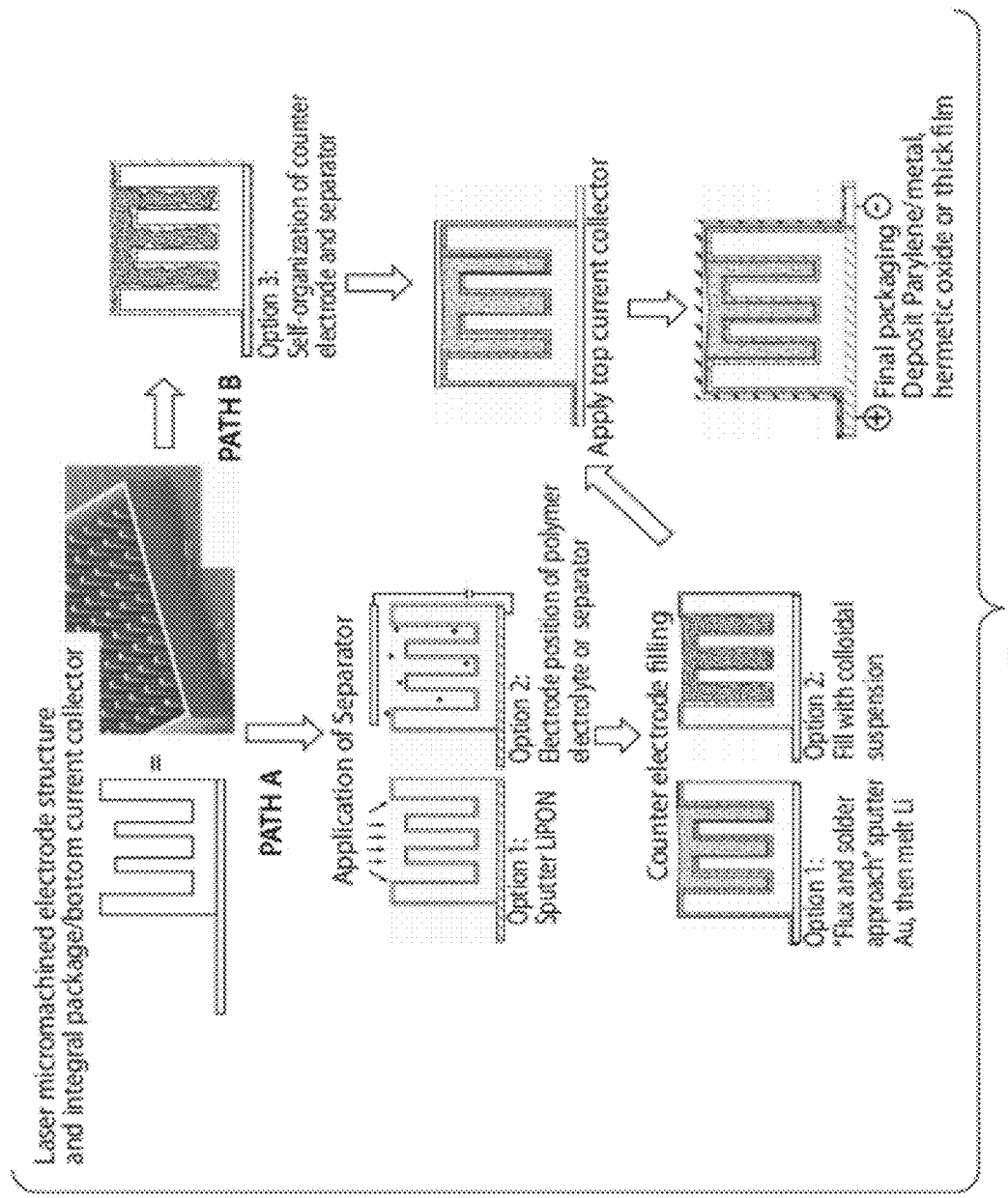
FIG. 11 is a schematic diagram of a method of fabricating a battery, in accordance with another embodiment of the invention.

The following is a non-limiting example of a method of manufacturing an embodiment of the invention. Referring now to FIG. 11, in pathway A, the creation of a battery, which may be a microbattery, having a plurality of protrusions and a wall surrounding the plurality of protrusions, is shown. A unitary ceramic material is formed into an electrode having a plurality of protrusions and a wall surrounding the plurality of protrusions using techniques such as laser micromachining. The electrode may also contain a current collector, for instance comprising gold or another metal, such as silver.

In one technique, a separator or electrolyte layer comprising LiPON and/or a polymer or organic electrolyte is first added to the electrode. As shown in FIG. 10, LiPON may be sputtered onto the electrode, or a polymer or organic separator may be deposited onto the electrode in some fashion, for instance, using coating from sol-gel solution, electrodeposition techniques, or layer-by-layer assembly.

Next, the counterelectrode is added to substantially fill the remaining space. In one technique, the interior space defined by the walls of the electrode is filled with a colloidal suspension, the colloidal particles being the negative electrode material and optionally additive particles such as conductive additives or binders. However, in another technique, a "flux and solder" approach is used, which Au is first sputtered onto the separator, then Li (e.g., Li solder) is melted onto the Au. Such a technique may be useful in cases where the electrode and/or the electrolyte contains a material that Li metal, when in a liquid state, will not "wet" or substantially adhere to. In such cases, gold or another compatible metal that Li will "wet" when Li is in a liquid state, is used to facilitate bonding. Without wishing to be bound by any theory, it is believed that Li is able to react with the metal to wet the surface. The top current collector (e.g., a metal, such as Cu, is then added, and optionally, the battery is sealed. The battery can then be packaged, e.g., by depositing parylene and/or a metal hermetic oxide or thick film onto the battery.

In another set of embodiments, a battery, such as a microbattery, having a plurality of protrusions and a wall surrounding the plurality of protrusions can be created as follows. Referring again to FIG. 11, in pathway B, the creation of a battery may proceed by allowing self-organization of the counter electrode and the separator to occur. In this approach, repulsive forces between the electrode and the counterelectrode are used to create a separation that is spontaneously filled by separator or electrolyte material. The repulsive forces used to self-organize the two electrodes with respect to each other include but are not limited to van der Waals forces, steric forces, acid-base interactions, and electrostatic forces. Subsequently, as before, a top current collector (e.g., a metal, such as Cu, is then added, and optionally, the battery is sealed). The battery can then be packaged, e.g., by depositing parylene and/or a metal hermetic oxide or thick film onto the battery.

U.S. patent application Ser. No. 10/021,740, filed Oct. 22, 2001, entitled "Reticulated and Controlled Porosity Battery Structures," by Chiang, et al., published as U.S. Patent Application Publication No. 2003/0082446 on May 1, 2003, and U.S. patent application Ser. No. 10/206,662, filed Jul. 26, 2002, entitled "Battery Structures, Self-Organizing Structures, and Related Methods," by Chiang, et al., published as U.S. Patent Application Publication No. 2003/0099884 on May 29, 2003, are incorporated herein by reference. Also incorporated herein by reference are U.S. Provisional Patent Application Ser. No. 60/931,819, filed May 25, 2007, by Chiang, et al.; U.S. Provisional Patent Application Ser. No. 61/027,842, filed Feb. 12, 2008, by Marinis, et al.; and U.S. patent application Ser. No. 10/329,046, filed Dec. 23, 2002, entitled "Conductive Lithium Storage Electrode," by Chiang, et al., published as U.S. Patent Application Publication No. 2004/00055265 on Jan. 8, 2004. Also incorporated herein by reference are U.S. patent application Ser. No. 12/126,841, filed May 23, 2008, entitled "Batteries and Electrodes For Use Thereof," by Chiang, et al.; International Patent Application No. PCT/US2008/006604, filed May 23, 2008, entitled "Batteries and Electrodes For Use Thereof," by Chiang, et al.; and a U.S. provisional application filed on even date herewith, entitled "Small Scale. Batteries and Electrodes For Use Thereof," by Chiang, et al. Also incorporated herein by reference is U.S. patent application Ser. No. 12/323,983, filed Nov. 26, 2008, entitled "Batteries and Electrodes For Use Thereof," by Chiang, et al.

The following examples are intended to illustrate certain embodiments of the present invention, but do not exemplify the full scope of the invention.

EXAMPLE 1

This example illustrates an integrally packaged, solid-state lithium rechargeable microbattery with a 3-dimensional interpenetrating-electrode internal architecture, in accordance with one embodiment of the invention. Such microbatteries may have the capability for outer package aspect ratios of (for example) less than 5:1 for maximum to minimum dimensions (i.e., not restricted to thin planar configurations), active materials packaging fraction of >75% in a 1 mm$^3$ volume, under which conditions they will exceed an initial energy density target of 200 W h/l by a factor of 3 to 7. The approach in this example will use currently available and proven cathode and anode materials, but does not exclude higher energy or higher rate active materials in the future.

The microbatteries in this example will allow energy densities of about 200 W h/l to about 1500 W h/L to be achieved, depending on the electrochemical couple used, and specific design parameters, as discussed below. Microbatteries of this form could be used to power a wide variety of small systems from simple sensors to systems with integrated ultrahigh density packaging.

A microfabricated structure of 3D electrode arrays is co-fabricated with an integral hermetic package, e.g., as is illustrated in FIGS. 6A-6E. This particular demonstration uses graphite and laser micromachining as the fabrication method. Using highly-oriented pyrolytic graphite (HOPG) that was laser-machined to about 200 micrometer half-thickness, cycling rates of about C/20 were demonstrated in lithium half-cells. In graphite, a ten-fold increase in rate to 2C would require a factor of $10^{1/2}=3.2$ reduction in cross-sectional dimension (e.g., diffusion time $t=x^2/D$, where x is the diffusion length and D the diffusion coefficient). These dimensions are achievable with laser micromachining technology. In order to maximize energy density, the electrode cross-sectional dimensions should be as large as possible while still supplying the desired rate capability (since the inactive materials fraction increases as the feature size decreases). In some microbattery applications, electrodes having micrometer to tens of micrometer dimensionality may be sufficient.

FIG. 6A shows that laser micromachining can produce individual electrode features in graphite having about 50 micrometer half-thickness and 0.5 mm height with a slight (controllable) taper, forming a 3 mm×3 mm array (4.5 mm$^3$ volume). Furthermore, the lateral resolution and taper of the kerf in laser machining is strongly impacted by the thermal conductivity of the material being machined, with high thermal conductivity decreasing resolution and increasing taper. In lithium intercalation oxides of low thermal conductivity compared to graphite, it is expected that closely-spaced features of about 10 to about 20 micrometer total width to be possible at feature heights of about 0.5 mm to about 1 mm. In this example, 3-dimensional (3D) electrodes of similar morphology but having smaller cross-sections can be fabricated from lithium storage compounds, by laser-micromachining or other microfabrication processes, for example, amenable to simultaneous fabrication of many devices. These continuous and dense 3D electrode arrays can be fabricated from the active material of lower electronic conductivity, usually the cathode, in order to decrease electronic polarization and increase the rate capability of the final device.

Using the microfabricated electrode/package structures as the starting template, three example paths to fabrication of the completed battery are demonstrated, with reference to FIG. 11, as discussed below.

In one path, conformal deposition of a solid inorganic electrolyte film (e.g., LiPON) is performed by sputtering, which can create an electronically insulating layer of 1 micrometer to 3 micrometer thickness, which may cover the upward-facing surfaces. The taper of these electrode features can be "tuned" through instrumental parameters to allow conformal coating. At such thickness, the impedance of the electrolyte film during subsequent use as a battery may be low enough that the rate capability can be primarily determined by the electrodes. After electrolyte deposition, the remaining free volume within the cell can be filled by the counterelectrode. The counterelectrode will, in one instance, be Li or a Li alloy, melt-infiltrated (about 180° C.) into the coated electrode array using a "flux and solder" process to enable high surface tension liquid lithium to wet oxide surfaces, as discussed above. An advantage of using lithium metal is that its high volumetric capacity allows the negative electrode to be of small volume, for example only about one-fourth that of the positive electrode, if $LiCoO_2$ is used. Thus, a negative electrode film of only several micrometer dimensions filling the pore space of the electrode array may be needed for cell balancing. Alternatively, the counterelectrode can be applied in the form of a powder suspension where a solid polymer electrolyte (e.g., PEO-based) is included in the formulation to provide a fully solid-state device. Subsequently, a top current collector can be applied by physical vapor deposition or thick film paste technology, following which a hermetic sealing layer including a sputtered oxide or CVD-applied polymer layer (parylene) is used to complete the packaging.

In another path, similar to the path outlined above, the electrolyte film is an electrodeposited layer of a solid polymer electrolyte. Methods for the electrodeposition of electronically insulating polymer films can be applied in this project to form electrolytic layers. Alternatively, a layer-by-layer deposition approach may be used. The counterelectrode may be powder suspension based, since even the modest melting temperature of Li alloys could damage polymeric electrolytes. The subsequent packaging steps are similar as described above.

Figure 12A:
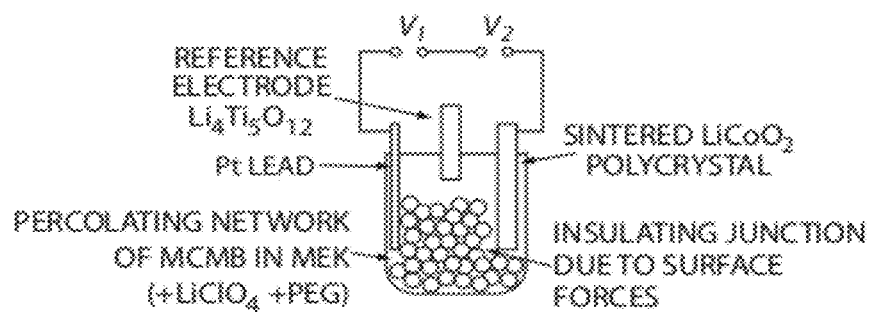
FIGS. 12A-12D illustrate an embodiment of the invention using colloidal-scale self-organization to produce an electrode.
Figure 12B:
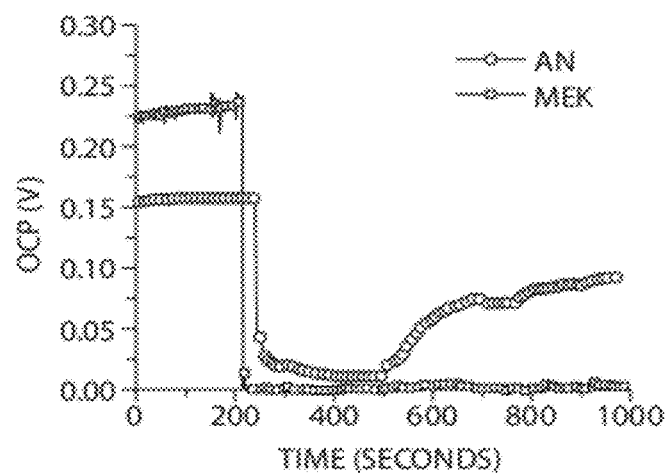
Figure 12C:
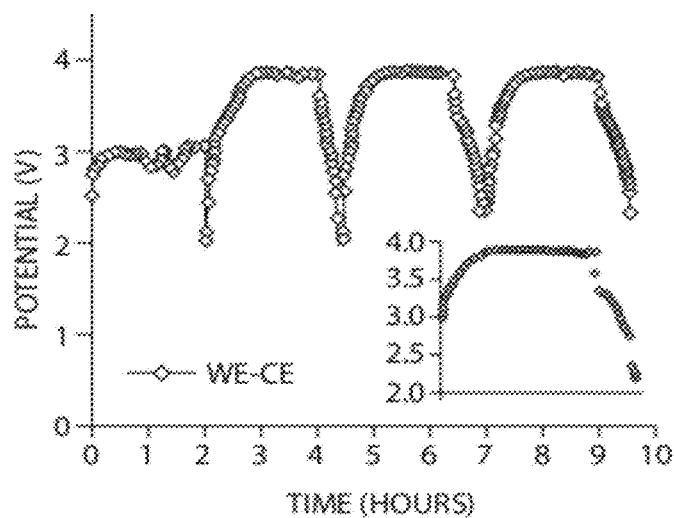
Figure 12D:
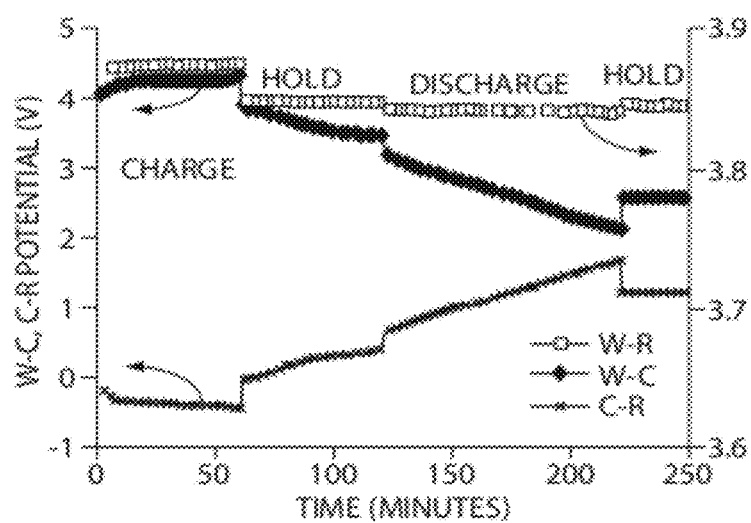

In yet another path, a colloidal-scale self-organization approach may be applied. $LiCoO_2$ and graphite immersed in a suitable solvent may be mutually repulsive due to short-range dispersion and electrostatic forces. FIGS. 12A-12D shows key results in which the mutual repulsion between sintered dense $LiCoO_2$ and an MCMB (mesocarbon microbead) suspension formed a rechargeable lithium battery under the influence of the surface forces. The constituents of solid polymer electrolytes were dissolved in the solvent without negatively affecting the interparticle forces. FIG. 12A shows a cell schematic. FIG. 12B shows the open circuit potential (OCP) between $LiCoO_2$ and MCMB upon forced contact, showing an electrical short-circuit upon contact for acetonitrile, but an open circuit for MEK (methyl ethyl ketone) due to repulsive surface forces. FIG. 12C shows reversible galvanostatic cycling of a self-organized battery using MEK and 0.1 M $LiClO_4$ as the electrolyte. FIG. 12D shows measurements of the potential difference between a Li titanate reference electrode and the $LiCoO_2$ working (W) and MCMB counter (C) electrodes, conducted in MEK and 0.1 M $LiClO_4$ and 1 wt % PEG 1500 (poly(ethylene glycol)). All potentials referenced to $Li/Li^+$. Potentials observed during each stage of the test demonstrate Faradic activity, with the $LiCoO_2$ being delithiated and MCMB being lithiated. In the present configuration, an MCMB suspension can be used to fill the integral container formed from the $LiCoO_2$ and a self-forming separator obtained upon drying. Subsequent application of a top current collector and outer packaging will be carried out in the same manner as the above.

Figure 13A:
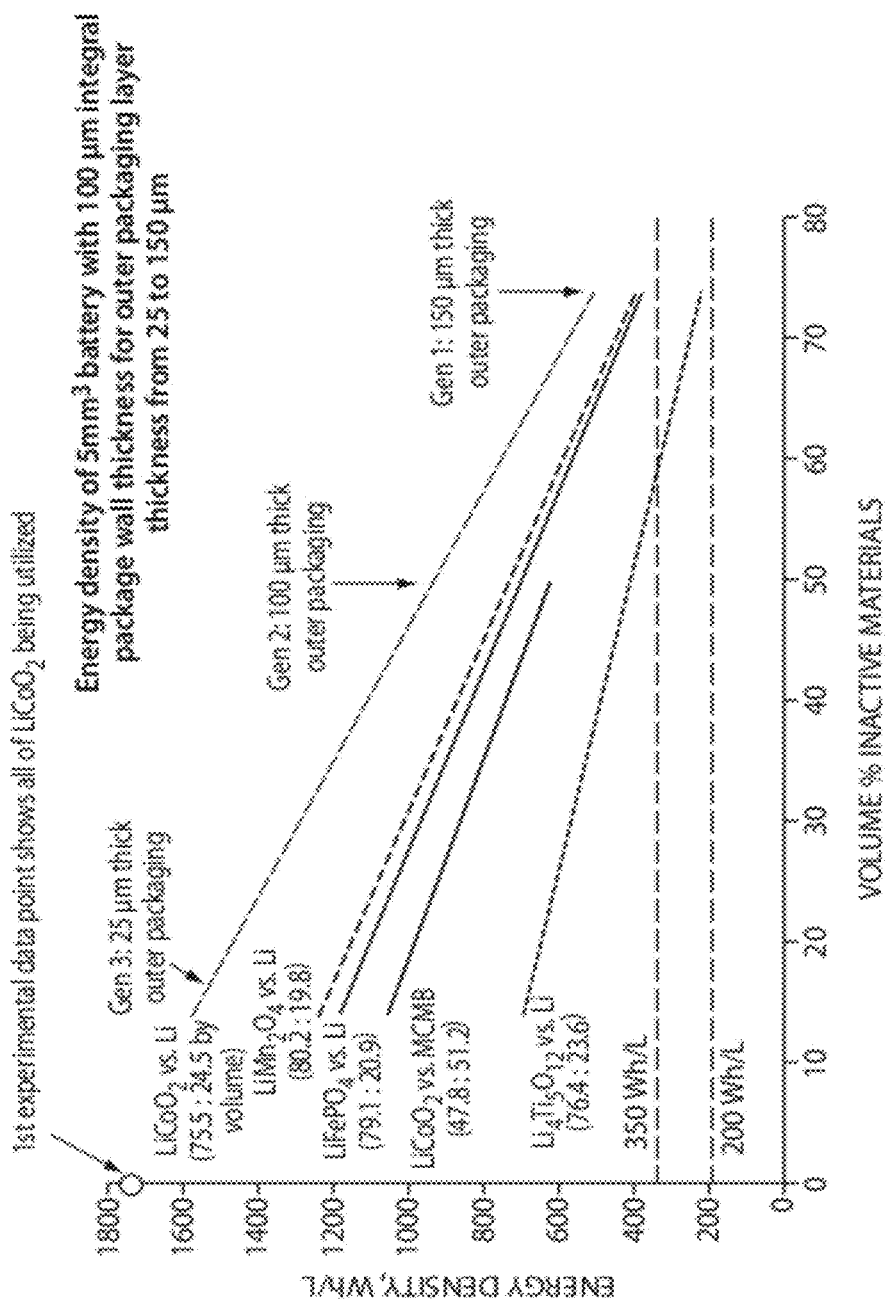
FIGS. 13A-13B illustrate the energy densities of batteries using various materials, in accordance with certain embodiments of the invention.
Figure 13B:
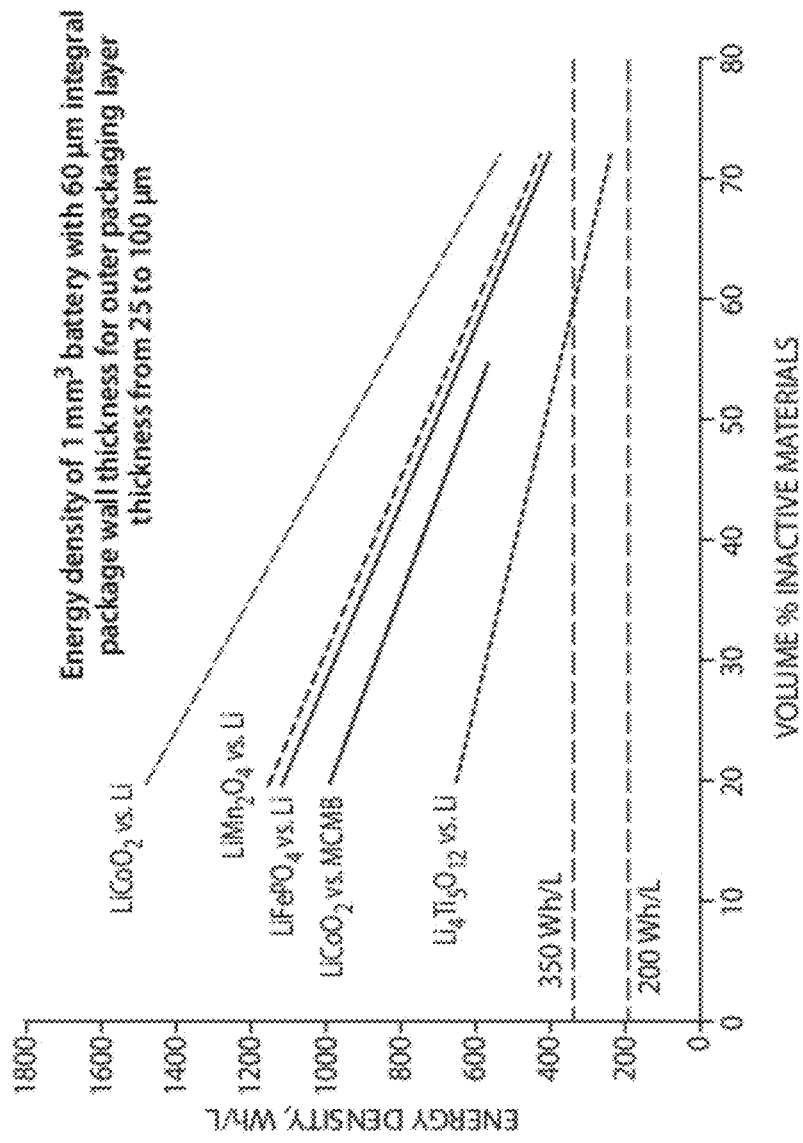

The energy densities are determined in these devices by the volume fraction of active materials present in the cell, and the degree of electrochemical utilization of those materials. In FIGS. 13A and 13B, plots of the expected energy density for microbatteries made from 5 different electrochemical couples using the present fabrication approach is plotted against the volume fraction of inactive material in the packaged cell due to the electrolyte layer, integral package wall, current collectors, and outer packaging for 5 $mm^3$ (FIG. 13A) and 1 $mm^3$ (FIG. 13B) volumes. In each case, the relative volumes of the positive and negative electrode are as needed for a charge-balanced cell. The theoretical energy density (at zero percent inactive material) of these systems exceeds 350 W h/L by a factor of 2.3 to 5. The results for 5 $mm^3$ microbatteries of the configuration in this example are calculated assuming realistic component dimensions: 50 micrometer electrode diameter with 100 micrometer or 60 micrometer integral package wall thickness, 2 micrometer electrolyte layer thickness, and 10 micrometer thick current collectors. The thickness of the outer packaging is treated as a variable, ranging from 25 micrometer to 150 micrometer thickness. Also shown in FIG. 13A is an experimental data point (identified as 21), which illustrates that substantially all of the $LiCoO_2$ has been utilized.

Figure 14:
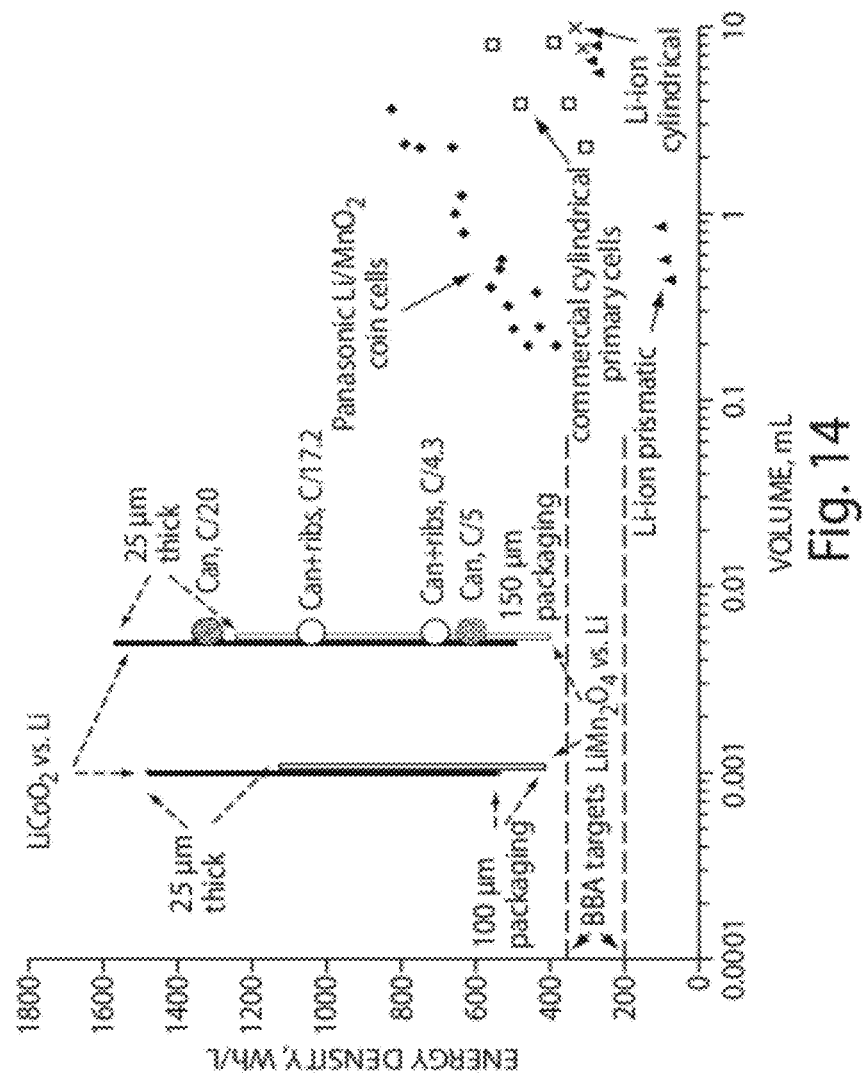
FIG. 14 illustrates energy density as a function of volume for various batteries, in yet another embodiment of the invention.

FIG. 14 compares the results in FIGS. 13A and 13B against recent data for commercially-available small batteries, as well as data for various embodiments of the invention at various discharge rates. Based on this figure, the performance envelope represented by this approach appears to represent a major improvement in the performance of small batteries.

EXAMPLE 2

In this example, 3D batteries having periodic or aperiodic interpenetrating electrodes are used since their electronic conductivity is typically higher than ionic conductivity in battery materials. Interpenetrating electrodes of high aspect ratio can have shorter ion diffusion length between electrodes while still taking advantage of the higher electronic conductivity along the electrodes to extract current. In the solid-state diffusion limit, the dimension that may determine the utilization of the battery capacity is the half-width x of the electrode features, for which the discharge time is $t=x^2/D_{Li}$.

Using tabulated room-temperature lithium chemical diffusivities ($D_{Li}$) for spinel and layered structure intercalation oxides, which fall in the range $1\times10^{-9}$ $cm^2$/sec to $5\times10^{-9}$ $cm^2$/sec, for a maximum 2C discharge rate (t=1800 sec), a half-thicknesses of about 6 to about 30 micrometers is useful. These kinetics and their limitations on particle dimensions are well-known to the battery field; $LiCoO_2$ is typically used as particles of 5 to 10 micrometers dimension, while $LiMn_2O_4$ has a higher and also isotropic lithium diffusion coefficient allowing roughly 25 micrometer particles to be used. $LiFePO_4$, on the other hand, has a much lower lithium diffusion coefficient requiring particle dimensions of <100 nm for high energy and power. $Li_4Ti_5O_{12}$ is similar to $LiFePO_4$ in this respect. Such materials may be used as fine-scale porous materials filled with suitable electrolytes. For $LiCoO_2$ and $LiMn_2O_4$, as well as related layered oxide and spinel compounds, a total electrode dimension of 10 micrometers to 30 micrometers may be desired. Also, for any reticulated structure, the smaller the feature size, the greater the inactive volume occupied by electrolyte/separators, binders and/or conductive additives. The results plotted in FIGS. 13 and 14 show that these materials, combined with a low lithium potential anode such as Li metal, Li alloys, or carbon-based electrodes, have desirable energy densities at the proposed electrode dimensions.

For non-planar form factors, a second issue in the fabrication of microbatteries is the electrode aspect ratio or feature height. While various lithography-based processes have been used recently to fabricate 3D electrodes, these experiments focus on laser micro-machining due to its suitability for fabricating highly aspected features with controlled taper. FIG. 4 illustrates these two geometric parameters, as well as the ability to design in controlled pore fraction for the counter-electrode. FIG. 4A shows 1.2 mm height at 200 micrometer to 250 micrometer feature width; FIGS. 4B and 4C illustrate the ability to control taper. As mentioned earlier, the spatial resolution of laser-micromachining can be determined by the thermal conductivity of the material. Preliminary laser-machining results on densified $LiMn_2O_4$ as one example indicates that it is possible to fabricate 3D electrodes having 5:1 to 20:1 aspect ratios at the cross-sectional dimensions desired.

Too high of an aspect ratio may be undesirable in some cases from the viewpoint of electronic polarization (voltage drop along the electrode), for example, in highly reticulated electrodes of thin cross-section. For $LiCoO_2$ and $LiMn_2O_4$ and related compositions, which have electronic conductivities $>10^{-3}$ S/cm at room temperature, the voltage drop at these aspect ratios is negligible (<0.1 V).

While laser-machining with a single focused beam is one approach, resulting in individually fabricated devices, scale-up to fabrication methods capable of producing many simultaneous devices from an oxide "wafer" (e.g., produced by hot-pressing) is also possible. Laser-machining remains an option for scaleup, using diffuse beams and physical masks, for example. However, other methods used in MEMS fabrication such as deep reactive ion etching are also possible.

The electrolyte layer may be LiPON. LiPON is a thin film electrolyte, which at 1 micrometer to 2 micrometers thickness provides a low impedance, high rate, low self-discharge electrolyte. The fabricated 3D electrode structures can be sputtered with LiPON. The uniformity of LiPON coverage can be evaluated by electron microscopy and electrical tests after deposition of the counterelectrode.

An alternative to LiPON is the electrodeposition of solid polymer electrolytes (SPEs) such as PEO-based compositions, or a polyelectrolyte multilayer approach. Recent work on electrophoretically formed batteries shows that electrodeposition is an effective conformal deposition technique for PEO-based electrolytes. For typical room temperature conductivities of $10^{-5}$ S/cm to $10^{-4}$ S/cm, the electrolyte is not limiting, at a few micrometers thickness.

Selection and deposition of the counterelectrode may be performed as follows. 3D micromachined structures may be formed out of the positive electrode for electronic conductivity reasons discussed earlier. For the negative electrode that will fill the pore space after deposition of the electrolyte film, lithium metal, a lithium metal allow such as LiAl, or a graphite-based suspension can be used, with a cell structure designed to achieve cell balance. Graphite based anodes such as MCMB can be formulated similarly to conventional lithium ion anodes, except that in the absence of liquid electrolytes, SPE can be used as a binder phase. These suspensions can be used to infiltrate the pore space in the electrolyte-coated 3D structure.

Figure 15A:
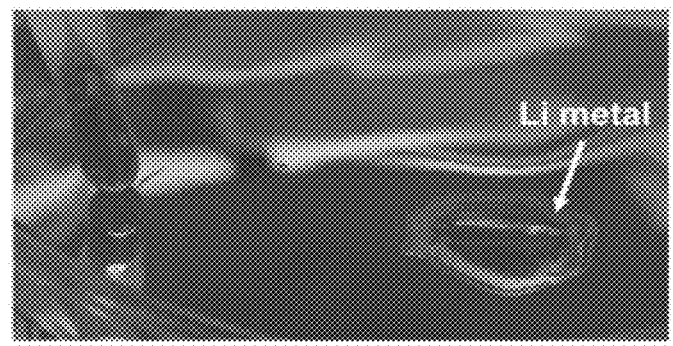
FIGS. 15A-15B illustrate the deposition of liquid lithium on a wet oxide surface, in accordance with still another embodiment of the invention.
Figure 15B:
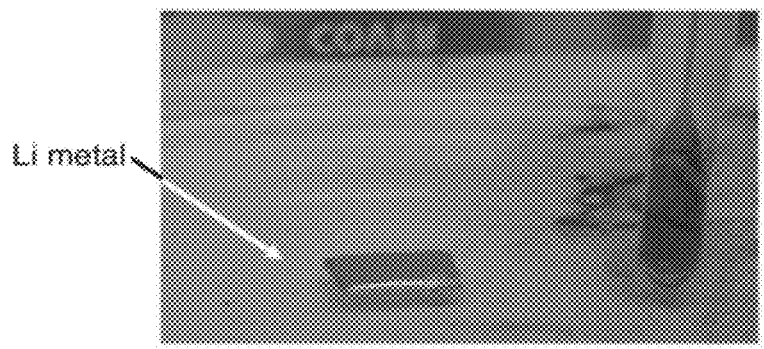

For the deposition of 0.5 mm to 1 mm thick lithium metal, given the low melting point (181° C.) of lithium metal, it would be attractive to use liquid metal infiltration to fill the 3D structure. A difficulty is that, like other liquid metals, lithium has a high surface tension and does not as easily wet oxides or polymers. Thus, a "flux and solder" method is used in this example, by which liquid lithium can be made to wet oxide surfaces. By first sputtering a thin layer of a metal that alloys with Li, such as Au, reactive wetting of the sputtered surface occur readily. This was demonstrated on glass surfaces, as shown in FIG. 15, with various configurations and various discharge rates. Thus, a sputtered metal layer applied to the electrolyte surface can be used to enable subsequent infiltration by lithium metal, filling the 3D electrode structure (FIG. 11). In order to control the amount of lithium metal that is deposited, the liquid lithium may be dispensed through a syringe or to dispense and then melt the solid lithium metal powder (SLMP) available from FMC corporation, which is passivated with a surface phosphate layer to allow handling in air and certain organic solvents.

Self-organization as an assembly method may also be used for selection and deposition of the counterelectrode. A colloidal-scale self-assembly method for bipolar-devices may be used in which repulsive forces between dissimilar materials are used to form electrochemical junctions at the same time that attractive forces between like material are used to form percolating conductive networks of a single electrode material. A demonstration of this approach is shown in FIG. 12, in which the percolating network is MCMB. The present 3D forms a dense and continuous 3D electrode from the less conductive material.

One of the challenges in microbattery technology, including thin-film batteries, has been the development of effective hermetic packaging with minimal contributed volume. The 3D design in this example uses densified oxide for hermetic sealing on all except the top surface (FIG. 11). Thus final sealing of the battery can be accomplished by deposition from the top of a suitable packaging material. A parylene-based packaging material, on top of which is typically sputtered a metal film for hermeticity may be used, or a dense insulating oxide coating by physical vapor methods may also be used.

EXAMPLE 3

In this example, it is shown that a porous sintered electrode of $LiCoO_2$ of greater than 0.5 mm minimum cross-sectional dimension that is infused with a liquid electrolyte can, surprisingly and unexpectedly, be electrochemically cycled while obtaining nearly all of the available ion storage capacity over at least 20 cycles at C/20 rate with minimal capacity fade and no apparent detrimental mechanical damage to the electrode. This shows that such electrodes can effectively be used in certain batteries of the invention.

A battery grade LiCoO$_2$ powder from Seimi Corporation (Japan) having 10.7 micrometers d$_{50}$ particle size was pressed and fired at 1100° C. in air to form a porous sintered ceramic having about 85% of the theoretical density of LiCoO$_2$. In one instance, a plate of this electrode having 0.66 mm thickness was prepared, as shown in FIGS. 8A and 8B. This electrode plate was attached to a gold foil current collector and assembled for testing in a sealed polymer pouch-cell, using lithium metal foil as the counterelectrode, a copper current collector at the negative electrode, a porous polymer separator of 20 micrometer thickness, and a liquid electrolyte having a 1.33 M concentration of LiPF$_6$ in a mixture of alkyl carbonates.

Figure 16A:
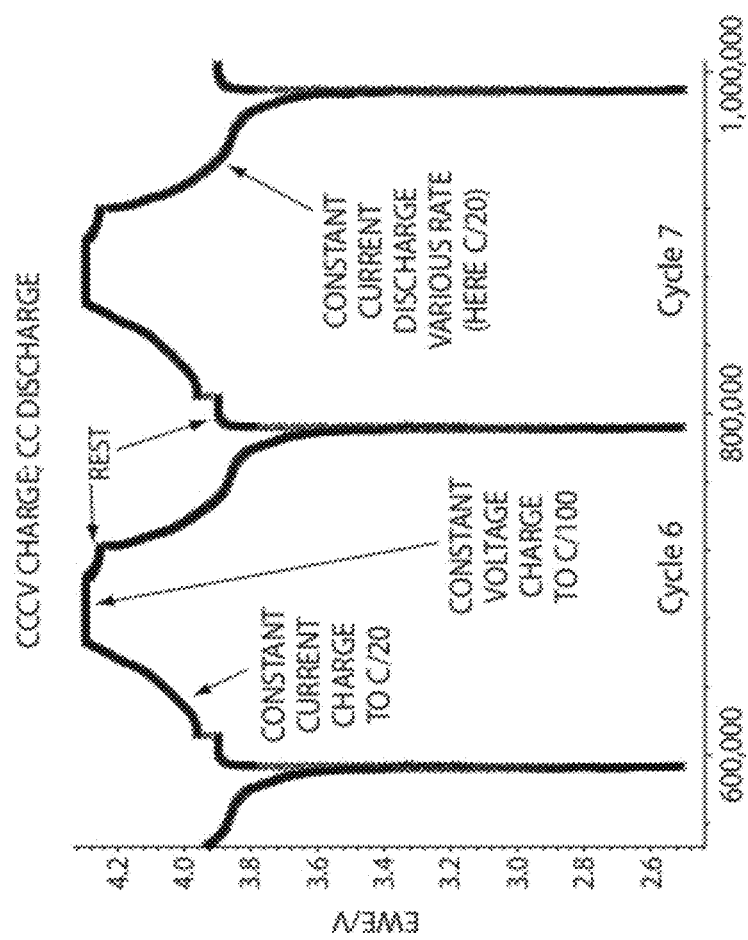
FIGS. 16A-16B show electrochemical test results of porous LiCoO$_2$ electrodes prepared in accordance with certain embodiments of the invention.
Figure 16B:
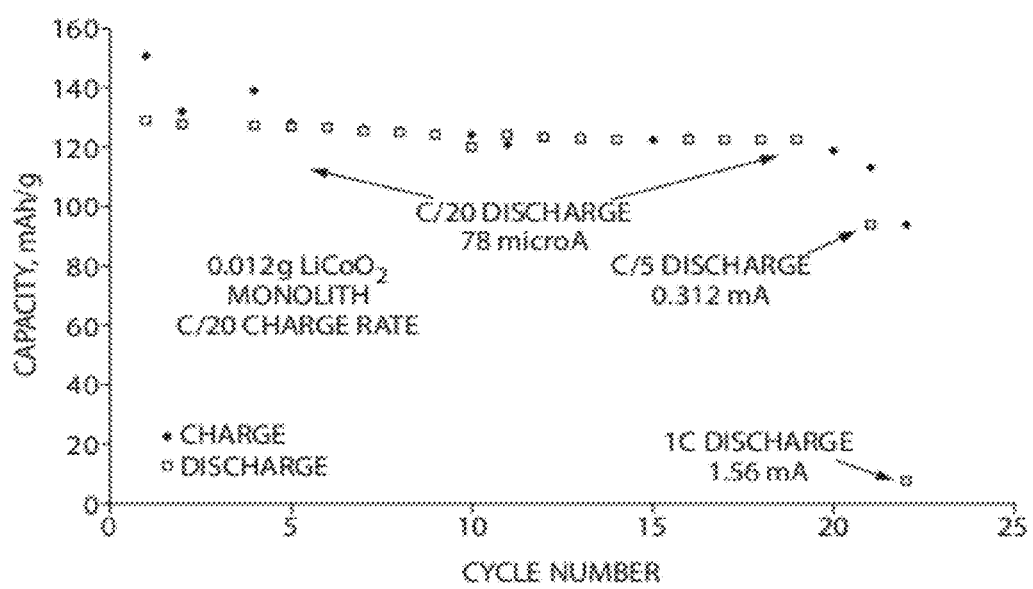

FIG. 16A shows the 6$^{th}$ and 7$^{th}$ charge-discharge cycles of this cell. The charge protocol used a constant current at C/20 rate to an upper voltage of 4.3 V, followed by a constant voltage hold until the current decayed to C/100 rate, followed by an open-circuit rest, followed by a constant current discharge to 2.5 V. FIG. 16B shows the charge and discharge capacities observed over 20 cycles at C/20 discharge rate, followed by discharges at C/5 and 1C rate. The C/20 discharge capacity was about 130 mAh/g, essentially the same as the value observed for this LiCoO$_2$ over this voltage range in standardized tests. This shows that this porous electrode was able to accept and discharge nearly all of the lithium storage capacity at C/20 rate. Even at C/5 rate, the capacity was above 90 mAh/g. Furthermore, there was very little capacity fade over 20 cycles at C/20 rate. When this electrode is packaged as a complete microbattery according to the earlier described construction and methods, the volume is 6.4 mm$^3$ and the projected energy density based on the measured cathode performance is 954 W h/L.

Remarkably, this sample was found to exhibit no apparent signs of mechanical failure after this electrochemical test, as shown in FIG. 9.

In other instances, the electrodes shown in FIGS. 2 and 7 were produced from the same starting sintered ceramic using laser micromachining, and were assembled into a test cell and electrochemically tested in the same manner. These test electrodes exhibited similar electrochemical performance to the electrode of FIG. 16. Based on the electrochemical tests of each of these electrodes, in fully packaged form, the electrode of FIG. 2 produces a battery of 5.72 mm$^3$ volume and 1022 W h/L energy density, while the electrode of FIG. 7 produces a battery of 5.74 mm$^3$ volume and 1300 W h/L.

EXAMPLE 4

In this example, it is shown that a porous sintered electrode of a lithium transition metal phosphate olivine that is infused with a liquid electrolyte can, surprisingly and unexpectedly, be electrochemically cycled while obtaining nearly all of the available ion storage capacity over at least 30 cycles at C/10 rate with minimal capacity fade. This shows that such electrodes can effectively be used in certain batteries of the invention.

A powder of a Nb-doped, nanoscale lithium iron phosphate material such as is described in U.S. patent application Ser. No. 10/329,046, filed Dec. 23, 2002, entitled "Conductive Lithium Storage Electrode," by Chiang, et al., published as U.S. Patent Application Publication No. 2004/00055265 on Jan. 8, 2004 (incorporated herein by reference), was uniaxially pressed into a ½ inch disk at a pressure of 20,000 psi (1 psi=6.89475 kilopascals) and sintered in a tube furnace at 775° C. for 2 hours in Ar atmosphere.

After sintering, the material was observed using scanning electron microscopy to have a primary particle size of 100-200 nm. The density of the disk was measured to be 72% by the Archimedes method. The disk was polished to 0.305 mm thickness using 5 micron grit size silicon carbide polishing paper and cut using a diamond wire saw to a rectangular dimension of 3.48 mm by 2.93 mm by 0.305 mm. The sample weight was 7.3 mg. The sample was assembled as the positive electrode in an electrochemical test cell made using Swagelok fittings using 150 micrometer Li foil (7/16" inch in diameter) as both the counter and reference electrode. Celgard 2320 (½" inch in diameter) was used as the separator. A liquid electrolyte having a 1.33 M concentration of LiPF$_6$ in a mixture of alkyl carbonates was used. The cell was galvanostatically charged at C/20 for the first cycle and at C/10 for all the subsequent cycles. All the discharge rates are C/10 unless otherwise indicated. The voltage window was between 2 and 4.2 V.

Figure 17B:
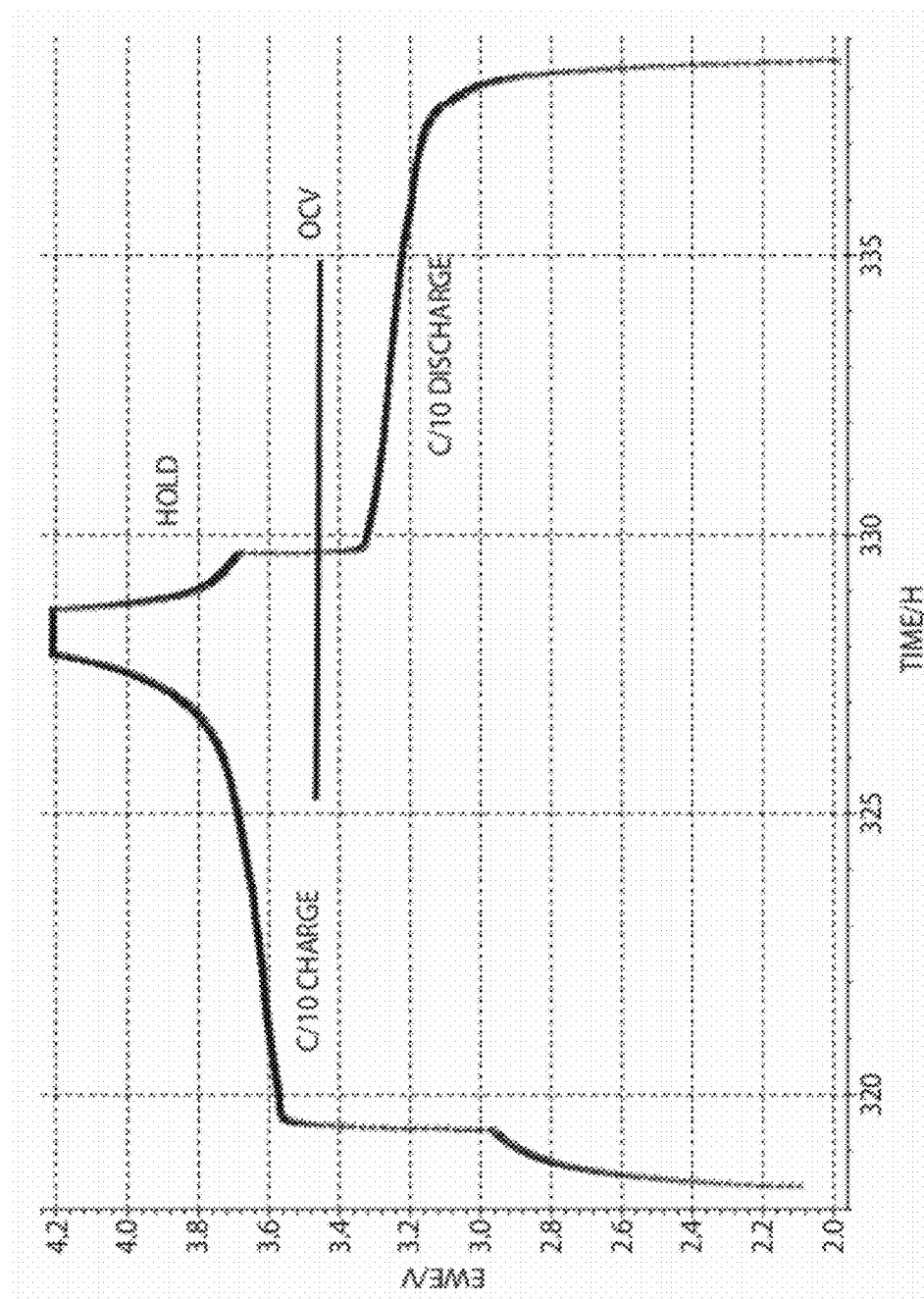

FIG. 17A shows the specific capacity as a function of cycle number for the cathode, which comprised sintered doped olivine phosphate, and shows that almost no capacity fade occurred over 40 cycles. FIG. 17B shows voltage vs. time of the 30$^{th}$ galvanostatic charge/discharge cycle of the cathode. The cathode had a density of 72% and was 0.305 mm thick. These results demonstrate that the sintered cathodes of the invention can be usefully employed in the batteries of the invention.

EXAMPLE 5

This example demonstrates a sintered porous electrode onto which is comformally deposited a dense solid electrolyte film and that it can be used as an electrode in the batteries of certain embodiments of the invention. LiCoO$_2$ powder with a mean particle size of 10-11 micrometers was purchased from a commercial vendor. 35 g of the powder was milled for 5 days in a zirconia jar mill using zirconia milling balls. After milling, the mean particle diameter fell to 4-5 micrometers. 3.5 g of the milled powder was pressed into a ½-inch diameter pellet (about 1.27 cm) under a pressure of 100 MPa in a uniaxial press. The pellet was placed onto an alumina plate, covered with loose LiCoO$_2$ powder, covered by an inverted alumina jar and sintered under air for 1.5 hrs at 950° C. The densified cylindrical pellet was recovered and sliced into 0.8 mm thick disks.

One of the LiCoO$_2$ disks was simultaneously thinned down to 0.4-0.5 mm thickness and polished to a mirror-like finish using silicon carbide abrasive pads of increasingly finer grit size down to 1.0 micrometer. The disk was affixed onto an alumina plate and diced into 2.2 mm×2.2 mm squares. The squares were mounted into a metallic fixture and placed into a custom-built vacuum deposition chamber. In several hours, the exposed top surface of each square was coated with an ~0.5 micrometer thick lithium phosphorous oxynitride (LiPON) coating that was also visible to the eye by its iridescence. The coated electrode was assembled and tested in an electrochemical cell as described in Example 4.

Figure 18A:
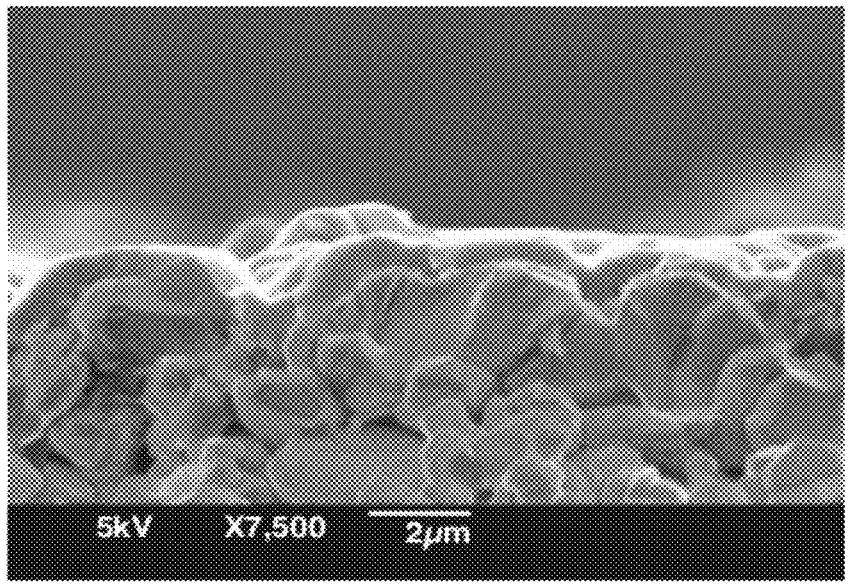
FIGS. 18A-18B show a conformal lithium phosphorus oxynitride layer sputtered onto a porous sintered LiCoO$_2$ cathode, in accordance with another embodiment of the invention.
Figure 18B:
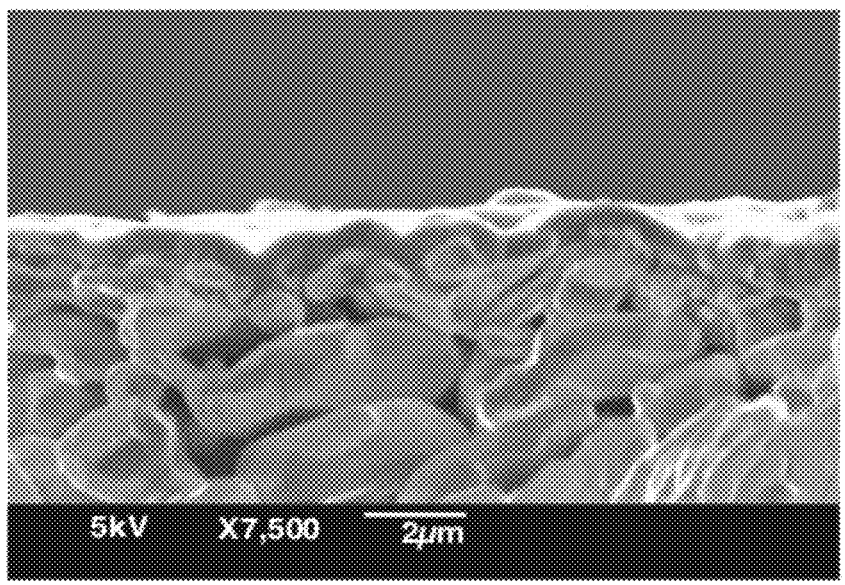
Figure 19:
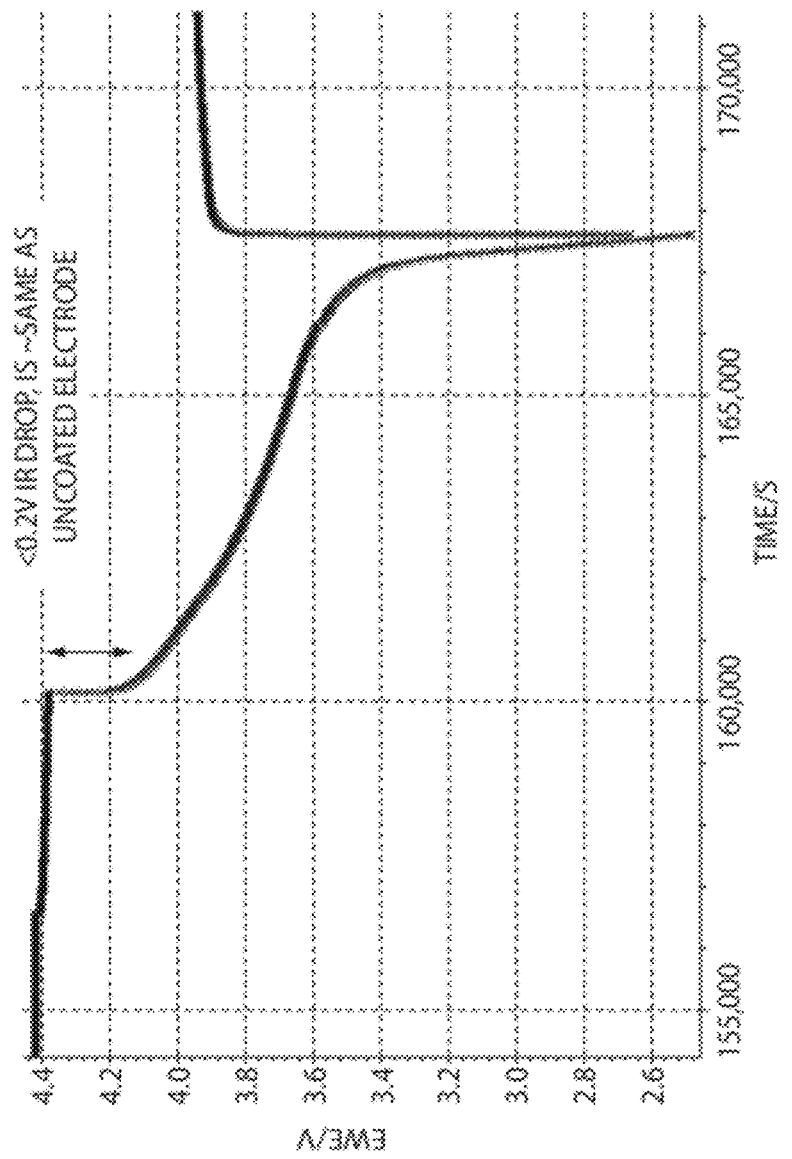
FIG. 19 shows a galvanostatic test of a porous sintered LiCoO$_2$ cathode conformally coated with an approximately ~0.5 micrometer thick film of lithium phosphorus oxynitride, in yet another embodiment of the invention.

FIG. 18 shows a scanning electron microscope image showing the continuous, conformal LiPON coating. FIG. 19 shows that in galvanostatic cycling, such a film presented very little additional resistance compared to an uncoated electrode.

EXAMPLE 6

Figure 20A:
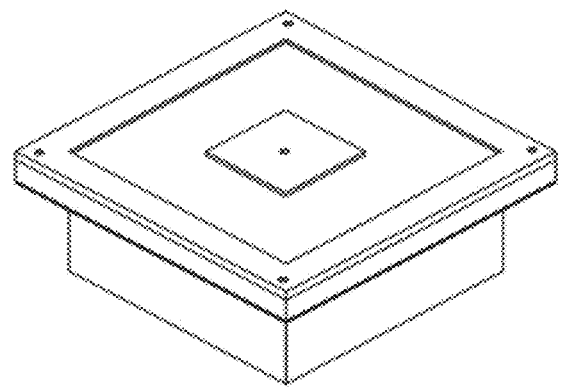
FIGS. 20A-20B illustrates microbattery packaging comprising an electroformed gold can and copper foil lid, in still another embodiment of the invention.
Figure 20B:
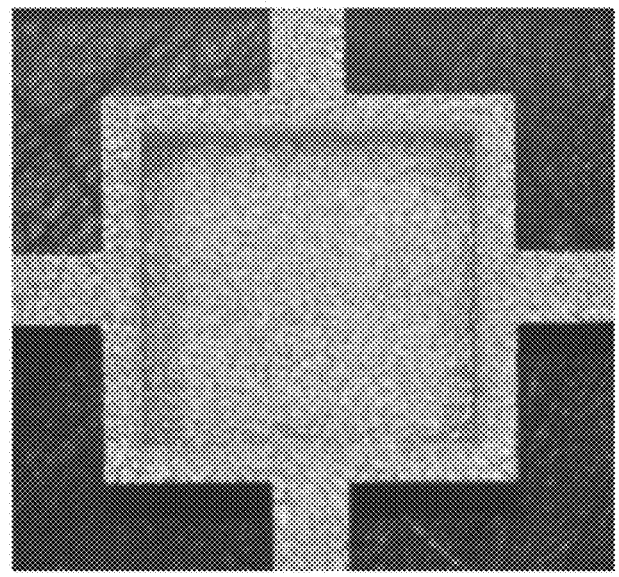

This example demonstrates high energy density packaged microbatteries made using certain sintered porous electrodes of the invention. Two microbatteries are described in this particular example, made using the following procedure. A sintered porous $LiCoO_2$ electrode (2.20 mm by 2.20 mm by 0.37 mm), made as described in Example 3, was put into a electroformed gold can (2.5 mm by 2.5 mm by 0.7 mm), shown in FIG. 20, using a conductive paste made of polyvinylidene fluoride (PVDF), vapor grown carbon fibers (VGCF), and high surface area carbon black. A Celgard 2320 separator was glued onto the flange of the can on three sides using a visible light curable glue, Loctite 3972. A small piece of Li was put on a 10 micrometer thick copper foil lid cut to fit on top of the can, and heated at 100° C. for 20 minutes. Four holes were punched around the Li using a small needle to allow for subsequent infiltration by liquid electrolyte. The copper foil lid, with the lithium metal negative electrode facing the open top of the can, was glued onto the separator using Loctite 3972 on the same three. The whole cell was immersed in a liquid electrolyte, of the kind described in Example 3, for 24 hours and then was galvanostatically charged to 4.6 V at a C/12 rate and discharged at a C/2.7 rate to 3V.

Figure 21:
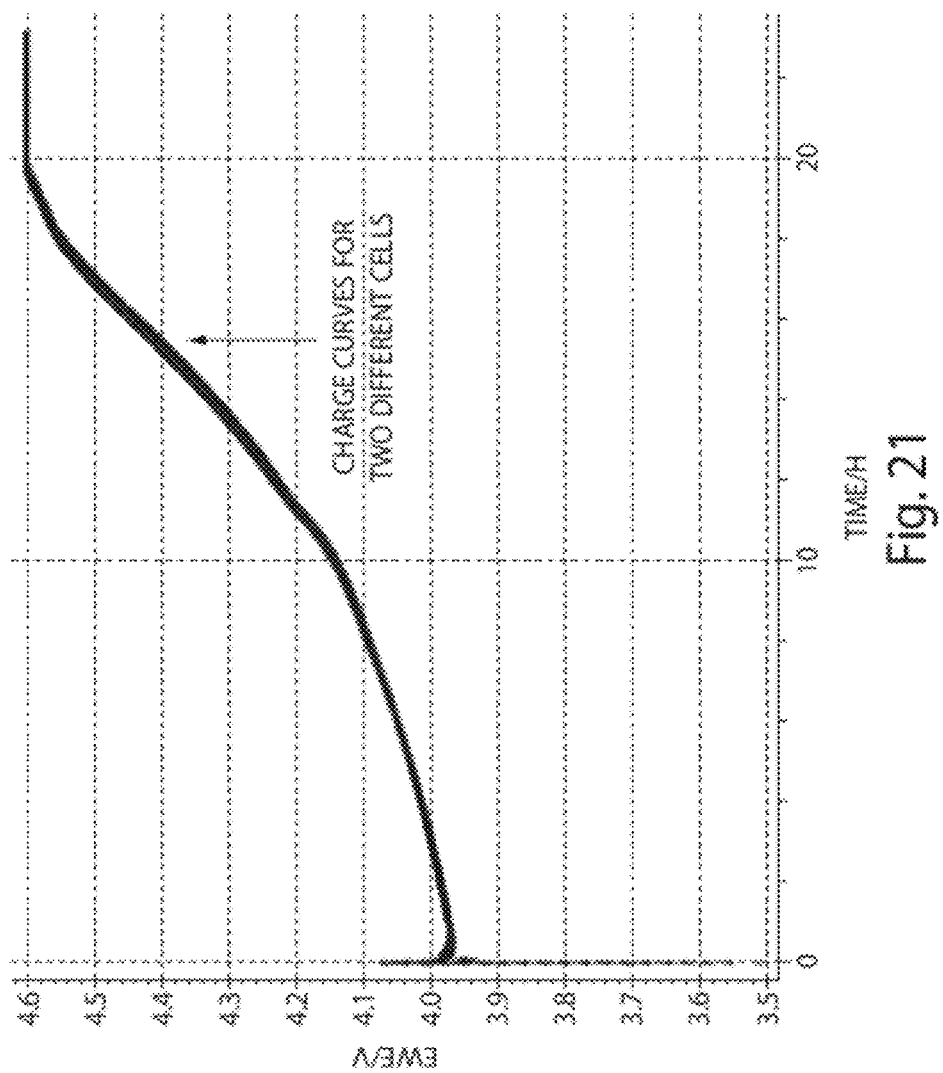
FIG. 21 shows the first charge curve for two microbatteries made using sintered electrodes, in one embodiment of the invention.
Figure 22:
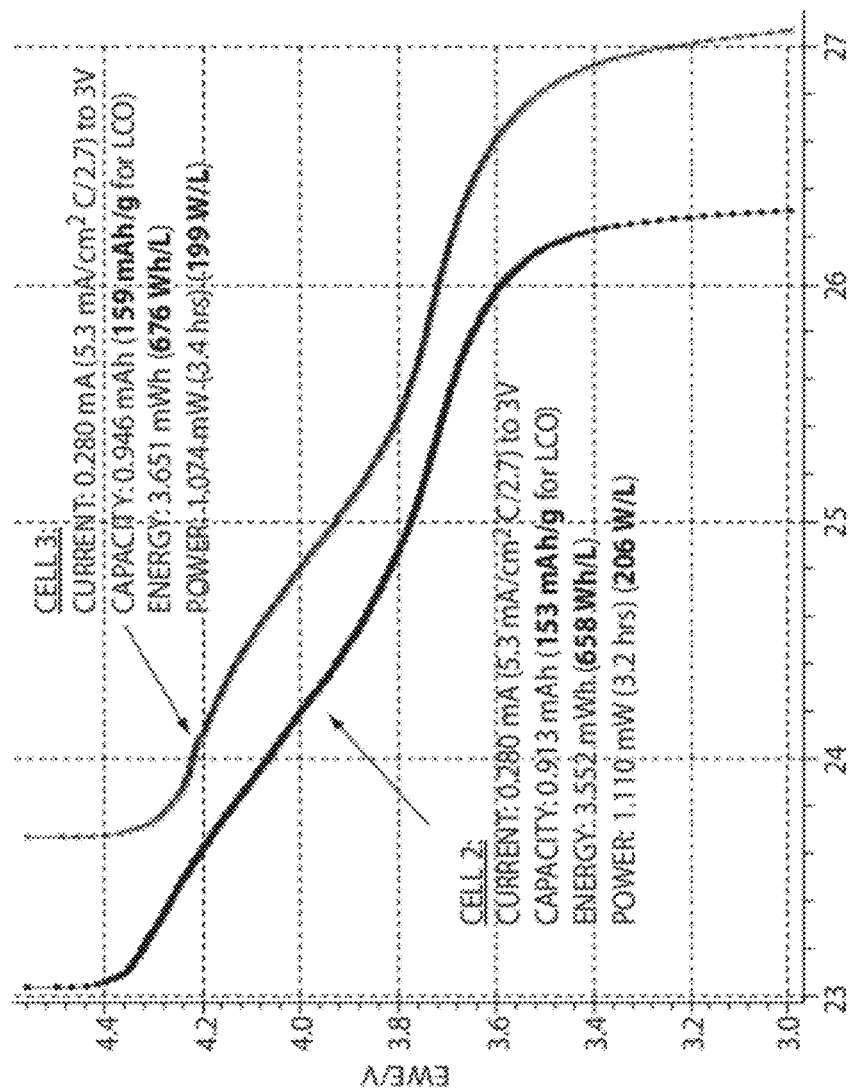
FIG. 22 shows the first discharge curves for two microbatteries produced in accordance with another embodiment of the invention.
Figure 23:
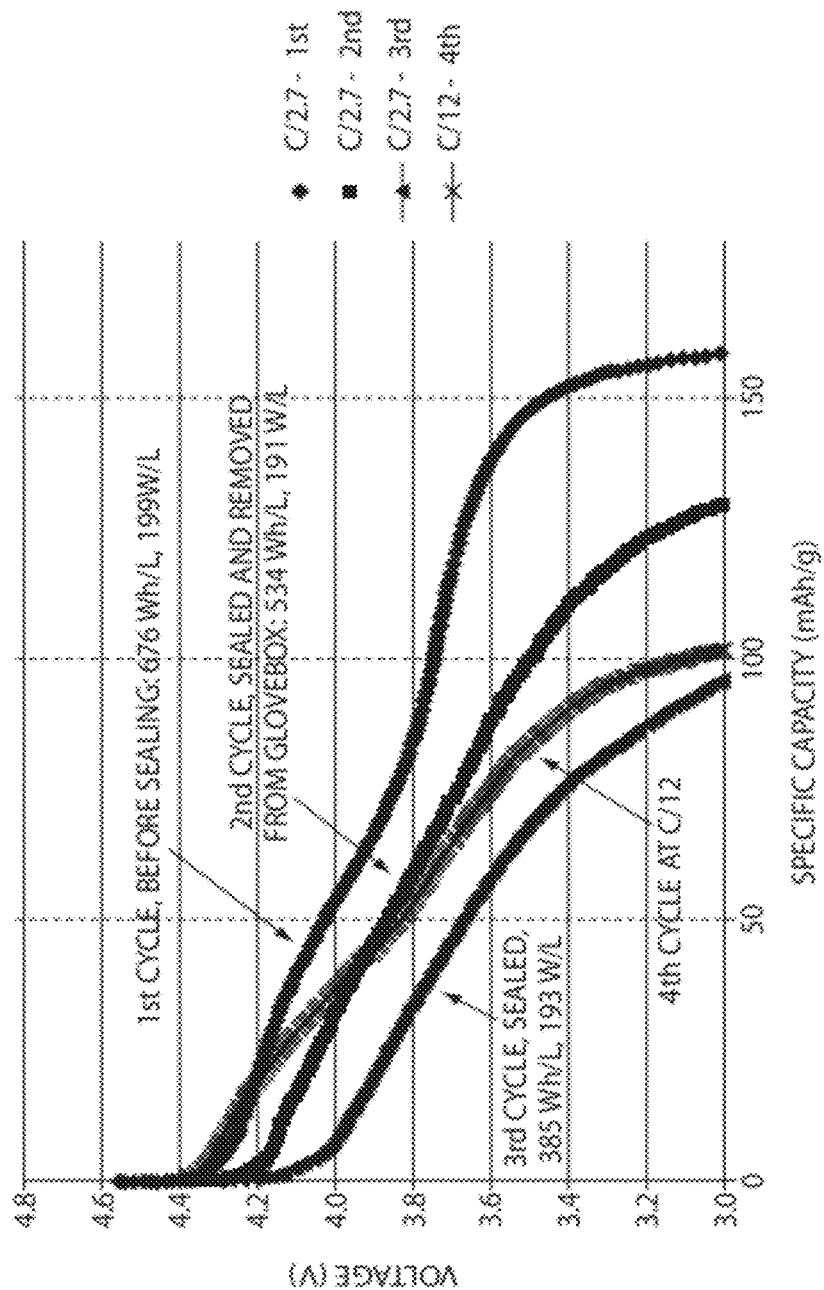
FIG. 23 shows the first four discharge curves for a microbattery produced in yet another embodiment of the invention, showing voltage vs. the specific capacity of the sintered LiCoO$_2$ cathode.

FIG. 21 shows that both cells can be charged smoothly to 4.6V. FIG. 22 shows that in the first discharge, both cells exhibited high energy densities of 676 W h/L and 658 W h/L respectively, at about 200 W/L power. After the first cycle, excess electrolyte was cleaned from the surface of the cell and the electrolyte infiltration holes were sealed using Loctite 3972. The cell was then sealed on all its surfaces with Hardman fast-setting 3 minute epoxy and tested further. FIG. 23 shows the specific capacity of the cathode during the first 4 cycles of one of the cells. In the second and third discharges under the same current as the first cycle, the capacity and energy had decreased, but remained still very high. The $4^{th}$ cycle was conducted at a C/12 rate, and shows that the cell had diminished in its capacity to about 100 mAh/g. This behavior corresponds to the behavior reported in the literature for $LiCoO_2$ charged to 4.6 V, and shows that the sintered cathode in the microbatteries of the invention can be used to prepare high energy density microbatteries.

EXAMPLE 7

This example demonstrates a high energy density bicell battery made according to certain embodiments of the invention. Sintered $LiCoO_2$ electrodes were made according to the method of Example 5 and sliced into two 0.8 mm thick disks that were then thinned down to 0.4 mm thickness and polished to a mirror-like finish using silicon carbide abrasive pads of increasingly finer grit size down to 3 micrometers.

Aluminum current collector strips with a wide end size matched to the circular $LiCoO_2$ was cut out of 35 micrometer thick aluminum foil. The wide ends were coated with a thin layer of a conductive paste made of polyvinylidene fluoride (PVDF), vapor grown carbon fibers (VGCF), and high surface area carbon black. The $LiCoO_2$ disks were attached to the current collector strips using the conductive paste. The strips were air dried for an hour first and then vacuum-dried for 12 hours at 90° C. After drying, the $LiCoO_2$ disks were found to be bonded well to the aluminum strip. The end of the strip with the attached $LiCoO_2$ disks was soaked in a liquid electrolyte mixture for 12 hours to ensure infiltration.

Lithium negative electrodes were cut from a 150 micrometer-thick lithium sheet to match the size of the disk cathodes. These lithium pieces were pressed onto two sides of a 10 □m thick copper foil, serving as the negative current collector.

Figure 24A:
FIGS. 24A-24C illustrate a bicell fabricated using sintered LiCoO$_2$ cathodes, and test results using the bicell, in still another embodiment of the invention.
Figure 24B:
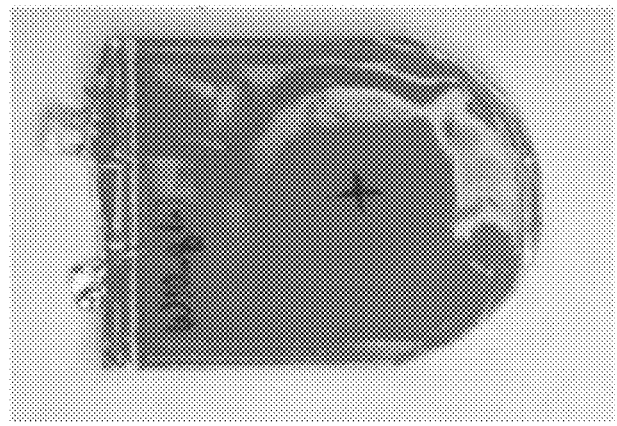
Figure 24C:
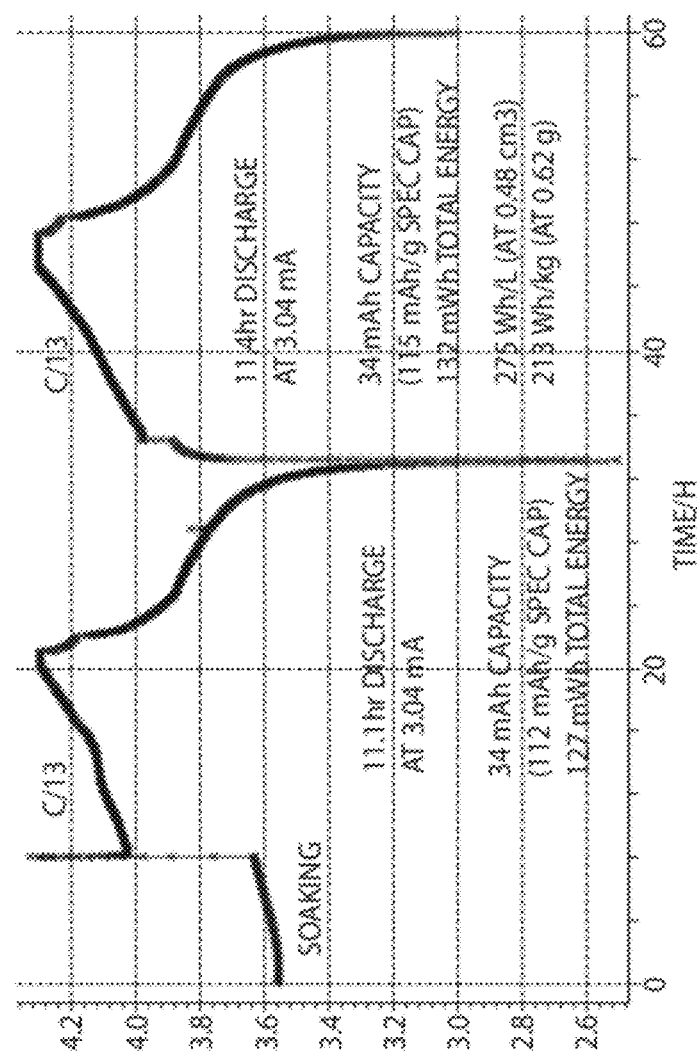

An electrochemical bicell as illustrated in FIGS. 24A-24C was constructed from the positive and negative electrodes, with a layer of Celgard 2320 separator separating the two, and polymer packaging heat-sealed around the electrode assemblies. Some additional liquid electrolyte was added to the cell before vacuum sealing. FIG. 24 shows that the bicell could be charged and discharged between 4.3 V and 2.5 V, but exhibited a high energy density and specific energy compared to other lithium ion cells of comparable size (e.g., about 0.5 cm$^3$ volume), of 275 W h/L and 213 W h/kg respectively.

EXAMPLE 8

In this example, it is shown that porous sintered electrodes produced according to one embodiment of the invention exhibit high levels of capacity utilization and high energy density that exhibit surprising combinations of low electrode porosity, high electrode thickness, high capacity per unit area of electrode, while being utilized at relatively high C-rates. For instance, this example shows that sintered $LiCoO_2$ electrodes with 74% to 87% of the theoretical density, and 0.26 mm to 0.80 mm thickness, yield specific capacities greater than 85% of that expected for the same powder when prepared as a conventional battery electrode. Furthermore, this example shows that more than 85% of the intrinsic specific capacity of the material can be obtained at a C/3 rate in electrodes simultaneously having greater than 0.25 mm thickness and greater than 70% sintered density. At this lower limit of thickness and density, in the case of $LiCoO_2$ cycled over a potential range yielding 140 mAh/g specific capacity and at a C/3 rate, the area capacity was 12.3 mAh/cm$^2$, which is more than about 3.5 times greater than that of conventional powder-based $LiCoO_2$ electrodes. For a sintered electrode of 0.40 mm thickness and 85% of the theoretical density, tested at C/3 rate, the specific capacity reached about 155 mAh/g, providing an area capacity of about 26.4 mAh/cm$^2$. Electrodes that are able to deliver such high values of area capacity at these C-rates are novel in the field of lithium rechargeable batteries and in battery technology in general.

To design such electrodes, active materials were first selected that had a particle or crystallite size in the final electrode that was small enough to permit high utilization at the current rates used for the electrode. That is, solid state diffusion in the sintered particulates should not present the rate-limiting step in electrochemical cycling. Methods to determine the particle or crystallite or grain size of a sintered material are well-known to those skilled in the art. The ability of a particular particle size or size distribution to provide high utilization at the desired C-rates is readily tested, for instance by preparing a very thin sintered electrode or by crushing the sintered electrode to a powder that is then tested as a conventional powder electrode. In the present example, $LiCoO_2$ had sufficiently high capacity at high C-rates, for instance greater than 130 mAh/g capacity at 10C rate in a powder based electrode, that the particles themselves were not rate-limiting. Sintered electrodes were made according to the procedure discussed in Example 3, except that the starting battery grade $LiCoO_2$ powder from Seimi Corporation (Japan) having 10.7 micrometers $d_{50}$ particle size was first milled in a zirconia jar mill using zirconia milling media in order to reduce the $d_{50}$ particle size to about 4 micrometers. The powder was pressed into disc shaped samples of about 12.7 mm (0.5 inch) diameter and about 1 mm thickness, then fired in air at various times and temperatures to form porous sintered ceramics having a range of sintered densities. For example, to obtain 74% of the theoretical sintered density, firing was conducted using a 1:50 ramp in temperature (i.e., a 1 hour and 50 minute ramp) to 950° C., a 1:30 hold at 950° C., and a 1:50 cooldown to room temperature; and to obtain 87% of the theoretical density, firing was conducted using a 1:50 ramp to 1050° C., a 1:30 hold at 1050° C., and a 1:50 cooldown to room temperature. Afterwards, both sides of the pellet were polished to remove dense surface material, and to obtain uniform thickness. The sintered samples were then cut into plates of uniform thickness and tested in pouch-type or Swagelok-type cells using lithium metal foil as the counterelectrode, a copper current collector at the negative electrode, a porous polymer separator of 20 micrometer thickness, and a liquid electrolyte having a 1.33 M concentration of $LiPF_6$ in a mixture of alkyl carbonates.

Figure 25A:
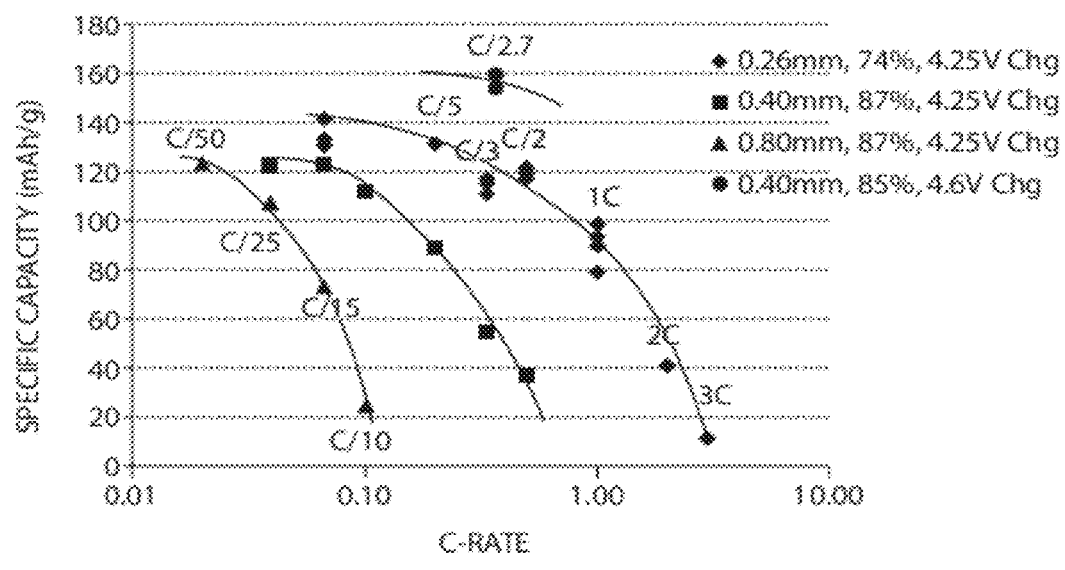
FIGS. 25A-25B illustrate discharge characteristics for certain electrodes of the invention.

FIG. 25A shows the specific discharge capacity vs. C-rate obtained from the $LiCoO_2$ electrodes of varying thickness (260 micrometers to 800 micrometers) and active materials volume fraction (74% to 87%), charged to 4.25 V and 4.6 V. The discharge capacity is shown for several electrodes in which the thickness and density were varied. The lower two curves show cases in which the thickness and/or density of the electrodes were relatively high and the intrinsic capacity is available at C/20 rate or lower. The upper two curves show instances where >85% or more of the theoretical capacity at the respective charge voltages (4.25 V and 4.6 V) were obtained at ~C/3 rate.

From these results, combinations of the sintered density of the electrode and the thickness of the electrode that allow high utilization at useful C-rates can be determined. For instance, by taking the density as the percentage of the theoretical density of the compound, and the thickness in units of millimeters, ranges for the product of the two can be identified, in units of %-mm, that comprise useful electrodes. For example, a 3 mm thick electrode of fairly low sintered density of 50% may be effective in some cases. This produces a product of 150%-mm. Also, a 90% dense electrode of 0.25 mm thickness can be effective, yielding the product 22.5%-mm. Or, for higher rate capability, a 50% dense electrode of 0.25 mm thickness may be effective. This electrode has a product 12.5%-mm. The same dimensional units may be applied in the case where the product of the open porosity of the electrode and the thickness are considered. Total porosity is (100−% density); however, open porosity is what is accessed by infiltrated electrolyte. The open porosity in the electrodes of the invention may range from 10% to 50%. The product of open porosity and thickness of useful electrodes may span a range from about 150%-mm to about 2.5%-mm.

Yet another metric is the total capacity per unit area of electrode. The electrodes of the invention are able, in some embodiments, to provide a higher capacity per unit area compared to conventional electrodes, e.g., between about 10 mAh/$cm^2$ and about 100 mAh/$cm^2$. The latter number represents, for example, a 3 mm thick $LiCoO_2$ electrode of 50% density, having a density of 5.01 g/$cm^3$ and a specific capacity of 140 mAh/g, which may provide useful utilization at low rates based on the data of this example.

Figure 25B:
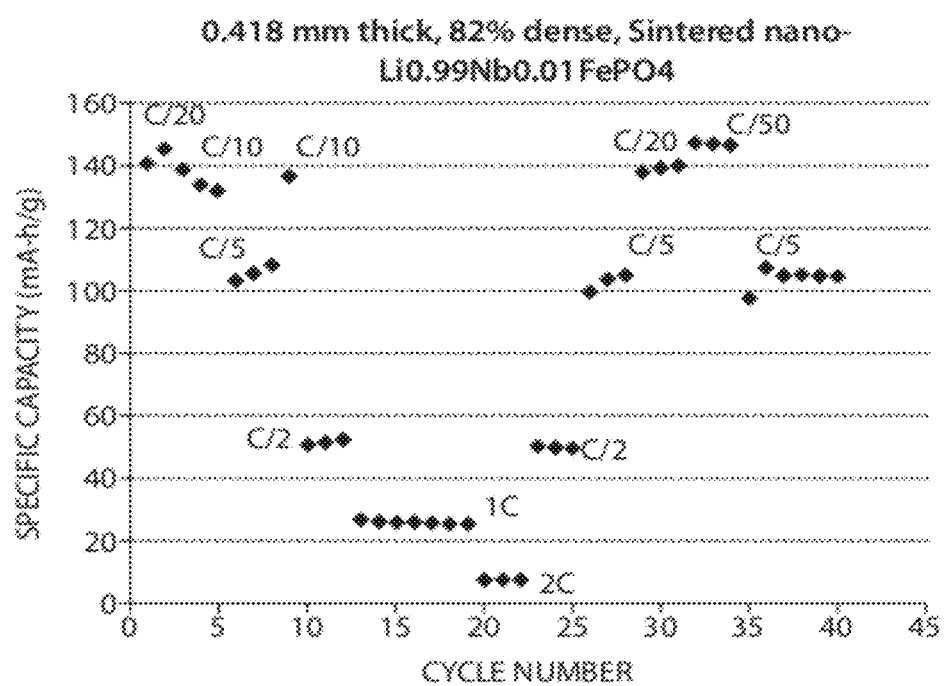

FIG. 25B shows the discharge capacity obtained upon cycling a sintered nanoscale olivine $Li_{0.99}Nb_{0.01}FePO_4$ electrode of 418 micrometer thickness and 82% by volume of active material at various rates out to cumulatively 40 cycles. The C-rate profile was designed to show the capacity upon cycling to a higher rate and then returning to lower rates. Notice that the discharge capacity was not noticeably degraded upon returning to each C-rate. Examination after cycling showed no detectable mechanical damage.

The results of this and other experiments demonstrates another optional feature of the invention, which is the selection of active materials that have a higher level of electronic conductivity over the majority of the composition range over which they are cycled, compared to either the fully lithiated or delithiated states. For instance, the electronic conductivity of typical positive electrode compounds is, generally speaking, orders of magnitude lower that that of commonly used negative electrodes such as graphite or the metal alloys. This has necessitated the addition of conductive additives to positive electrode formulations. However, by providing a dense interconnected network of this low-conductivity component, lower cathode impedance with less or no conductive additive can be achieved in some cases.

Figure 26:
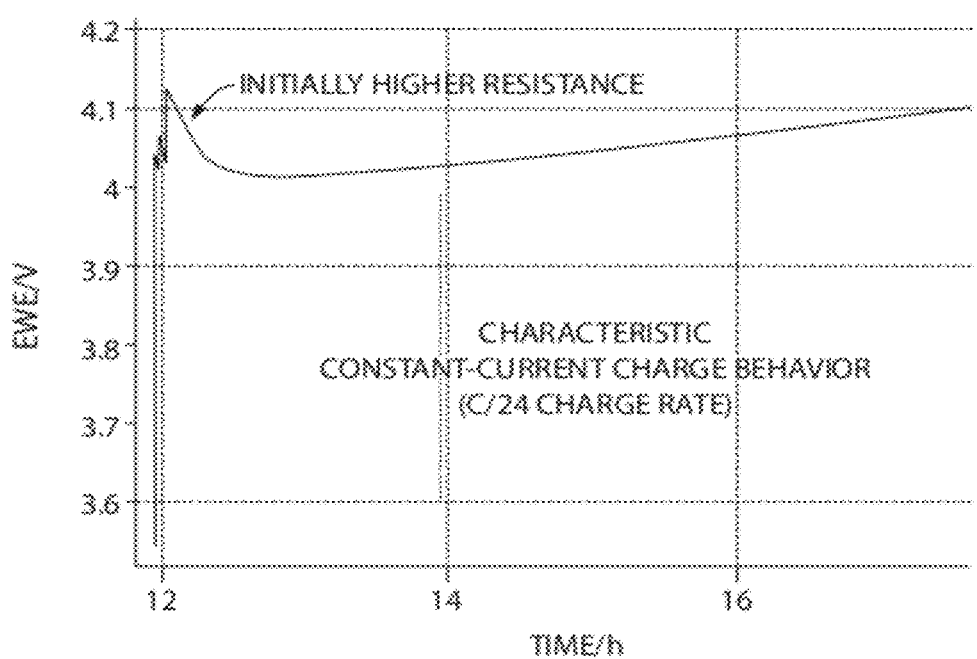
FIG. 26 illustrates the effect of increasing electronic conductivity upon delithiation of electrodes of another embodiment of the invention.

Also, some intercalation oxides increase in their electronic conductivity as they are delithiated; $Li_{1-x}CoO_2$ as one example undergoes an insulator-to-metal transition at x~0.03. However, the impact of increasing electronic conductivity upon delithiation is illustrated in FIG. 26. This figure shows the effect of increasing electronic conductivity upon delithiation of $Li_{1-x}CoO_2$ in the polarization occurring at very low state-of-charge. The polarization decreased rapidly as the composition reached values of x corresponding to the insulator-to-metal transition. This may be attributed to the fact that the $Li_{1-x}CoO_2$ network in the electrode becomes increasingly conductive, or even metallic, as the x value increases beyond about 0.03. Impedance spectra (not shown) taken on these cells were consistent with this interpretation; these results suggested that proper electrode design and compound selection can provide low impedance, very high capacity electrodes that have essentially no conductive additive.

Figure 27A:
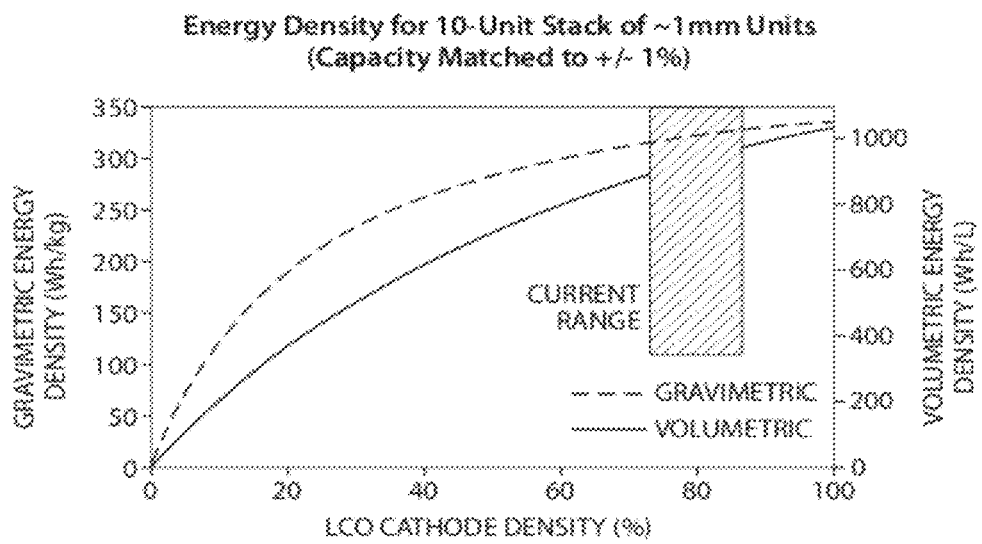
FIGS. 27A-27B illustrate a model of an electrode having a stacked prismatic cell configuration, in yet another embodiment of the invention.
Figure 27B:
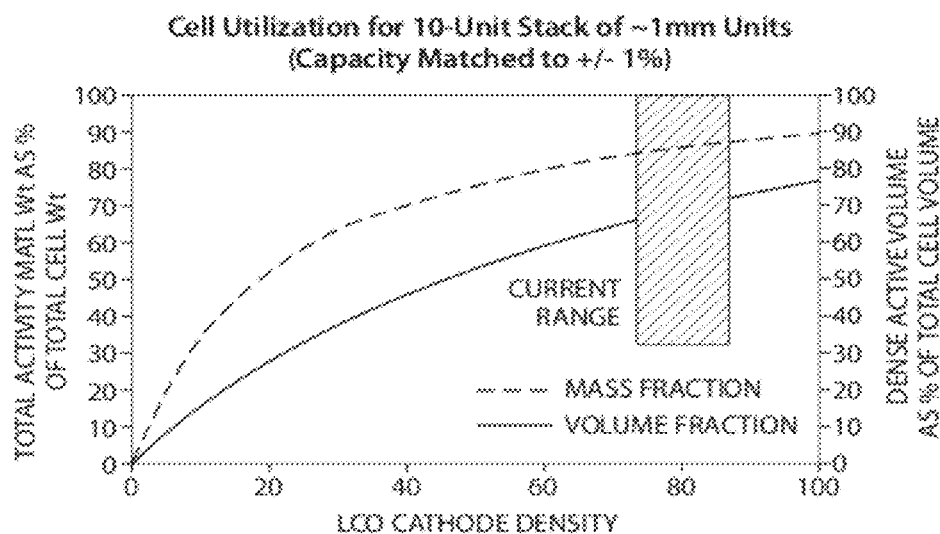

High specific and volumetric energies were also achievable when such electrodes were deployed in real cells. The mass utilization of active material and the resulting specific energy and energy density of full-scale cells based on the invention were readily computed: FIGS. 27A-27B shows results (energy density and cell utilization, respectively) for a stacked prismatic cell having 90 $cm^3$ volume and 21 Ah capacity, using 10 cathode layers of 1 mm thickness (the half-cell thickness is equivalent to an electrode thickness of 0.50 mm in FIG. 25A, assuming graphite negative electrodes. For $LiCoO_2$ electrodes of the densities shown in the above examples, the specific energy exceeded 300 Wh/kg and the energy density exceeded 900 Wh/L.

It should be understood that other cathode materials that are isostructural or structural derivatives of $LiCoO_2$, generally known as "layered" oxides within the ordered rock salt structure family, may be substituted in whole or in part for $LiCoO_2$. These include, but are not limited to, compounds such as $LiNiO_2$, $Li_x(Ni, Co, Al)O_2$ (often referred to as "NCA"), $Li_x(Mn, Ni, Co)O_2$, ("MNC" or "⅓ ⅓ ⅓").

Also included are compounds that are intergrowths or nanoscale mixtures between any of structures of "layered" ordered rock salt type or spinel type, including those in the Li—Mn—Ni—O family. In these formulae, x may by any number between 0 and about 1.5 (or other ranges discussed herein), depending on the Li content of the synthesized material and the charge/discharge excursions during use, and the elements within the parenthesis may be present in any amount and any relative amount as long as standard chemical rules of charge balance are obeyed. Typically, the sum of the elements within the parenthesis is about 1, i.e., for $Li_x(Ni_a, Co_b, Al_c)O_2$ and $Li_x(Mn_a, Ni_b, Co_c)O_2$, the sum of a, b, and c is about 1, although each of a, b, and c may be any number between 0 (including 0) and about 1.

Most of these compounds also exhibited the characteristic useful in this invention of having an electronic conductivity that increases upon partial delithiation of a fully lithiated starting material, e.g., due to the formation of multivalent transition metals. The expansion characteristics of these compounds may be selected or optimized so as to provide improved stability and life to the sintered electrode. For example, LiCoO$_2$ exhibits a decrease in volume when delithiated, while LiNiO$_2$ exhibits an expansion. Thus, simple physical mixtures of the two compounds may be used to obtain a range of expansion characteristics including zero expansion. These compounds also differ in, their thermal stability and safety characteristics. Thus, mixtures of such compounds may be selected to improve the safety of the sintered electrode and batteries based on such electrodes, using no more than routine optimization.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
an electrode comprising a ceramic composite, the electrode having a porosity of no more than about 50%, at least some of the pores of the electrode being filled with an electrolyte that is a liquid or a polymer,
wherein the ceramic composite has a surface and a bulk, the surface having a lower porosity than the bulk.

2. The article of claim 1, wherein the polymer is a block copolymer.

3. The article of claim 2, wherein the block copolymer is lithium-conducting.

4. The article of claim 1, wherein the electrode has a linear strain differential of less than about 20% when the electrode is infiltrated with Li ions.

5. The article of claim 1, further comprising a nonporous electrolyte disposed on the electrode.

6. The article of claim 5, wherein the nonporous electrolyte comprises LiPON.

7. The article of claim 1, wherein the ceramic composite comprises LiCoO$_2$.

8. The article of claim 1, wherein the ceramic composite comprises $Li_x(Ni_a, Co_b, Al_c)O_2$, wherein x is between about 0 and about 1.5, and the sum of a, b, and c is about 1.

9. The article of claim 1, wherein the ceramic composite comprises $Li_x(Mn_a, Ni_b, Co_c)O_2$, wherein x is between about 0 and about 1.5, and the sum of a, b, and c is about 1.

10. The article of claim 1, wherein the electrolyte filling the pores comprises $LiPF_6$.

11. The article of claim 1, wherein the electrolyte filling the pores comprises polyethylene oxide.

12. The article of claim 1, wherein the article is a battery.

13. The article of claim 12, wherein the battery has a storage density of at least about 200 W h/l.

14. The article of claim 1, wherein the article has a volume of no more than about 10 mm$^3$.

15. The article of claim 1, wherein the electrolyte is a polymer electrolyte.

16. The article of claim 1, wherein the electrolyte is an inorganic electrolyte.

17. The article of claim 1, wherein the ceramic composite has a smallest dimension that is at least about 0.2 mm.

18. The article of claim 1, wherein the electrode has a thickness of at least about 0.25 mm.

19. The article of claim 1, wherein the electrode has a density of at least about 50% of the theoretical density of the ceramic.

20. The article of claim 1, wherein the electrode has an open porosity of no more than about 50%.

21. The article of claim 1, wherein the electrode has a product of density, wherein the density is measured as a percent of the theoretical density of the ceramic, and thickness, wherein thickness is measured in millimeters, of between about 10%-mm and about 150%-mm.

22. The article of claim 1, wherein the electrode has a charge capacity per unit area of electrode of between about 10 mAh/cm$^2$ and about 100 mAh/cm$^2$.

23. The article of claim 22, wherein the electrode is able to retain at least about 50% of its initial storage capacity after at least 6 charge-discharge cycles at a C/3 rate.

24. The article of claim 22, wherein the electrode is formed from a process comprising sintering particles.

25. The article of claim 24, wherein the particles have a $d_{50}$ particle size of at least about 1 micrometers.

26. The article of claim 1, wherein the ceramic composite comprises a mixture of a ceramic material and at least one additional material.

27. The article of claim 26, wherein the at least one additional material comprises a second ceramic material.

28. The article of claim 27, wherein the ceramic material comprises a first phase of a material and the second ceramic material comprises a second phase of the material.

29. The article of claim 26, wherein the at least one additional material comprises a metal.

30. The article of claim 26, wherein the at least one additional material comprises a polymer.

31. The article of claim 1, wherein the electrode is a sintered electrode.

32. The article of claim 31, wherein the electrode comprises a first ceramic sintered with a second ceramic.

33. The article of claim 31, wherein the ceramic composite comprises a ceramic sintered with a metal.

34. The article of claim 1, wherein the electrode does not contain binder.

35. The article of claim 1, wherein the electrode does not contain a conductive additive.

* * * * *